United States Patent
Kallivalappil et al.

(10) Patent No.: US 12,442,006 B2
(45) Date of Patent: Oct. 14, 2025

(54) EXPRESSION SYSTEM FOR PRODUCT MANUFACTURING

(71) Applicant: Novel Biotechnology USA, Inc., Vancouver, WA (US)

(72) Inventors: Santhosh Thomas Kallivalappil, Winnipeg (CA); Matthew Weinstock, Camas, WA (US)

(73) Assignee: Novel Biotechnology USA, Inc., Vancouver, WA (US)

( * ) Notice: Subject to any disclaimer, the term of this patent is extended or adjusted under 35 U.S.C. 154(b) by 0 days.

(21) Appl. No.: 19/066,066

(22) Filed: Feb. 27, 2025

(65) Prior Publication Data

US 2025/0230447 A1    Jul. 17, 2025

Related U.S. Application Data

(63) Continuation of application No. PCT/US2024/012881, filed on Jan. 25, 2024.

(60) Provisional application No. 63/613,843, filed on Dec. 22, 2023, provisional application No. 63/481,499, filed on Jan. 25, 2023.

(51) Int. Cl.
| | |
|---|---|
| *C12N 15/74* | (2006.01) |
| *C12N 9/22* | (2006.01) |
| *C12N 15/11* | (2006.01) |
| *C12N 15/90* | (2006.01) |

(52) U.S. Cl.
CPC .............. *C12N 15/74* (2013.01); *C12N 9/22* (2013.01); *C12N 15/11* (2013.01); *C12N 15/902* (2013.01); *C12Y 204/02019* (2013.01); *C12N 2510/02* (2013.01); *C12N 2800/10* (2013.01)

(58) Field of Classification Search
None
See application file for complete search history.

(56) References Cited

U.S. PATENT DOCUMENTS

| | | | |
|---|---|---|---|
| 9,068,186 | B2 | 6/2015 | Bramhill et al. |
| 9,121,043 | B2 | 9/2015 | Dischert et al. |
| 9,902,965 | B2 | 2/2018 | Blattner et al. |
| 9,988,655 | B2 | 6/2018 | Figge et al. |
| 10,377,997 | B1 | 8/2019 | Weinstock et al. |
| 10,718,001 | B2 | 7/2020 | Szpirer et al. |
| 10,968,496 | B2 | 4/2021 | Weinstock et al. |
| 11,203,761 | B2 | 12/2021 | Weinstock et al. |
| 11,447,755 | B2 | 9/2022 | Weinstock et al. |
| 11,484,585 | B2 | 11/2022 | Waldor et al. |
| 11,667,944 | B2 | 6/2023 | Blattner et al. |
| 11,746,321 | B2 | 9/2023 | Weinstock et al. |
| 11,746,344 | B2 | 9/2023 | Kim et al. |
| 2019/0241899 | A1 | 8/2019 | Church et al. |
| 2021/0108227 | A1 | 4/2021 | Herring |
| 2022/0090098 | A1 | 3/2022 | Weinstock et al. |
| 2022/0144899 | A1 | 5/2022 | Bothfeld et al. |
| 2023/0065419 | A1 | 3/2023 | Chatzivasileiou et al. |
| 2023/0287437 | A1 | 9/2023 | Smith et al. |
| 2025/0230447 | A1* | 7/2025 | Kallivalappil ....... C12N 15/902 |

FOREIGN PATENT DOCUMENTS

| | | |
|---|---|---|
| CN | 112608911 B | 7/2022 |
| WO | 9602658 W | 2/1996 |
| WO | 9636706 W | 11/1996 |
| WO | 2019099121 A1 | 5/2019 |
| WO | 2023-069900 A1 | 4/2023 |

OTHER PUBLICATIONS

David A Specht, Timothy J Sheppard, Finn Kennedy, Sijin Li, Greeshma Gadikota, Buz Barstow, "Efficient natural plasmid transformation of Vibrio natriegens enables zero-capital molecular biology", PNAS Nexus, vol. 3, Issue 2, Feb. 2024, pgad444, pp. 1-13.
Genbank, Vibrio natriegens NBRC 15636 = ATCC 14048 = DSM 759 chromosome 1, complete sequence, Accession: CP009977, Sep. 2, 2016 [retrieved Jun. 27, 2024]. Retrieved from the Internet <URL: https://www.ncbi.nlm.nih.gov/nuccore/CP009977>.
Genbank, Vibrio natriegens NBRC 15636 = ATCC 14048 = DSM 759 chromosome 1, complete sequence, Accession: CP016345, Jul. 15, 2016 [retrieved Jun. 27, 2024]. Retrieved from the Internet <URL: https://www.ncbi.nlm.nih.gov/nuccore/CP016345>.
International Search Report issued Aug. 27, 2024 in PCT/US24/12881.
Gao, Guangping, et al. "Clades of Adeno-associated viruses are widely disseminated in human tissues." Journal of virology 78.12 (2004): 6381-6388.
Genbank, Vibrio natriegens, Accession: AAO18662, May 12, 2004 [retrieved Aug. 4, 2025]. Retrieved from the Internet https://www.ncbi.nlm.nih.gov/protein/AAO18662>, 2 pages.
Genbank, Vibrio natriegens, Accession: ANQ15862, Jul. 6, 2016 [retrieved Aug. 4, 2025]. Retrieved from the Internet <URL: https://www.ncbi.nlm.nih.gov/protein/ANQ15862>, 2 pages.
Genbank, Vibrio natriegens, Accession: ANQ17067, Jul. 6, 2016 [retrieved Aug. 4, 2025]. Retrieved from the Internet <URL: https://www.ncbi.nlm.nih.gov/protein/ANQ17067>, 2 pages.
Genbank, Vibrio natriegens, Accession: ANQ17872, Jul. 6, 2016 [retrieved Aug. 4, 2025]. Retrieved from the Internet https://www.ncbi.nlm.nih.gov/protein/ANQ17872>, 2 pages.
Genbank, Vibrio natriegens, Accession: ANQ18079, Jul. 6, 2016 [retrieved Aug. 4, 2025]. Retrieved from the Internet <URL: https://www.ncbi.nlm.nih.gov/protein/ANQ18079>, 2 pages.

(Continued)

*Primary Examiner* — Nancy J Leith
(74) *Attorney, Agent, or Firm* — Greenberg Traurig LLP

(57) ABSTRACT

The present disclosure provides engineered bacterial cells having one or more genetic modifications that result in increased production of expression products, such as increased production of plasmids with reduced occurrence of plasmid concatemers or multimers. Also disclosed herein are expression systems for product manufacturing in media having reduced antibiotic concentration, as well as methods of making cells for use in the expression systems. The cells and expression systems increase the growth rate and production yields of biomolecules produced within the host bacterial host cells without the use of antibiotics, and can produce the product with little to no endotoxins present.

18 Claims, 5 Drawing Sheets

Specification includes a Sequence Listing.

(56) References Cited

OTHER PUBLICATIONS

Genbank, Vibrio natriegens, Accession: ANQ18149, Jul. 6, 2016 [retrieved Aug. 4, 2025]. Retrieved from the Internet https://www.ncbi.nlm.nih.gov/protein/ANQ18149>, 2 pages.
Genbank, Vibrio natriegens, Accession: ATFJ01000037, Jul. 1, 2013 [retrieved Aug. 4, 2025]. Retrieved from the Internet https://www.ncbi.nlm.nih.gov/nuccore/ATFJ01000037>, 126 pages.
Genbank, Vibrio natriegens, Accession: AY198129, May 12, 2004 [retrieved Aug. 4, 2025]. Retrieved from the Internet https://www.ncbi.nlm.nih.gov/nuccore/AY198129>, 2 pages.
Genbank, Vibrio natriegens, Accession: CP016347, Jul. 6, 2016 [retrieved Aug. 4, 2025]. Retrieved from the Internet <URL: https://www.ncbi.nlm.nih.gov/nuccore/CP016347>, 724 pages.
Genbank, Vibrio natriegens, Accession: CP101906, Aug. 19, 2022 [retrieved Aug. 4, 2025]. Retrieved from the Internet https://www.ncbi.nlm.nih.gov/nuccore/CP101906>, 447 pages.
Genbank, Vibrio natriegens, Accession: EMP39386, Jul. 1, 2013 [retrieved Aug. 4, 2025]. Retrieved from the Internet https://www.ncbi.nlm.nih.gov/protein/EMP39386>, 2 pages.
Genbank, Vibrio natriegens, Accession: UUI14161, Aug. 19, 2022 [retrieved Aug. 4, 2025]. Retrieved from the Internet https://www.ncbi.nlm.nih.gov/protein/UUI14161.1>, 2 pages.
Gerdes, Svetlana, et al. "Essential genes on metabolic maps." Current opinion in biotechnology 17.5 (2006): 448-456.
Mori S, Wang L, Takeuchi T, Kanda T. Two novel adeno-associated viruses from cynomolgus monkey: pseudotyping characterization of capsid protein. Virology. Dec. 20, 2004;330(2):375-83.
O'Hare K, Benoist C, Breathnach R. Transformation of mouse fibroblasts to methotrexate resistance by a recombinant plasmid expressing a prokaryotic dihydrofolate reductase. Proc Natl Acad Sci U S A. Mar. 1981;78(3):1527-31.
Purcell O, Jain B, Karr JR, Covert MW, Lu TK. Towards a whole-cell modeling approach for synthetic biology. Chaos. Jun. 2013;23(2):025112. doi: 10.1063/1.4811182.
Stukenberg, Daniel, et al. "NT-CRISPR, combining natural transformation and CRISPR-Cas9 counterselection for markerless and scarless genome editing in Vibrio natriegens." Communications Biology 5.1 (2022): 265.
Takebe, Y., Seiki, M., Fujisawa, J. I., Hoy, P., Yokota, K., Arai, K. I., . . . Arai, N. (1988). SRα Promoter: an Efficient and Versatile Mammalian cDNA Expression System Composed of the Simian Virus 40 Early Promoter and the R-U5 Segment of Human T-Cell Leukemia Virus Type 1 Long Terminal Repeat. Molecular and Cellular Biology, 8(1), 466-472.
Zhang, Ren, and Yan Lin. "DEG 5.0, a database of essential genes in both prokaryotes and eukaryotes." Nucleic acids research 37.suppl_1 (2009): D455-D458.

* cited by examiner

|  | *E coli @ 37°C AOF media* | *NBx™ @ RT in NBx™ AOF media* |
| --- | --- | --- |
| Estimated Doubling Time | ~ 95 min | ~ 50 min |

EXPRESSION SYSTEM FOR PRODUCT MANUFACTURING

CROSS-REFERENCE

This application is a continuation of PCT/US24/12881, filed Jan. 25, 2024, which claims the benefit of U.S. Provisional Application No. 63/481,499, filed on Jan. 25, 2023, and U.S. Provisional Application No. 63/613,843, filed on Dec. 22, 2023, each of which are incorporated herein by reference in their entirety.

SEQUENCE LISTING

The instant application contains a Sequence Listing which has been submitted electronically in ST.26 format and is hereby incorporated by reference in its entirety. Said copy, created on Jan. 29, 2024, is named 212391-701601_SL.xml and is 41,986 bytes in size.

SUMMARY

One aspect of the invention features a genetically-modified *Vibrio natriegens* bacterial cell having a genetic modification with respect to a parent *Vibrio natriegens* bacterial strain selected from the group consisting of: the *Vibrio natriegens* bacterial strain deposited under accession number NCIMB 857, the *Vibrio natriegens* bacteria strain deposited under accession number ATCC 14048, the *Vibrio natriegens* bacteria strain deposited under accession number DSM 759, and the *Vibrio natriegens* bacteria strain deposited under accession number NBRC 15636; wherein the genetic modification results in reduced expression of a polypeptide encoded by a chromosome 1 gene of the parent *Vibrio natriegens* bacterial strain, wherein the chromosome 1 gene has a polynucleotide sequence of SEQ ID NO: 1 prior to the modification. Also disclosed herein is a genetically-modified *Vibrio natriegens* bacterial cell having a genetic modification with respect to a parent *Vibrio natriegens* bacterial strain that results in reduced expression of a polypeptide encoded by a chromosome 1 gene of the parent *Vibrio natriegens* bacterial strain, wherein the chromosome 1 gene has a polynucleotide sequence with at least 90%, at least 91%, at least 92%, at least 93%, at least 94%, at least 95%, at least 96%, at least 97%, at least 98%, at least 99%, at least 99.5%, at least 99.9%, or 100% sequence identity to SEQ ID NO: 1 prior to the modification. In some embodiments, the genetically-modified *Vibrio natriegens* bacterial cell further comprises a genetic modification to one or more genes of the parent *Vibrio natriegens* bacterial strain, wherein the one or more genes are selected from the group consisting of: DAM, DNS, KDO, KdsD, gutQ, kdsA, kdsB, waaA, msbA, yhiD, lpxL, lpxM, and any combination thereof. In other embodiments, the genetically-modified *Vibrio natriegens* bacterial cell comprises the genetic modification to the DNS gene. In some embodiments, the genetically-modified *Vibrio natriegens* bacterial cell comprises the genetic modification to the DAM gene. In some the genetically-modified *Vibrio natriegens* bacterial cell comprises the genetic modification to the KdsD gene, the lpxL gene, or the lpxM gene. In some embodiments, upon culturing the genetically-modified *Vibrio natriegens* bacterial cell in the growth medium, the genetically-modified *Vibrio natriegens* bacterial cell replicates with reduced secretion of endotoxin into the growth medium, as compared to an amount of endotoxin secreted by a comparable bacterial strain lacking the genetic modification that is replicated in the growth medium for the same amount of time. In some embodiments, the parent *Vibrio natriegens* bacterial strain is the *Vibrio natriegens* bacterial strain deposited under accession number NCIMB 857. In other embodiments, the genetic modification comprises a deletion of the gene having the polynucleotide sequence of SEQ ID NO: 1.

In some embodiments, upon transformation of a template plasmid into the genetically-modified *Vibrio natriegens* bacterial cell, the genetically-modified *Vibrio natriegens* bacterial cell expresses the template plasmid with a reduced amount of plasmid multimers or concatemers, relative to an amount of plasmid multimers or concatemers produced in the same amount of time upon transformation of the template plasmid into a bacterial cell of a comparable bacterial strain lacking the genetic modification. In other embodiments, upon transformation of a template plasmid into the genetically-modified *Vibrio natriegens* bacterial cell, the genetically-modified *Vibrio natriegens* bacterial cell replicates the template plasmid at an increased level, or expresses a transgene encoded by the template plasmid at an increased level relative to a level of template plasmid replication or transgene expression, respectively, produced in the same amount of time upon transformation of the template plasmid into a bacterial cell of a comparable bacterial strain lacking the genetic modification. In some embodiments, upon transformation of the template plasmid into the genetically-modified *Vibrio natriegens* bacterial cell, the genetically-modified *Vibrio natriegens* bacterial cell replicates the template plasmid at the increased level, relative to the level of template plasmid replication produced in the same amount of time upon transformation of the template plasmid into the bacterial cell of the comparable bacterial strain lacking the genetic modification.

In other embodiments, upon transformation of the template plasmid into the genetically-modified *Vibrio natriegens* bacterial cell, the genetically-modified *Vibrio natriegens* bacterial cell replicates the template plasmid at a level that is at least 200% greater than the level of template plasmid replication produced in the same amount of time upon transformation of the template plasmid into the bacterial cell of the comparable bacterial strain lacking the genetic modification. In some embodiments, upon culturing the genetically-modified *Vibrio natriegens* bacterial cell in growth medium, the genetically-modified *Vibrio natriegens* bacterial cell has a cellular replication rate that is at least 150% faster than a replication rate of a bacterial cell of a comparable bacterial strain lacking the genetic modification that is replicated in the growth medium for the same amount of time, as measured by optical density at 600 nm. In other embodiments, upon culturing the genetically-modified *Vibrio natriegens* bacterial cell in the growth medium, the genetically-modified *Vibrio natriegens* bacterial cell replicates with a doubling time of about 75 min, as measured by optical density at 600 nm. In some embodiments, the comparable bacterial strain is an *E. coli* K12 or B strain derivative. In some embodiments, the comparable bacterial strain is the parent *Vibrio natriegens* bacterial strain.

Also provided herein is an expression product produced by the genetically-modified *Vibrio natriegens* bacterial cell as disclosed herein.

Provided herein is a system for replicating a genetically-modified *Vibrio natriegens* bacterial cell, comprising the genetically-modified *Vibrio natriegens* bacterial cell of disclosed herein and growth medium.

Another aspect of the present disclosure is a method of making a genetically-modified *Vibrio natriegens* bacterial cell, the method comprising obtaining a parent *Vibrio natr-*

*iegens* bacterial strain, wherein the parent *Vibrio natriegens* bacterial strain is selected from the group consisting of: the *Vibrio natriegens* bacterial strain deposited under accession number NCIMB 857, the *Vibrio natriegens* bacteria strain deposited under accession number ATCC 14048, the *Vibrio natriegens* bacteria strain deposited under accession number DSM 759, and the *Vibrio natriegens* bacteria strain deposited under accession number NBRC 15636; and performing a modification that results in reduced expression of a polypeptide encoded by a chromosome 1 gene of the parent *Vibrio natriegens* bacterial strain, wherein the chromosome 1 gene has a polynucleotide sequence of SEQ ID NO: 1 prior to the modification, thereby generating the genetically-modified *Vibrio natriegens* bacterial cell.

Also provided herein is a method of replicating a template plasmid with reduced occurrence of plasmid multimers or concatemers in a genetically-modified *Vibrio* bacterial cell, the method comprising obtaining the genetically-modified *Vibrio* bacterial cell, wherein the genetically-modified *Vibrio* bacterial cell comprises a genetic modification to one or more genes selected from the group consisting of: DAM, DNS, RecA, KDO, KdsD, gutQ, kdsA, kdsB, waaA, msbA, yhiD, lpxL1, lpxM, and any combination thereof, transforming the template plasmid into the genetically-modified *Vibrio* bacterial cell, thereby replicating the template plasmid in the genetically-modified *Vibrio* bacterial cell, wherein the template plasmid is replicated in the genetically-modified *Vibrio* bacterial cell with reduced levels of plasmid multimers or concatemers, relative to an amount of plasmid multimers or concatemers produced in the same amount of time upon transformation of the template plasmid into a bacterial cell of a comparable bacterial strain lacking the genetic modification. In some embodiments, a plasmid is produced by the method described herein.

Another aspect of the invention features a genetically modified cell including a genetic modification that results in elimination or reduced expression of a polypeptide encoded by a nicotinamide adenine dinucleotide (NAD) biosynthesis gene, as compared to an otherwise comparable cell lacking the genetic modification and an exogenously introduced polypeptide encoded by the nicotinamide adenine dinucleotide (NAD) biosynthesis gene or functional equivalent or functional variant thereof, where the genetically modified cell including the genetic modification demonstrates reduced cell growth or cell survival on antibiotic-free media absent the exogenously introduced polypeptide, as compared to the otherwise comparable cell lacking the genetic modification and where the exogenously introduced polypeptide facilitates growth of said genetically modified cell in antibiotic-free media.

In some embodiments, said exogenously introduced polypeptide is introduced via a plasmid comprising a sequence encoding said polypeptide. In some embodiments, the genetically modified cell includes a modification to the NAD biosynthesis gene or a non-coding region operatively linked to the NAD biosynthesis gene. In other embodiments, the NAD biosynthesis gene is selected from the group consisting of: NadA, NadB, NadC, NadD, NadE1, and NadE2. In some embodiments, the genetically modified cell also includes a genetic modification that results in reduced endotoxin secretion, relative to an otherwise comparable cell that does not include the genetic modification. In other embodiments, the genetic modification that results in reduced endotoxin secretion includes a modification to a gene implicated in endotoxin production, or a non-coding region operatively linked to the gene implicated in endotoxin production. In some embodiments, the gene implicated in endotoxin production is a lipopolysaccharide (LPS) biosynthesis gene. In other embodiments, the LPS biosynthesis gene is selected from the group consisting of KDO, KdsD, gutQ, kdsA, kdsB, waaA, msbA, yhiD, lpxL, and lpxM.

In some embodiments, the genetically modified cell also includes a genetic modification that results in less phosphodiester cleavage of DNA, relative to an otherwise comparable cell that does not include the genetic modification that results in less phosphodiester cleavage of DNA. In other embodiments, the genetic modification that results in less phosphodiester cleavage of DNA includes a modification to a deoxyribonuclease (Dns) gene or a non-coding region operatively linked to the Dns gene. In some embodiments, the at least one engineered Dns gene is replaced by one or more catalase genes. In other embodiments, the genetically modified cell also includes a genetic modification that results in less DNA methylation, relative to an otherwise comparable cell that does not include the genetic modification that results in less DNA methylation. In some embodiments, the genetic modification that results in less DNA methylation includes a modification to a DNA methylase (Dam) gene or a non-coding region operatively linked to the Dam gene. In other embodiments, the genetically modified cell also includes a genetic modification that results in less DNA repair, relative to an otherwise comparable cell that does not include the genetic modification that results in less DNA repair. In some embodiments, the genetic modification that results in less DNA repair includes a modification to a recombinase A gene (RecA) gene or a non-coding region operatively linked to the RecA gene. In other embodiments, the at least one engineered RecA gene is replaced by one or more catalase genes.

In some embodiments, the genetically modified cell is a genetically modified bacterial cell. In other embodiments, the genetically modified bacterial cell is a gram-negative bacterium. In some embodiments, the gram-negative bacterium is *Escherichia* spp., *Shigella* spp., *Salmonella* spp., *Campylobacter* spp., *Neisseria* spp., *Haemophilus* spp., *Aeromonas* spp., *Francisella* spp., *Yersinia* spp., *Klebsiella* spp., *Bordetella* spp., *Legionella* spp., *Citrobacter* spp., *Chlamydia* spp., *Brucella* spp., *Pseudomonas* spp., *Helicobacter* spp., *Moraxella* spp., *Stenotrophomonas* spp., *Bdellovibrio* spp., *Acinetobacter* spp., *Enterobacter* spp. and *Vibrio* spp. In some embodiments, the bacterium is *E. Coli* or *V. Natriegens*. In other embodiments, the plasmid also includes one or more of a LacZa fragment, multiple cloning sites (MSC), lac operator, lac promotor, cap binding sites, origin of replication, and M13 forward and reverse priming sites. In some embodiments, the exogenously introduced plasmid further includes a sequence encoding a biomolecule or functional fragment thereof.

Another aspect of the invention features a genetically modified cell including a genetic modification that results in reduced endotoxin secretion, relative to an otherwise comparable cell that does not include the genetic modification that results in reduced endotoxin secretion; a genetic modification that results in elimination or reduced expression of a polypeptide encoded by a nicotinamide adenine dinucleotide synthase E1 (NadE1) gene, as compared to an otherwise comparable cell lacking the genetic modification that results in elimination or reduced expression of a polypeptide encoded by the NadE1 gene; and an exogenously introduced polypeptide encoded by the NadE1 gene or functional equivalent or functional variant thereof. In some embodiments, said exogenously introduced polypeptide is introduced via a plasmid comprising a sequence encoding said polypeptide. In some embodiments, the modified cell is a gram negative bacterial cell. In other embodiments, the gram negative bacterial cell is *E. Coli* or *V. Natriegens*.

Another aspect of the invention features a genetically modified bacterial cell including a genetic modification that results in reduced endotoxin secretion, relative to an otherwise comparable cell that does not include the genetic modification that results in reduced endotoxin secretion; a genetic modification that results in elimination or reduced expression of a polypeptide encoded by an essential gene, as compared to an otherwise comparable cell lacking the genetic modification that results in elimination or reduced expression of a polypeptide encoded by the essential gene; an exogenously introduced polypeptide encoded by the essential gene or functional equivalent or functional variant thereof; and a genetic modification that results in less DNA methylation, relative to an otherwise comparable cell that does not include the genetic modification that results in less DNA methylation, where the genetically modified bacterial cell is a gram negative bacterial cell. In some embodiments, said exogenously introduced polypeptide is introduced via a plasmid comprising a sequence encoding said polypeptide.

One aspect of the invention features a system for expression of genetically modified cells in antibiotic-free media, including the genetically modified cells and antibiotic-free medium. In some embodiments, the genetically modified cells replicate a non-native plasmid with at least a 200% increase in production yield of mg of plasmid when grown in the growth medium, as compared to a corresponding production yield of the non-native plasmid in a comparable expression system including wild-type K12 *E. Coli* cells grown in the growth medium for the same amount of growth time. In other embodiments, the genetically modified cells replicate at a rate at least 150% faster in the growth medium, as compared to a corresponding cell replication rate of wild-type K12 *E. Coli* cells grown in the growth medium for the same amount of growth time, as measured by optical density at 600 nm. In yet other embodiments, the genetically modified cells replicate with a doubling time of less than 75 min in the growth medium, as compared to a corresponding doubling time of wild-type K12 *E. Coli* cells grown in the growth medium for the same amount of growth time, as measured by optical density at 600 nm. In some embodiments, the genetically modified cells replicate with reduced secretion of endotoxin into the growth medium, as compared to a corresponding doubling time of wild-type K12 *E. Coli* cells grown in the growth medium for the same amount of growth time.

Another aspect of the invention features a method of modifying a cell, including performing a genetic modification that results in reduced endotoxin secretion, relative to an otherwise comparable cell that does not include the genetic modification that results in reduced endotoxin secretion and performing a genetic modification that results in elimination or reduced expression of a polypeptide encoded by a nicotinamide adenine dinucleotide (NAD) biosynthesis gene, as compared to an otherwise comparable cell lacking the genetic modification.

In some embodiments, the genetic modification that results in reduced endotoxin secretion includes a modification to a gene implicated in endotoxin production, or a non-coding region operatively linked to the gene implicated in endotoxin production. In other embodiments, the endotoxin gene is a lipopolysaccharide (LPS) biosynthesis gene. In some embodiments, the LPS biosynthesis gene is selected from the group consisting of KDO, KdsD, gutQ, kdsA, kdsB, waaA, msbA, yhiD, lpxL, and IpxM. In other embodiments, the genetic modification that results in elimination or reduced expression of the polypeptide encoded by the NAD biosynthesis gene includes a modification to the NAD biosynthesis gene or a non-coding region operatively linked to the NAD biosynthesis gene. In some embodiments, the NAD biosynthesis gene is selected from the group consisting of: NadA, NadB, NadC, NadD, NadE1, and NadE2.

In some embodiments, the method also includes performing a genetic modification that results in less phosphodiester cleavage of DNA, relative to an otherwise comparable cell that does not include the genetic modification that results in less phosphodiester cleavage of DNA. In other embodiments, the genetic modification that results in less phosphodiester cleavage of DNA includes a modification to a deoxyribonuclease (Dns) gene or a non-coding region operatively linked to the Dns gene. In some embodiments, the Dns gene is replaced by one or more catalase genes. In other embodiments, the method also includes performing a genetic modification that results in less DNA methylation, relative to an otherwise comparable cell that does not include the genetic modification that results in less DNA methylation. In some embodiments, the genetic modification that results in less DNA methylation includes a modification to a DNA methylase (Dam) gene or a non-coding region operatively linked to the Dam gene.

In some embodiments, the method also includes performing a genetic modification that results in less DNA repair, relative to an otherwise comparable cell that does not include the genetic modification that results in less DNA repair. In other embodiments, the genetic modification that results in less DNA repair includes a modification to a recombinase A gene (RecA) gene or a non-coding region operatively linked to the RecA gene. In some embodiments, the at least one engineered RecA gene is replaced by one or more catalase genes. In other embodiments, the cell is a bacterial cell. In yet other embodiments, the bacterial cell is *Escherichia* spp., *Shigella* spp., *Salmonella* spp., *Campylobacter* spp., *Neisseria* spp., *Haemophilus* spp., *Aeromonas* spp., *Francisella* spp., *Yersinia* spp., *Klebsiella* spp., *Bordetella* spp., *Legionella* spp., *Citrobacter* spp., *Chlamydia* spp., *Brucella* spp., *Pseudomonas* spp., *Helicobacter* spp., *Moraxella* spp., *Stenotrophomonas* spp., *Bdellovibrio* spp., *Acinetobacter* spp., *Enterobacter* spp., and *Vibrio* spp. In other embodiments, the bacterial cell is *E. Coli* or *V. Natriegens*.

In some embodiments, the one or more genetic modifications are performed using an endonuclease system. In other embodiments, the endonuclease system is a meganuclease, zinc finger nucleases, transcription activator-like effector-based nucleases (TALEN), or CRISPR system. In some embodiments, the endonuclease system is a CRISPR system, and wherein the CRISPR system is a CRISPR/Cas9 system. In other embodiments, the CRISPR/Cas9 system is provided on a first vector or plasmid and a guide RNA (gRNA) is provided on a second vector or plasmid. In some embodiments, the genetic modification that results in less phosphodiester cleavage of DNA is performed using one or more guide RNA sequences selected from the group consisting of TTGGTGTCACTATTACCGCGCGG (SEQ ID NO: 19), CAGCTGCAATGCTGGCAAAGCGG (SEQ ID NO: 20), TCGAGCGGTAATAGTGAACGCGG (SEQ ID NO: 21), and TCCATTTCACTATTACCGAGCGG (SEQ ID NO: 22). In other embodiments, the genetic modification that results in less DNA methylation is performed using one or more guide RNA sequences selected from the group consisting of GCGTCGTTTATACCACGGAG (SEQ ID NO: 23), CCACGCTCAAATCCGCTCCG (SEQ ID NO:

24), GACGCGTTAATGTTGTATCG (SEQ ID NO: 25), and AAGTTTGCGGTATTTGAAAG (SEQ ID NO: 26).

Another aspect of the invention features a method of expressing a plasmid in a genetically modified cell that includes in an antibiotic-free medium, where the genetically modified cell includes a genetic modification that results in elimination or reduced expression of a polypeptide encoded by a nicotinamide adenine dinucleotide (NAD) biosynthesis gene, as compared to an otherwise comparable cell lacking the genetic modification, and where the plasmid includes a sequence encoding the polypeptide encoded by the NAD biosynthesis gene or functional equivalent or functional variant thereof; the method including transforming the genetically modified cells with the plasmid into the genetically modified cell; selecting the transformed cells in an antibiotic free growth medium; and isolating the amplified plasmid from the transformed cells.

In some embodiments the plasmid is produced by any of the method described herein.

Another aspect of the invention features a method of expressing a biomolecule encoded by a plasmid in a genetically modified cell that includes in an antibiotic-free medium, where the genetically modified cell includes a genetic modification that results in elimination or reduced expression of a polypeptide encoded by a nicotinamide adenine dinucleotide (NAD) biosynthesis gene, as compared to an otherwise comparable cell lacking the genetic modification, and wherein the plasmid includes a sequence encoding the polypeptide encoded by the NAD biosynthesis gene or functional equivalent or functional variant thereof and a sequence encoding the biomolecule or functional fragment thereof, the method including transforming the genetically modified cells with the plasmid into the genetically modified cell; selecting the transformed cells in an antibiotic free growth medium; and purifying the biomolecule or functional fragment thereof from the transformed cells.

In some embodiments, the biomolecule is produced by any of the methods described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The features of the present disclosure are set forth with particularity in the appended claims. A better understanding of the features and advantages of the present disclosure can be obtained by reference to the following detailed description that sets forth illustrative embodiments, in which the principles of the disclosure are utilized, and the accompanying drawings described below.

FIG. 3A shows the estimated doubling time of the the exemplary bacterial cells of the present disclosure compared to $E.$ $Coli$ grown in the same media, based on two independent runs performed in triplicate. FIG. 3B shows that the exemplary bacterial cells of the present disclosure have a greater total plasmid yield (mg) for various plasmids ranging in size from 2,500 bp to 7,900 bp. Estimated based on $E.$ $coli$ growth time (~12-14 hours).

FIG. 4A (labeled "Plasmid Example 1") shows purified plasmid DNA isolated from two independent transformed colonies in either the un-modified strain or the genetically-modified bacterial cell described herein. FIG. 4B (labeled "Plasmid Example 2") shows a similar result with a completely different plasmid DNA. In both cases it can be seen that the natural strain generates undesired multimeric species in addition to the desired plasmid (which results in a low-quality preparation).

DETAILED DESCRIPTION

Figure 1:
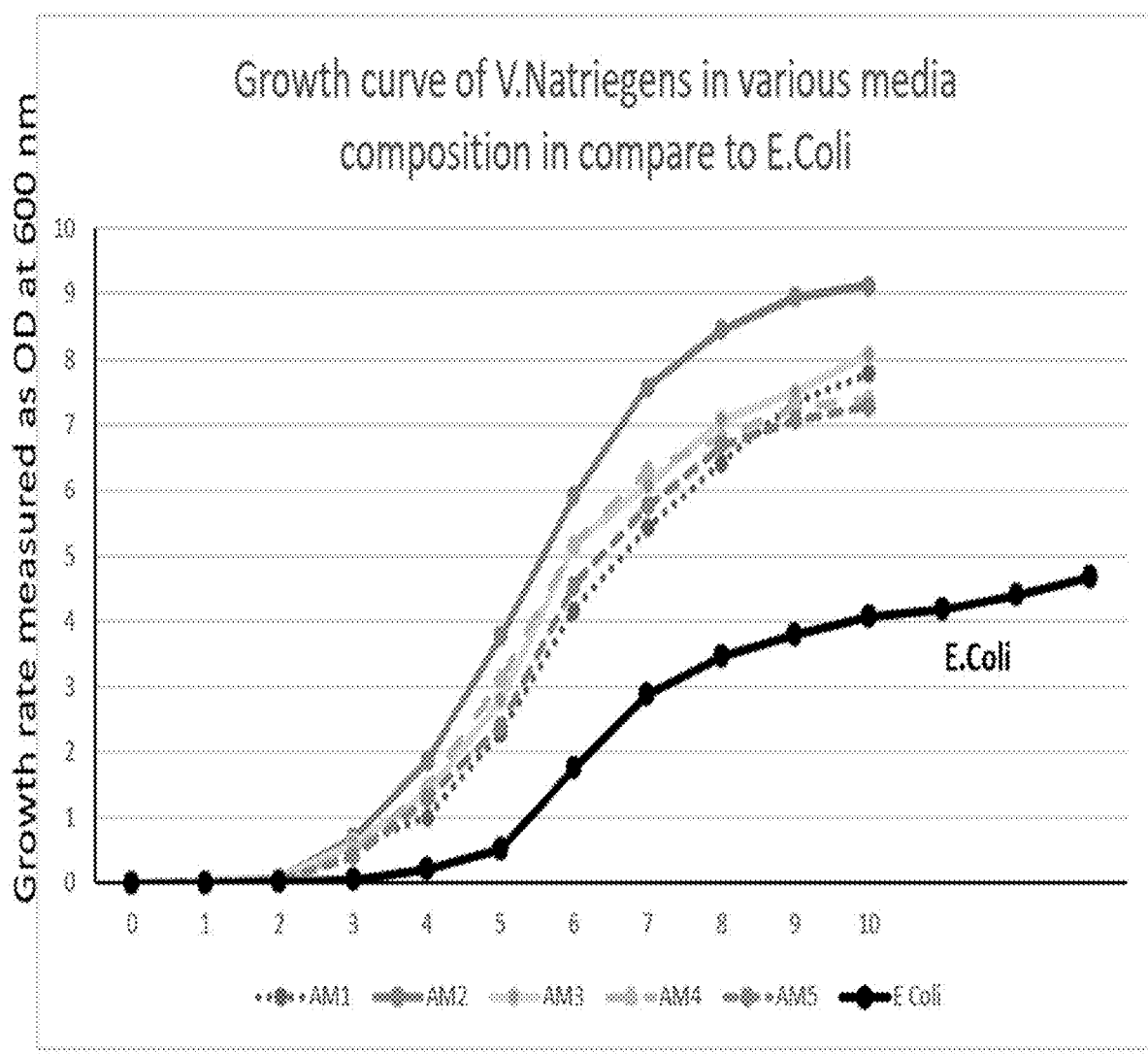
FIG. 1 provides a growth curve showing that $V.$ $Natriegens$ growth rate is faster compared to $E.$ $Coli.$ At 10 hours, AM2 showed the fastest growth rate, followed by AM3, AM1, AM4, AM5, and $E.$ $Coli,$ respectively. $V.$ $Natriegens$ (AM1-5) was grown under the following conditions: animal component free peptone (5 to 10 g/L), yeast Extract (5 to 10 g/L), sodium chloride (5 to 30 g/L), double distilled water to a total volume of 1000 ML, pH adjusted to be from 6.5 to 7.5, temperature was from 25° C. to 37° C., and with 100-300 rpm shaking. $E.$ $Coli$ was grown in optimal growth media (LB broth) at 37° C. with 100-300 rpm shaking.

It is to be understood that both the foregoing general description and the following detailed description are exemplary and explanatory only and are not to be construed as restrictive of the disclosure.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated by reference in their entirety for any purpose.

Disclosed herein are genetically-modified bacterial cells, expression systems containing the same, and methods of making expression systems containing the same, which increase the growth rate and production yields of biomolecules produced within the cells.

Antibiotic resistance genes and the antibiotics themselves have become undesirable due to multiple antibiotic-resistant microorganisms that can potentially evolve in the natural environment. Furthermore, US-FDA guidance for Human somatic cell therapy and genetic therapy recommends avoiding penicillin and other β-lactam antibiotics during manufacturing production due to severe hypersensitivity reactions in patients as these antibiotics can become contaminants post-production. Accordingly, disclosed herein are genetically-modified bacterial cells with one or more genetic modifications that results in the elimination or reduced expression of an expression product (e.g. a polypeptide or a gene) encoded by an essential gene, where the genetically-modified bacterial cell can be transformed with a template plasmid and replicates the template plasmid with reduced levels of plasmid multimers or concatemers, as compared to an otherwise comparable cell lacking the genetic modification, which can be supplemented through an exogenous polynucleotide (e.g. a plasmid) comprising a sequence encoding the expression product. By constructing the polynucleotide encoding the expression product of the essential gene to produce a biomolecule, the cell can produce the biomolecule through a plasmid selection that does not involve the use of antibiotics. Further genetic modifications to the cell to reduce or eliminate the secretion of endotoxin into the growth medium, as well as genetic modifications to improve the growth rate and plasmid/biomolecule yield are also contemplated herein.

Definitions

Unless otherwise indicated, all technical terms used herein have the same meaning as commonly understood by one of ordinary skill in the art. Unless otherwise indicated or obvious from context, the following terms have the following meanings:

As used in this specification and the appended claims, the singular forms "a," "an," and "the" include plural references unless the context clearly dictates otherwise. For example, the term "a sample" includes a plurality of samples, including mixtures thereof.

Any reference to "or" herein is intended to encompass "and/or" unless otherwise stated. As used herein, the term "and/or" includes any and all combinations of one or more of the associated listed items.

Use of the term "including" as well as other forms, such as "includes" and "included," is not limiting.

As used herein, the term "comprise" and its grammatical equivalents specifies the presence of stated features, integers, steps, operations, elements, and/or components, but does not preclude the presence or addition of one or more other features, integers, steps, operations, elements, components, and/or groups thereof.

As used herein, the term "about" in reference to a number or range of numbers is understood to mean the stated number and numbers+/−10% thereof, or 10% below the lower listed limit and 10% above the higher listed limit for the values listed for a range, as well as variations of ±5%, ±1%, ±0.5%, or even 0.1%.

The terms "% identical," "% identity," and "percent identity," or grammatical equivalents thereof, refer to the extent to which two sequences (nucleotide or amino acid) have the same residue at the same positions in an alignment. For example, "an amino acid sequence is X % identical to SEQ ID NO: Y" can refer to % identity of the amino acid sequence to SEQ ID NO: Y and is elaborated as X % of residues in the amino acid sequence are identical to the residues of sequence disclosed in SEQ ID NO: Y. Generally, computer programs can be employed for such calculations.

The terms "essential gene" and "auxotroph," as used herein, refer to a gene that is necessary for cell growth and/or survival and the organism missing the necessary gene is referred to as an auxotroph. Bacterial essential genes can be identified by targeted gene deletion and/or random mutagenesis and screening (see, for example, Zhang and Lin, "DEG 5.0, a database of essential genes in both prokaryotes and eukaryotes," Nucl Acids Res, 2009; 37: D455-D458 and Gerdes et al., "Essential Genes on metabolic maps," Curr Opin Biotechnol, 2006; 17 (5): 448-456.

The term "enhance" or "increase" refers to an increase in the specified parameter of at least about 1.25-fold, 1.5-fold, 2-fold, 3-fold, 4-fold, 5-fold, 6-fold, 8-fold, 10-fold, twelve-fold, fifteen-fold, etc.

The term "inhibit" or "reduce" or grammatical variations thereof as used herein refers to a decrease or diminishment in the specified level or activity of at least about 15%, 25%, 35%, 40%, 50%, 60%, 75%, 80%, 90%, 95% or more. In particular embodiments, the inhibition or reduction results in little or essentially no detectable activity (at most, an insignificant amount, e.g., less than about 10%, 5%, 1%, 0.1% or even 0.005%).

As used herein, a "non-native" and "exogenous" nucleic acid sequence or polynucleotide refer to a nucleic acid sequence not normally present in a bacterium, e.g., an extra copy of an endogenous sequence, or a heterologous sequence such as a sequence from a different species, strain, or substrain of bacteria, or a sequence that is modified and/or mutated as compared to the unmodified sequence from bacteria of the same subtype. In some embodiments, the non-native nucleic acid sequence is a synthetic, non-naturally occurring sequence (see, e.g., Purcell et al., 2013). The non-native nucleic acid sequence or polynucleotide may be a regulatory region, a promoter, a gene, and/or one or more genes in a gene cassette. In some embodiments, "non-native" refers to two or more nucleic acid sequences that are not found in the same relationship to each other in nature. The non-native nucleic acid sequence may be present on a plasmid or chromosome. In addition, multiple copies of any regulatory region, promoter, gene, and/or gene cassette may be present in the bacterium, wherein one or more copies of the regulatory region, promoter, gene, and/or gene cassette may be mutated or otherwise altered as described herein. In some embodiments, the genetically engineered bacteria are engineered to comprise multiple copies of the same regulatory region, promoter, gene, and/or gene cassette in order to enhance copy number or to comprise multiple different components of a gene cassette performing multiple different functions.

The term "protein", "peptide" and "polypeptide" are used interchangeably to refer to an oligomer of two or more linked amino acids or derivatives of the same. The term "exogenously introduced polypeptide" refers to a polypeptide encoded by an exogenous polynucleotide.

As used herein, the term "transform" or "transformation" refers to the transfer of a nucleic acid fragment into a host bacterial cell, resulting in genetically-stable inheritance. Host bacterial cells comprising the transformed nucleic acid fragment are referred to as "recombinant" or "transgenic" or "transformed" organisms.

The terms "complementary" and "complementarity," as used herein, with reference to a nucleic acid molecule or nucleotide sequence, refer to the characteristic of a polynucleotide having nucleotides that base pair with their Watson-Crick counterparts (C with G; or A with T) in a reference nucleic acid. For example, when every nucleotide in a polynucleotide forms a base pair with a reference nucleic acid, that polynucleotide is said to be 100% complementary to the reference nucleic acid. In a double stranded DNA or RNA sequence, the upper (sense) strand sequence is in general, understood as going in the direction from its 5'- to 3'-end, and the complementary sequence is thus understood as the sequence of the lower (antisense) strand in the same direction as the upper strand. Following the same logic, the reverse sequence is understood as the sequence of the upper strand in the direction from its 3'- to its 5'-end, while the 'reverse complement' sequence or the 'reverse complementary' sequence is understood as the sequence of the lower strand in the direction of its 5'- to its 3'-end. Each nucleotide in a double stranded DNA or RNA molecule that is paired with its Watson-Crick counterpart called its complementary nucleotide.

The term "length" as it applies to a nucleic acid (polynucleotide) or polypeptide may be expressed as "kilobases" (kb) or "base pairs (bp)," and may be used interchangeably with the term, "linked nucleosides." Thus, a length of 1 kb refers to a length of 1000 linked nucleosides, and a length of 500 bp refers to a length of 500 linked nucleosides. Similarly, a protein having a length of 500 linked amino acids may also be simply described as having a length of 500 amino acids.

The term "guide nucleic acid," as used herein, refers to a nucleic acid that includes a nucleotide sequence that hybridizes to a target nucleic acid and that is capable of hybridizing to a portion of an additional nucleic acid that is bound by a nuclease.

The term "genetic modification," as used herein, refers to any genetic change. Exemplary genetic modifications include those that increase, decrease, or abolish the expression of a gene, including, for example, modifications of native chromosomal or extrachromosomal genetic material. Exemplary genetic modifications also include the introduction of at least one plasmid, modification, mutation, base deletion, base addition, base substitution, and/or codon modification of chromosomal or extrachromosomal genetic sequence(s), gene over-expression, gene amplification, gene suppression, promoter modification or substitution, gene addition (either single or multi-copy), antisense expression or suppression, or any other change to the genetic elements of a host cell, whether the change produces a change in phenotype or not.

The terms "non-naturally occurring," "engineered," "genetically modified," "genetic modification," and grammatical equivalents as used herein, are used interchangeably and indicate the involvement of the hand of man. The terms, when referring to a cell or expression system, refer to a cell or expression system that is substantially free from at least one other feature with which it is naturally associated in nature, and/or contains a modification (e.g., gene edit, chemical modification, nucleotide sequence, or amino acid sequence) that is not present in the naturally occurring cell or expression system.

The term "biomolecule" as used herein, refers to a polypeptide or polynucleotide that is expressed by a cell or expression system of the invention as described herein. The biomolecule, for example, can be a therapeutic polypeptide or polynucleotide used to alleviate or lessen a symptom of a disease or condition or used for a health, nutritional, or cosmetic benefit in a subject. Examples are, but not limited to, antibodies, messenger RNAs, antisense oligonucleotides, and short interfering RNAs.

Engineered Bacterial Cells

Disclosed herein are engineered, genetically modified cells having one or more genetic modifications. Such cells can be modified to impart or disable specific cellular traits. In some embodiments, the cells are bacterial cells. In some embodiments, the cells can be a gram-negative bacterium. For example, a non-limiting list of bacteria that may be useful to modify specific cellular traits include *Escherichia* spp., *Shigella* spp., *Salmonella* spp., *Campylobacter* spp., *Neisseria* spp., *Haemophilus* spp., *Aeromonas* spp., *Francisella* spp., *Yersinia* spp., *Klebsiella* spp., *Bordetella* spp., *Legionella* spp., *Citrobacter* spp., *Chlamydia* spp., *Brucella* spp., *Pseudomonas* spp., *Helicobacter* spp., *Moraxella* spp., *Stenotrophomonas* spp., *Bdellovibrio* spp., *Acinetobacter* spp., *Enterobacter* spp. and *Vibrio* spp.

In some embodiments, the genetically-modified bacteria can be any organism of the genus *Escherichia*. Some examples of organisms in the *Escherichia* genus include, but are not limited to, *Escherichia alberti*, *Escherichia coli*, *Escherichia fergusonii*, *Escherichia hermannii*, *Escherichia marmotae*, and *Escherichia vulneris*, but the expression system can be applied to any *Escherichia* sp. organism, or to any combination or sub-combination of the *Escherichia* spp.

In some embodiments, the genetically-modified bacterial cells are *Escherichia coli*. Examples of *Escherichia coli* include, but are not limited to, *Escherichia coli* K-12 strains such as W3110 strain (ATCC 27325) and MG1655 strain (ATCC 47076), *Escherichia coli* K5 strain (ATCC 23506) and *Escherichia coli* B.

In some embodiments, the genetically-modified bacteria comprise one or more genetic modifications where the genetic modifications as described herein are with respect to a specific bacteria strain. An example of the specific bacteria strain is the strain deposited under accession number NCIMB 857 at National Collections of Industrial, Food and Marine Bacteria (NCIMB) at NCIMB Ltd, Wellheads Pl, Dyce, Aberdeen AB21 7 GB, United Kingdom, on Feb. 1, 1961, which is an International Depository Authority under Article 7 of the Budapest Treaty. In some embodiments, the genetic modifications as described herein are with respect to the bacteria strain deposited under accession number NCIMB 857. Another example of the specific bacteria strain is the strain deposited under accession number ATCC 14048 at American Type Culture Collection (ATCC) (address: P.O. Box 1549, Manassas, Va. 20108, United States of America), which is an International Depository Authority under Article 7 of the Budapest Treaty, with an earliest deposit date of Feb. 1, 1961. In some embodiments, the genetic modifications as described herein are with respect to the bacteria strain deposited under accession number ATCC 14048. Another example of the specific bacteria strain is the strain deposited under accession number NBRC 15636 at International Patent Organism Depositary (IPOD), National Institute of Technology and Evaluation (NITE) Biological Resource Center (NBRC) at NBCR 2-5-8 Kazusakamatari, Kisarazu-shi, Chiba 292-0818 Japan, on Jan. 26, 1994, which is an International Depository Authority under Article 7 of the Budapest Treaty. In some embodiments, the genetic modifications as described herein are with respect to the bacteria strain deposited under accession number NBRC 15636. Another example of the specific bacteria strain is the strain deposited under accession number DSM 759 at Leibniz Institute, DSMZ-German Collection of Microorganisms and Cell Cultures GmbH on or before Oct. 18, 1976, which is an International Depository Authority under Article 7 of the Budapest Treaty. In some embodiments, the genetic modifications as described herein are with respect to the bacteria strain deposited under accession number DSM 759. In some embodiments, the genetic modifications as described herein are with respect to the bacteria strain deposited under accession number CIP 75.07. In some embodiments, the genetic modifications as described herein are with respect to the bacteria strain deposited under accession number LMD 73.19. In some embodiments, the genetic modifications as described herein are with respect to the bacteria strain deposited under accession number LMG 10935. In some embodiments, the genetic modifications as described herein are with respect to the bacteria strain deposited under accession number CAIM 12. In some embodiments, the genetic modifications as described herein are with respect to the bacteria strain deposited under accession number CCUG 16371. In some embodiments, the genetic modifications as described herein are with respect to the bacteria strain deposited under accession number IFO 15636. In some embodiments, the genetic modifications as described herein are with respect to the bacteria strain deposited under accession number NCCB 73019. In some embodiments, the genetic modifications as described herein are with respect to the bacteria strain designated P. Baumann 111. In some embodiments, the bacterial strain is NCIMB 857. The *Vibrio natriegens* strains NCIMB 857, ATCC 14048, DSM 750, and NBRC 15636 are available from the respective depositories for the public to access the strains without restrictions during the pendency of this application and upon grant. Further, because the *Vibrio natriegens* strains NCIMB 857, ATCC 14048, DSM 750, and NBRC 15636 are deposited at International Depository Authorities under Article 7 of the Budapest Treaty, maintenance of viable cultures of each deposit is assured by the respective International Depository Authorities for 30 years from the date of the deposits.

In some embodiments, the bacteria can be any organism of the Family *Escherichia*. In some embodiments, the bacteria can be any organism of the Family Vibrionaceae. The *Vibrio* sp. organisms can be any species of the genus *Vibrio*. Some examples of organisms in the *Vibrio* genus include, but are not limited to, *Vibrio natriegens, Vibrio cholerae, Vibrio fischeri, Vibrio parahaemolyticus, Vibrio campbellii,* and *Vibrio vulnificus*, but the expression system can be applied to any *Vibrio* sp. organism, or to any combination or sub-combination of the *Vibrio* sp. organisms listed herein. In one embodiment the engineered or genetically-modified organisms are *Vibrio natriegens*. In another embodiment the engineered or genetically-modified organisms are *Vibrio cholerae*. In another embodiment the engineered or genetically-modified organisms described herein are *Vibrio fischeri*. In another embodiment the engineered or genetically-modified organisms are *Vibrio parahaemolyticus*. In another embodiment the engineered or genetically-modified organisms described herein are *Vibrio vulnificus*. In some embodiments, the genetically-modified bacteria described herein are *Vibrio natriegens* deposited under accession number NCIMB 857.

*Vibrio* spp. have several advantages as host cells over other bacteria for many molecular biology applications. One advantage is their rapid growth rate. One of the most time intensive steps in modern biotech workflows is waiting for the host cell to grow to a sufficient density before DNA/protein/product can be recovered or the phenotype can be assessed. *E. coli* is considered to have one of the quickest growth rates relative to other organisms used in the biotech sector, and this has been one of its strengths. Because *Vibrio* spp. have a growth rate 2-3× faster than commonly used *E. coli* strains, it is able to achieve a dramatic reduction in the time necessary for the host to grow, and will accelerate research efforts.

An additional advantage is the compatibility of *Vibrio* spp. with standard lab protocols. Unlike organisms that require specialized techniques or methods, *Vibrio* spp. is compatible with many standard cloning vectors, growth media, workflows and commercially available kits developed for *E. coli* or recovering DNA.

A further advantage is the nutritional versatility of *Vibrio* spp. allowing it to grow on a range of different growth media, including inexpensive, minimal media. Coupled with its rapid growth rate, this feature allows for industrial scale production in less time and at lower cost.

In some embodiments, an altered Chromosome II can serve as a vector or plasmid or artificial chromosome having the exogenous or heterologous DNA and for the construction, cloning, maintenance, and/or recovery of large DNAs and for the expression, production, and secretion of proteins or peptides or other biomolecules. In some embodiments, a polynucleotide, a plasmid, vector, or artificial chromosome described herein comprising the DNA insert or essential genetic elements can be replicated and maintained in the host organism, which can be a *Vibrio* spp., an *E. coli*, or other gram-negative bacteria.

While specific classes of modifications are provided below, the present disclosure encompasses bacterial cells having one or more of the classes of modifications described below (including any combination of the modifications provided below).

Endotoxin-Free (or Reduced Endotoxin Levels)

Disclosed herein are genetically-modified bacterial cells that replicate with reduced secretion of endotoxins. Also provided herein are non-toxic or reduced toxin (e.g., endotoxin free) cells (e.g. gram-negative bacterial cells such as *E. coli*). The present disclosure is not limited to a particular method of providing non-toxic cells. Lipopolysaccharides (LPS) are large molecules consisting of a lipid and a polysaccharide that are bacterial toxins. They are composed of an O-antigen, an outer core, and an inner core all joined by a covalent bond, and are found in the outer membrane of gram-negative bacteria. Lipopolysaccharides can have substantial impacts on human health, primarily through interactions with the immune system. LPS is a potent activator of the immune system and pyrogen (agent that causes fever). In severe embodiments, LPS can play a role in causing septic shock. In lower levels and over a longer time period, there is evidence LPS may play an important and harmful role in autoimmunity, obesity, depression, and cellular senescence. The term endotoxin is often used interchangeably with LPS. The LPS layer is essential to both the form and function of the OM of gram-negative bacteria, providing gram-negative pathogenesis and survival of the bacterium. LPS of various gram-negative bacteria is built generally to a common structural architecture including among others: the outer membrane embedded lipid A. Lipid A is the most conserved LPS domain amongst gram-negative bacterial, and is the structural component responsible for the biological activities within the host. Lipid A in LPS can be referred to as the endotoxin moiety. The majority of gram-negative bacteria has an inner core having at least one 2-keto 3-deoxy-D-manno-octulosonate (KDO) molecule. KDO is an essential component of LPS that is a conserved residue found in nearly all LPS structures. For example, the minimal LPS structure required for growth of *E. coli* is made of two KDO residues attached to lipid A ($KDO_2$-lipidA), indicating the importance of KDO in maintaining the integrity and viability of the bacterial cell. The biosynthesis pathway of LPS structures is initiated by the enzyme d-arabinose 5-phosphate (A5P) isomerase (API/KdsD/yrbH), which converts the pentose pathway intermediate D-ribulose 5-phosphate into A5P. Subsequently, A5P is condensed with phosphoenolpyruvate to form KDO 8-phosphate (KD08P) by KDO 8-phosphate synthase, hydrolysed to KDO by KDO 8-phosphate phosphatase, activated as the sugar nucleotide CMP-KDO by a CMP-KDO synthase, before finally being transferred from CMP-KDO to the acceptor lipid IVA by a KDO synthase. The lauroyl and myristoyl-acyl carrier protein dependent acyltransferases transfer the fatty acids laurate and myristate, respectively, to KDO2-lipid IVA to form the characteristic acyloxyacyl units of hexaacylated KDO-lipid A.

The disruption in a gene of the LPS biosynthetic pathway is performed by at least one genetic modification in a gene encoding a protein selected from the group consisting of D-arabinose 5-phosphate isomerase, KDO8P synthase, CMP-KDO synthetase, KDO8P phosphatase and KDO transferase. Such a modification can be a modification in the expression or the coding sequence of the genes encoding the listed proteins. Such modifications can provide a reduced expression or an abolished expression of one or more genes encoding such D-arabinose 5-phosphate isomerase, KDO8P synthase, CMP-KDO synthetase, KDO8P phosphatase and/or KDO transferase.

The disruption in the outer membrane biosynthetic pathway can be due to at least one modification in a gene or expression of a gene encoding for the protein selected from the group consisting of gutQ, kdsD, kdsA, kdsB, kdsC and waaA, wherein gutQ and kdsD encode a D-arabinose 5-phosphate isomerase, kdsA encodes a KDO8P synthase, kdsB encodes a CMP-KDO synthetase, kdsC encodes a KDO8P phosphatase and waaA encodes a KDO transferase. In some embodiments, the at least one genetic modification reduces or inhibits the expression of the genes. In some embodiments, the viable host cell with modified outer membrane biosynthetic pathway leading to disruption of said pathway, comprises a mutation in the expression or the coding sequence of any one or more of the genes encoding for the proteins selected from the group of poly-β-1,6-N-acetyl-D-glucosamine outer membrane porin, poly-β-1,6-N-acetyl-D-glucosamine N-deacetylase, and/or poly-N-acetyl-D-glucosamine synthase and displays Lipid IVA in the outer membrane. Such a cell is additionally modified in at least one gene or the expression of at least one gene encoding for a protein selected from the group consisting of lauroyl acyltransferase and myristoyl-acyl carrier protein-dependent acyltransferase. The modification can be a modification in the expression or the coding sequence of the genes encoding the listed proteins. Such a modification provides a reduced expression or an abolished expression of one or more genes encoding such lauroyl acyltransferase and myristoyl-acyl carrier protein-dependent acyltransferase. lpxL and lpxM genes encode fatty acid transferases involved in membrane formation. In some embodiments, the host cell can be modified in at least one gene or the expression of at least one gene selected from the group consisting of lpxL and/or lpxM.

Provided herein are non-toxic or reduced toxin (e.g., endotoxin free) cells (e.g. gram-negative bacterial cells such as E. coli). The present disclosure is not limited to a particular method of providing non-toxic cells. In some embodiments, non-toxic cells are provided through suppression of LPS expression. The present disclosure is not limited to a particular method of suppressing LPS expression. In some embodiments, LPS expression is suppressed through suppression of API/KdsD/yrbH protein expression. In some embodiments, API/KdsD/yrbH expression is suppressed through suppression of KDO protein expression. In some embodiments, KDO protein expression is suppressed through, for example, modification of the gutQ gene and the kdsD gene. In some embodiments, KDO protein expression at the outer membrane does not occur due to the KDO protein not associating with Lipid IVA, such that only Lipid IVA is transported to the outer membrane. For example, modifications in gutQ, kdsD, kdsA, kdsB, waaA msbA, and/or yhjD genes or mutations of any other biosynthetic, processing, or trafficking genes eliminate the formation of or membrane presentation of the (KDO)2-Lipid IVA complex, resulting in, for example, only the Lipid IVA molecule being transported to the outer membrane and no subsequent LPS formation.

In some embodiments, non-toxic gram-negative bacteria are used as hosts for the production of endotoxin free biomolecules. The present disclosure is not limited to particular biomolecules. Traditionally, the production of biomolecules in Gram negative bacteria, whether it be outer membrane vesicles for vaccines, LPS type molecules (such as monophosphoryl lipid A (MPLA)) to be used as adjuvants, recombinant pharmaceutical proteins, macromolecules, or DNA for mammalian cell transfection/gene therapy, is plagued by the presence of endotoxin from the bacterial host. Contamination of the therapeutic molecule with endotoxin is a concern, as the immunogenic potential of LPS is well documented. Current production strategies to alleviate endotoxin contamination include various purification techniques, such as the kits marketed for endotoxin free DNA plasmid purification, followed by assays to measure endotoxin levels. As such, the non-toxic gram-negative bacterial cells of the present disclosure (e.g., the endotoxin-free cells) provide improved methods of isolating endotoxin free biomolecules. Accordingly, as some cells of the present disclosure do not produce endotoxin, such purification steps are not required. For example, the endotoxin-free cell of the present disclosure can be a host for the production of commercially important biomolecules in an endotoxin-free environment using Gram-negative bacteria. Additionally, cells comprising a modification in a gene encoding any one or more of a D-arabinose 5-phosphate isomerase, a KDO8P synthase, a CMP-KDO synthetase, a KDO8P phosphatase and/or a KDO transferase, an ATP-dependent translocator, an inner membrane protein (e.g., gutQ, kdsD, kdsA, kdsB, waaA msbA, yhjD genes), or modifications in any other biosynthetic, processing (e.g., lpxL or lpxM), or trafficking bacterial genes can be hosts for the production of commercially important biomolecules in an endotoxin-free environment using Gram-negative bacteria.

In some embodiments, a gene implicated in endotoxin production as described herein is itself modified to eliminate or reduce endotoxin production. In some embodiments, a non-coding portion of a gene implicated in endotoxin production as described herein is modified to eliminate or reduce the endotoxin production, such as a promotor, a polyadenylation site, a 5' untranslated region, or a 3' untranslated region. In some embodiments, an upstream or downstream gene that affects endotoxin production as described herein is modified to eliminate or reduce endotoxin production.

In some embodiments, a lauroyl and/or myristoyl acyltransferase polypeptide to be modified has at least 85% amino acid sequence identity to GenBank Accession No. ANQ15862 or a fragment thereof having lauroyl and/or myristoyl transferase activity. An exemplary lauroyl and/or myristoyl acyltransferase amino acid sequence follows:

(SEQ ID NO: 3)
```
  1 mskdkqmqpe fslsllhprn wgvwigfgll aiivnilpyr lllslgqsvg klgmrygkkr 61 vhvakrnlel afpdksqedi ehivtenfkn tgmalietgi twfwptwrfk tllvekdvga 121 lkekaqegkg vllccvhaln leitarafav mglagygafr phdnpaynfi qywgrthngn
```

```
181 klidrkdvkk mirvlrsger lfylpdhdyg rnksvyvpff avedactttg tsilaytskc 241 aivpgsgfrn eqgkyeiiad kcieadypqk devaaaaymn kyveevilra peqwmwlhkr 301 yktmqdenvp kgiryr
```

In some embodiments, a lauroyl and/or myristoyl transferase polynucleotide encodes a lauroyl and/or myristoyl transferase polypeptide. An exemplary lauroyl and/or myristoyl transferase polynucleotide sequence to be modified is provided at GenBank Accession No. CP016347 (REGION: 198524..199474), which is reproduced below:

```
                                                              (SEQ ID NO: 4)
  1 ttatctgtag cgaatgcctt ttggcacgtt ttcatcctgc atggttttgt agcgcttatg 61 cagccacatc cattgttcag gagcgcgtaa gatgacttct tccacgtatt tgttcatgta 121 cgctgcggcg gcaacttcgt cttttttgcgg ataatcggct tcaatgcatt tatctgcaat 181 gatttcatac ttgccctgct cattacggaa gcctgaaccc ggaacaatgg cacacttcga 241 tgtataagcc agaatgcttg tacctgtggt ggtacacgca tcttctactg cgaagaatgg 301 tacatacacc gatttgttgc gtccgtaatc gtggtcaggt aggtagaaca gacgttcacc 361 actacgcagc acgcgaatca tcttttttcac gtctttacgg tcaatcagtt tgttgccgtt 421 atgggtgcgg ccccagtact gaataaaatt gtaagctggg ttgtcatgtg gacgaaacgc 481 gccgtaaccc gcaagtccca tgactgcaaa agcacgtgcg gtaatttcaa ggttcaatgc 541 atgcacacag cagagtagga cgccttttcc ttcttgcgcc ttttctttca gagcaccaac 601 atcttttttcc actagcagcg ttttaaagcg ccaagttggc cagaaccagg taatgccggt 661 ttcgatcagt gccatgccgg tgttttttgaa gttttcggta acgatatgtt cgatgtcttc 721 ttgagacttg tccggaaaag ccaactcaag gttacgcttt gcgacgtgta ctcgtttttt 781 accataacgc atgccgagct tacccaccga ttggcccaac gacagaagca agcggtaagg 841 aagaatatta acgatgatcg ccagtagacc aaaccctatc catacccccc agttacgtgg 901 atggagaagg gaaagagaaa actctggctg catttgtttg tctttactca t
```

In some embodiments, a lauroyl and/or myristoyl acyltransferase polypeptide to be modified has at least 85% amino acid sequence identity to GenBank Accession No. ANQ17067 or a fragment thereof having lauroyl and/or myristoyl transferase activity. An exemplary lauroyl and/or myristoyl acyltransferase amino acid sequence follows:

```
                                                              (SEQ ID NO: 5)
  1 mnkqkepvfe arflmprywg tlliigvmyl lsllpfkfql flgrnigrla mrlmkkrqvt 61 irrnlelcfp kmdeskreai lkanidnsgi alfetamawf wsdrrvnkhv tikgmehlea 121 lerdgkgvlm lavhsmnlel garafgiqks gmgvyrpnnn pcfdyfqykg rsrsnrtlid 181 rknvrgmlda lnsgnrvwya pdhdygtrrs tfaplfavkn actttgtsll vdatdcaivp 241 ftmvrgddgh ytltirkpvd gfpkgdtrna aifinkivee simaspsqym wlhrrfktrp 301 qgedclynpq lipams
```

In some embodiments, a lauroyl and/or myristoyl transferase polynucleotide encodes a lauroyl and/or myristoyl transferase polypeptide. An exemplary lauroyl and/or myristoyl transferase polynucleotide sequence to be modified is provided at GenBank Accession No. CP016347 (REGION: 1624028..1624978), which is reproduced below:

```
                                                      (SEQ ID NO: 6)
  1 atgaacaaac aaaaagagcc tgttttcgag gctcggttcc taatgcctcg gtactgggga 61 actctactca tcatcggggt gatgtattta cttagtcttc ttcctttcaa atttcagtta 121 ttcctgggac gtaacattgg ccgtttggcc atgcgattaa tgaaaagcg tcaggtcacc 181 attcgtcgca atttagagct ctgtttcccg aagatggacg agagcaaacg agaagcgata 241 ctgaaggcca acatcgataa ttctggcatt gcactgtttg agacagcgat ggcttggttc 301 tggtcggatc gcagggttaa taaacacgta acgataaaag ggatggaaca cctagaagcg 361 ttagaaaggg acggtaaagg ggtgctgatg cttgccgttc attccatgaa cttagagctg 421 ggtgcacgtg catttggcat tcaaaaatct ggaatgggtg tttatcgacc gaataacaac 481 ccttgttttg actattttca gtacaagggt cgttcgcgtt ccaatcgtac tttgatcgat 541 cgtaaaaatg ttagaggaat gctggatgct ttgaattcag gcaatcgcgt ttggtatgcg 601 cctgaccatg attatggaac cagaagatcg acctttgcgc ctttgtttgc tgtcaaaaac 661 gcctgtacca caacaggcac cagtttactt gtcgatgcta cagattgtgc cattgtgccg 721 tttaccatgg taagagggga tgatggccat tacacattaa cgatcaggaa gccagttgat 781 ggatttccta aaggtgatac ccgaaacgcg gcgatttta tcaataaaat tgttgaagag 841 tcgattatgg ccagccctag tcaatacatg tggttacacc gccggtttaa aaccagaccg 901 caaggtgaag attgtttgta caatcctcag ttaatcccag cgatgagtta g
```

In some embodiments, a D-arabinose 5-phosphate isomerase (KdsD/yrbH) polypeptide to be modified has at least 85% amino acid sequence identity to GenBank Accession No. ANQ18079 or a fragment thereof having isomerase activity. An exemplary KdsD amino acid sequence follows:

```
                                                      (SEQ ID NO: 7)
  1 msrqfdfraa akqvldieva alqeldkyfd dqfegacemi lsnsgkvvim gmgksghign 61 kiaatlastg tsaffvhpge ashgdlgmis agdiviaisn sgesheilsl fpvlkrlnik 121 iismtgkpes nmaqlsdlhl qitvpqeacp lglaptsstt atlvmgdala vallqargfs 181 aedfalshpg galgrklllk lsdimhfgna lpkvspdsli rdalleisek glgmtaivde 241 hdamlgiftd gdlrrtldkr idihttaige vmtqspttah pdmlavegln lmqskninal 301 ilcnngkvvg alnmhdllka gvm
```

In some embodiments, a D-arabinose 5-phosphate isomerase (KdsD/yrbH) polynucleotide encodes a KdsD polypeptide. An exemplary KdsD polynucleotide sequence to be modified is provided at GenBank Accession No. CP016347 (REGION: 2865123..2866094), which is reproduced below:

```
                                                      (SEQ ID NO: 8)
  1 atgtcccgtc aatttgattt tcgcgctgct gcaaagcaag ttcttgatat tgaagttgcc 61 gctctgcaag agctggataa atactttgat gaccaatttg aacaagcttg cgaaatgata 121 ctttccaata gcggaaaagt ggtcatcatg gcatgggca atcaggcca cattggaaat 181 aaaattgcgg cgacgcttgc aagtacaggg acttcggcgt ttttgttca tccgggtgaa 241 gcttcacatg gtgacttagg tatgatcagc gccggagaca ttgtgattgc catttcaaac 301 tctggcgaat cccatgagat cctgtcgctg ttcccggtat tgaaacgctt aaacatcaag 361 atcatcagca tgacgggcaa gccagaatcg aacatggcgc aactgtcaga tttgcactta 421 cagatcacgg taccacaaga agcctgccct cttggtttgg caccaaccag cagtacaaca
```

```
-continued 481 gcaacgttag tcatgggcga tgccttggcg gttgcgctgc ttcaggctcg tggattctcc 541 gctgaagatt tcgcgctgtc acaccccggt ggtgcactag gaagaaaact gctgcttaag 601 ttgtctgata ttatgcattt tggaaatgct ctgccgaaag tctctcctga ttcgctgatt 661 cgcgacgcac ttctggagat ttctgaaaaa ggactgggga tgaccgccat tgtcgatgag 721 cacgatgcta tgcttggtat attcactgat ggcgacttac gcagaacttt agacaagcgt 781 attgatattc atacaaccgc cattggcgaa gtgatgacgc aaagcccaac aactgcgcat 841 ccagacatgc ttgcagttga aggtctcaac ctaatgcaaa gcaaaaatat caatgcgctg 901 attttatgta ataacggtaa agtggtcggt gcacttaata tgcatgattt actaaaagcg 961 ggtgtgatgt aa
```

Endotoxin refers to complex lipopolysaccharide (LPS) substances present in the outer membranes of gram-negative organisms such as *E. coli, Vibrio* spp., and others. These substances are collectively called "endotoxin" and are toxic to mammals and other vertebrates. Endotoxin can be released when cells are disrupted or otherwise disintegrate. Thus, when these organisms are used to clone nucleic acids, vectors, plasmids or produce proteins, polypeptides, or peptides or other biomolecules the products can be contaminated with unacceptable levels of endotoxin. The engineered or genetically-modified cells (e.g., bacterial cells such as *Escherichia* spp., *Vibrio* spp. organisms) described herein are substantially lower in an in vitro endotoxin assay compared to a natural, unmodified, or wild type organism under the same conditions, i.e. the recombinant organisms produce or contain substantially less endotoxin or LPS substances, or are substantially less endotoxic to humans and other mammals (e.g., canines, felines, equines, bovines, or porcines). By substantially less endotoxin or less endotoxic is meant that the organism can have less than 50% or less than 40% or less than 30% or less than 20% or less than 10% or less than 5% or less than 3% or less than 2% or less than 1% or less than 0.90% or less than 0.50% or less than 0.10% of the endotoxin content compared to a corresponding unmodified or wild type bacterial cells (e.g., *Escherichia* spp., *Vibrio* spp. organisms) (or one that does not have the genetic modification to API, lpxL, and/or lpxM) cultivated and measured under the same conditions. The endotoxin content or concentration, or the endotoxicity of the compared organisms can be measured using any generally accepted in vitro endotoxin assay, such as any of those accepted in the field as being a valid endotoxin assay, e.g., the HEKTm-Blue LPS assay, which can measure the activation of the TLR4 receptor to an endotoxin sample from an organism.

The engineered or genetically modified cells described herein can also produce an endotoxin concentration of less than 50% or less than 40% or less than 30% or less than 20% or less than 10% or less than 5% or less than 1% or less than 0.50% or less than 0.10% of the endotoxin concentration produced by an unmodified or wild type *E. coli* organism (or one that does not have a genetic modification to an LPS biosynthesis gene such as API, lpxL, and/or lpxM) cultivated under corresponding conditions. In some embodiments BL21(DE3) can be used as the unmodified or wild type *E. coli*. The endotoxin concentration or level can be determined using any generally accepted LPS or endotoxin assay, such as an in vitro LPS or endotoxin assay accepted in the field.

The engineered or genetically modified cells described herein can also produce an endotoxin-induced immune response of less than 50%, or less than 40%, or less than 30%, or less than 20%, or less than 10%, or less than 5%, or less than 1%, or less than 0.50%, or less than 0.10% of the response of an *E. coli* organism comprising a deletion of gutQ, kdsD, lpxL, lpxM, pagP, lpxP, and eptA, or any sub-combination of them produced under the same or corresponding conditions. The compared *E. coli* organism can also comprise a compensating mutation in the msbA gene (e.g., msbA148) (*E. coli* cells having all of the above deletions and the msbA mutation are commercially available under the trademark name ClearColi®). The endotoxin-induced immune response (or endotoxicity) can be determined or measured using an in vitro LPS or endotoxin assay. The immune response or endotoxicity can be relative to, or with respect to, the immune response in a human or other mammalian cell, and can measure activation of the TLR4 receptor. [The engineered or genetically-modified cells described herein can also have or produce less endotoxin (in the lower amounts stated herein and above) than the aforementioned *E. coli* organisms (e.g., the "ClearColi®" organism), which endotoxin amount can be measured using an endotoxin-induced immune response.]

The engineered or genetically modified cells described herein can have an average endotoxin level for purified LPS molecules of less than 50 EU/ml, or less than 25 EU/ml, or less than 15 EU/ml, or less than 10 EU/ml, or less than 5 EU/ml, or less than 5 EU/ml, or less than 4 EU/ml, or less than 3 EU/ml, or less than 2 EU/ml, or less than 1 EU/ml, or less than 0.80 EU/ml, or less than 0.70 EU/ml, or less than 0.50 EU/ml, or less than 0.30 EU/ml, or less than 0.20 EU/ml, or less than 0.10 EU/ml, as measured in an in vitro endotoxin assay. The endotoxin level can be measured according to any generally accepted method. Any of the cells described herein can also have the stated endotoxin levels disclosed herein within plus or minus 10% of the stated value.

Essential Genes

Disclosed herein are cells comprising a genetic modification that results in elimination or reduced expression of a polypeptide encoded by an essential gene, the absence of which is detrimental to the growth of the cell, as compared to an otherwise comparable cell lacking the genetic modification that results in elimination or reduced expression of the polypeptide encoded by said essential gene. In some embodiments, the genetic modification comprises disabling, reducing, or knocking out one or more essential genes required for cell growth and/or survival. Any essential gene can be disabled, reduced, or knocked out. For example, enzymes that are required for metabolizing specific nutrients or synthesizing specific nutrients (e.g., an amino acid, sugar, or other nutrient) can be disabled and the resulting cells will only grow and/or survive if that nutrient is provided. Other essential genes include, but are not limited to, DNA synthesis genes (such as thy A), cell wall synthesis genes (such as dapA), and amino acid genes (such as serA and metA). In some embodiments, a reduction or elimination of polypeptide encoded by the essential gene can be cured by introduction of the polypeptide delivered exogenously, either directly or indirectly in order to reestablish cell survival in the presence of the polypeptide. For example, a plasmid encoding a copy of the essential gene or functional equivalent or functional variant thereof can be introduced in order to facilitate cell survival. The exogenous copy of the essential gene or functional equivalent or functional variant thereof can then be used as a marker for cell transformation.

Examples of other essential genes that can be disabled, reduced, or knocked out in a genetically modified bacteria of the present disclosure include, but are not limited to yhbV, yagG, hemB, secD, secF, ribD, ribE, thiL, dxs, ispA, dnaX, adk, hemH, lpxH, cysS, fold, rplT, infC, thrS, nadE, gapA, yeaZ, aspS, argS, pgsA, yefM, metG, folE, yejM, gyrA, nrdA, nrdB, folC, accD, fabB, gltX, ligA, zipA, dapE, dapA, der, hisS, ispG, suhB, tadA, acpS, era, me, ftsB, eno, pyrG, chpR, lgt, fbaA, pgk, yqgD, metK, yqgF, plsC, ygiT, pare, ribB, cca, ygjD, tdcF, yraL, yihA, ftsN, murI, murB, birA, secE, nusG, rplJ, rplL, rpoB, rpoC, ubiA, plsB, lexA, dnaB, ssb, alsK, groS, psd, om, yjeE, rpsR, chpS, ppa, valS, yjgP, yjgQ, dnaC, ribF, IspA, ispH, dapB, folA, imp, yabQ, ftsL, ftsI, murE, murF, mraY, murD, ftsW, murG, murC, ftsQ, ftsA, ftsZ, lpxC, secM, secA, can, folK, hemL, yadR, dapD, map, rpsB, infB, nusA, ftsH, obgE, rpmA, rplU, ispB, murA, yrbB, yrbK, yhbN, rpsI, rplM, degS, mreD, mreC, mreB, accB, accC, yrdC, def, fmt, rplQ, rpoA, rpsD, rpsK, rpsM, entD, mrdB, mrdA, nadD, hlepB, rpoE, pssA, yfiO, rplS, trmD, rpsP, ffh, grpE, vfjB, csrA, ispF, ispD, rplW, rplD, rplC, rpsJ, fusA, rpsG, rpsL, trpS, yrfF, asd, rpoH, ftsX, ftsE, ftsY, frr, dxr, ispU, rfaK, kdtA, coaD, rpmB, dfp, dut, gmk, spot, gyrB, dnaN, dnaA, rpmH, mpA, yidC, tnaB, glmS, glmU, wzyE, hemD, hemC, yigP, ubiB, ubiD, hemG, secY, rplO, rpmD, rpsE, rplR, rplF, rpsH, rpsN, rplE, rplX, rplN, rpsQ, rpmC, rplP, rpsC, rplV, rpsS, rplB, cdsA, yaeL, yaeT, lpxD, fabZ, lpxA, lpxB, dnaE, accA, tilS, proS, yaff, tsf, pyrH, olA, rlpB, leuS, lnt, glnS, fldA, cydA, infA, cydC, ftsK, lolA, serS, rpsA, msbA, lpxK, kdsB, mukF, mukE, mukB, asnS, fab A, mviN, me, yceQ, fabD, fabG, acpP, tmk, holB, lolC, lolD, lolE, purB, ymffC, minE, mind, pth, rsA, ispE, lolB, hemA, prfA, prmC, kdsA, topA, ribA, fabl, racR, dicA, ydfB, tyrS, ribC, ydiL, pheT, pheS, yhhQ, bcsB, glyQ, yibJ, and gpsA.

In some embodiments, an essential gene as described herein is itself modified to eliminate or reduce the expression of the polypeptide encoded by an essential gene. In some embodiments, a non-coding portion of essential gene as described herein is modified to eliminate or reduce the expression of the polypeptide encoded by an essential gene, such as a promotor, a polyadenylation site, a 5' untranslated region, or a 3' untranslated region. In some embodiments, an upstream or downstream gene that affects expression of the polypeptide encoded by an essential gene as described herein is modified to eliminate or reduce the expression of the polypeptide encoded by an essential gene.

In some embodiments, the genetically-modified bacterial cells having a genetic modification to an essential gene where the essential gene is an endogenous DNA strand exchange gene. In some embodiments, the endogenous DNA strand exchange gene has a polynucleotide sequence of:

```
                                                     (SEQ ID NO: 1)
atgaataaatcggagaaagtaatggacgagaacaaacagaaagcgctcgccgctgcgctaggtcaaattga aaaacaattcggtaaaggctcaatcatgcgccttggcgataaccgcgcaatggacgtagaaaccatctcaa cgggttctctttctcttgatatcgctttgggtgctggtggcttaccgatgggccgtattgttgaagtatac ggtccggaatcttcgggtaaaacgacactaactcttgaacttattgcagcagcacagcgtgaaggcaaaac ttgtgcgtttatcgatgcggagcacgctctggatcctgtatacgcgaagaagcttggcgtagatatcgatg cacttttggtttctcagcctgatacgggtgagcaagcgctagaaatctgtgacgcattagcgcgctctggt gctatcgacgtaatggttgtcgactctgtggcagcactgactccaaaagcagaaatcgaaggcgaaatggg cgacagccacatgggtctccaagctcgtatgctttctcaagcgatgcgtaagctaacaggtaacctgaagc agtctaactgtatgtgtatcttcatcaaccaaatccgtatgaagattggtgtgatgttcggtaacccagaa acaacaactggcggtaacgcacttaaattctacgcatcggttcgtcttgatatccgtcgtactggcgcaat caaagaaggcgacgaagttgtaggtaacgaaactcgcatcaaagtcgttaagaacaagattgcagcaccat ttaaagaagcaaacacgcagatcatgtatggtcaaggctttaaccgcgaaggtgagctggtagacttaggc gtgaagcacaaactggttgaaaaagcaggtgcttggtacagctacaatggcgacaagatcggtcagggcaa agcaaatgcttgtaattacctgcgtgaacatacagaagttgctcagactatcgacaagaaacttcgtgaga tgcttttgtctccagctgtagctgagggacctgaagccggtgaaatgccagagaagaaagaagaagagttt taa
```

In some embodiments, the genetically-modified bacterial cells having a genetic modification to an essential gene where the essential gene is an endogenous DNA strand exchange gene. In some embodiments, the endogenous DNA strand exchange gene has a polynucleotide sequence of:

(SEQ ID NO: 2)

```
atgaaatacctgttctctttattcattcttgcactatccagtgccgccgtggccgcgccaccaagttcatt ttcagccgctaagcgcgaagcggtaaaaatctatcaagatcatcccaccagcttttattgcggctgtgata ttcaatggcaaggcaagaaaggcttacctgatctttcctcttgtggttaccaggttcgcaaacaagaaaag cgtgcttcacgcatcgagtgggaacatgtcgttccagcttggcaatttgggcaccagctgcaatgctggca aagcggtggtcgtaaaaactgctcgcgtaatgacaaaacattccgctcaatggaagccgatctgcacaacc tgactcctgcgattggtgaggtaaatggtgatcgctctaactacaatttcagtcagtggaatgggatcgat ggcgcaacctatggtcgttgtgaagtccaggtaaacttcaagcaacgcaaagtcatgccacccgatcgagc acgcggctccatcgctcgtacctatctttatatgagcaaggagtacggcttcaaactgtccaagcaacaaa ctcagttaatgagtgcatggaacaaaacctacccagccgataaatgggaatgcgaacgcgataagcgcatt gccaaagtacaaggcaaccataatccattcgttcaagaggcctgtcgcgcactgtaa
```

One central biosynthesis pathway relates to nicotinamide adenine dinucleotide (NAD) biosynthesis. NAD is a coenzyme central to metabolism. Found in all living cells, NAD is called a dinucleotide because it consists of two nucleotides joined through their phosphate groups. One nucleotide contains an adenine nucleobase and the other nicotinamide. NAD exists in two forms: an oxidized and reduced form, abbreviated as NAD+ and NADH (H for hydrogen), respectively.

In metabolism, nicotinamide adenine dinucleotide is involved in redox reactions, carrying electrons from one reaction to another. The cofactor is, therefore, found in two forms in cells: NAD+ is an oxidizing agent—it accepts electrons from other molecules and becomes reduced. This reaction, also with H+, forms NADH, which can then be used as a reducing agent to donate electrons. These electron transfer reactions are the main function of NAD. However, it is also used in other cellular processes, most notably as a substrate of enzymes in adding or removing chemical groups to or from, respectively, proteins, in posttranslational modifications.

In organisms, NAD can be synthesized from simple building-blocks (de novo) from either tryptophan or aspartic acid. As a general rule, most prokaryotes utilize the aspartate de novo pathway, in which the nicotinate moiety of NAD is synthesized from aspartate. Briefly, aspartic acid is converted to iminoaspartic acid by nadB, which is then converted to Quinolinic acid by nadA. Quinolinic acid is then converted to nicotinic acid mononucleotide by nadC, which is then converted to nicotinic acid adenine dinucleotide by nadD. Lastly, nicotinic acid adenine dinucleotide is converted to nicotinamide adenine dinucleotide (NAD) by either nadE1 or nadE2 through either an amine dependent or glutamine dependent pathway.

In some embodiments, a genetically-modified cell of the present disclosure can comprise a genetic modification that results elimination or reduction in expression of a polypeptide encoded by any one or more of the genes associated with the NAD biosynthesis pathway, including nadA, nadB, nadC, nadD, nadE1, and nadE2.

In some embodiments, a nicotinamide adenine dinucleotide synthetase (NadE) polypeptide to be modified has at least 85% amino acid sequence identity to GenBank Accession No. UUIT4161.1 or a fragment thereof having synthetase activity. An exemplary NadE amino acid sequence follows:

(SEQ ID NO: 9)

```
  1  mkklhisscs lnqtpmdwsg nlhniqkaik iahqagaell itpelcisgy gcedffhsph
 61  vseralksvs dltqsipnsm avsvglpvmi nnrvyngval vthegiqgis lkrnlaangl
121  hyeqrwftpw trdknatvvl kegtppvrvg nlvysvngvk vgfeicedaw vadrtserff
181  nqgvevianp sashfsigks ltrkrlvees srvysacyvy snlsgcesgr aiydagvmia
241  vdgslvakge rfhmsdvevv tadidlsrsr igqinssqry yeehdfdtea vvkvtlsksl
301  sspklhvppl nqpwedseyl eheealraia iglrdwirkt htggyalsls ggadsalvas
361  avytsvilel welvtktekd decslpdhls qflsedqrsk fkqagssnkl eqfvrdtasa
421  imanmlttay qasansgsvt rtaaqkvaes fgakflnlsv aevvknyesm iskatnleln
481  wndhdialqn iqarvrspsi wfianlenkl llttsnmseg avgyctmdgd ssgvlapisg
541  vtksrilkll vwleqkgfyc tgnhimklea lsyinnqrpt aelrpeeqsd eedlmpydvl
601  drmvfltlea gmsprdifda mteefervdn qtmatyivkf fkllfrnqwk rdrqapgfhi
661  elnsldpkty krfpllssgy qeelafiedn cwmkds
```

In some embodiments, a nicotinamide adenine dinucleotide synthetase (NadE) polynucleotide encodes a NadE polypeptide. An exemplary NadE polynucleotide sequence to be modified is provided at GenBank Accession No. CP101906.1, which is reproduced below:

(SEQ ID NO: 10)

```
   1 gtgaagaaac tgcatattag ctcatgctca ctaaaccaga ctccaatgga ttggagtgga
  61 aacctgcata acattcaaaa agcaatcaag attgcacatc aagctggagc cgaactgctt
 121 attacgccag agttgtgtat ttctggttat ggctgtgaag atttttcca tagtcctcat
 181 gtctctgagc gcgcactgaa aagtgtctct gacctaacgc agtcgattcc caatagcatg
 241 gcggtatctg ttggcttacc cgtgatgatt aacaatcggg tttacaacgg tgttgcgctg
 301 gttacgcatg aaggaattca aggcatctct ctaaagcgga atttagctgc gaatggcctt
 361 cattatgagc aacgttggtt tacgccatgg actcgagata aaaacgcgac ggtggtactc
 421 aaagaaggga caccacctgt gcgtgttggc aatctggttt acagcgttaa cggtgtcaaa
 481 gttggctttg aaatctgcga ggatgcctgg gttgccgacc gcacttcaga acgtttcttc
 541 aaccaaggtg ttgaagtgat tgctaaccca agtgctagtc acttttcgat aggtaaatct
 601 ctcactcgta agcggctggt ggaagagtca agccgcgtat attcggcctg ttatgtgtat
 661 tccaatctat cagggtgtga atctgccgg gcaatttatg atgctggcgt gatgattgcg
 721 gttgatggca gtttggttgc caaaggcgaa cgttttcaca tgagtgatgt ggaggttgta
 781 acggccgata tcgacttatc ccgcagcagg attggccaaa tcaatagtag tcaacgctat
 841 tatgaggaac atgactttga tacagaggct gtcgtcaaag taacgctcag taaatctctt
 901 agctctccca agttgcatgt accgccgcta aatcagcctt gggaagatag tgaatatttg
 961 gaacatgaag aagctttgcg tgcgatagca ataggtttac gtgattggct tcgaaaaacg
1021 cacactggtg gctacgcgct ttcattaagt ggcggagcag actctgcttt ggtcgctagt
1081 gctgtttata catccgttat cctggaactt tgggagctgg ttaccaaaac agagaaagat
1141 gacgagtgtt cactaccaga ccatttgagt caatttttga gcgaagatca aaggagtaaa
1201 ttcaaacagg cggggtcctc aaacaaacta gagcaattcg tcagggatac ggcatcagca
1261 ataatggcga acatgctgac aactgcgtat caggccagcg cgaacagcgg ttccgttact
1321 cgtactgctg cgcaaaaagt agcggagtca tttggtgcga aatttctaaa cctcagtgtt
1381 gccgaggtgg tgaagaatta cgagtcgatg atatcaaaag caaccaatct agagctcaat
1441 tggaatgatc atgatattgc gctgcaaaat attcaggcac gtgtgcgctc tccaagtatt
1501 tggttcatcg ctaatctgga aaataaactg ctgctgacaa cgagcaacat gtcggaaggg
1561 gcggtaggtt actgcacaat ggatggtgat tcttccggag tcctcgcacc tatttccggt
1621 gtcactaaaa gccgaattct caagttactg gtatggctag agcaaaaagg gttttattgc
1681 actggtaatc acatcatgaa gctagaagcg ctttcttata tcaataatca acgtccaacg
1741 gcggagttgc gccccgaaga acaaagtgat gaagaggatt tgatgcctta tgatgtgctc
1801 gatcgtatgg tttttttgac cttagaagcc ggtatgtcac caagggatat ttttgatgcg
1861 atgacggaag aatttgaacg cgtagacaac caaaccatgg ccacatatat cgtcaaattt
1921 tttaagttgc tgtttcgcaa tcaatggaaa cgcgatcgtc aggctccggg gtttcatatc
1981 gaactcaata gcctggatcc gaaaacctat aaacgttttc cgcttctaag ctctggatac
2041 caagaggagc tagccttcat cgaggataat tgctggatga aagacagcta g
```

Methylase Enzymes

In some embodiments, a genetically-modified cell can comprise a genetic modification that results in reduced methylation of DNA. When DNA polymerase makes an error resulting in a mismatched base-pair or a small insertion or deletion during DNA synthesis, the cell will repair the DNA by a pathway called mismatch repair. However, the cell must be able to differentiate between the template strand and the newly synthesized strand. In some bacteria, DNA strands are methylated by Dam methylase, and therefore, immediately after replication, the DNA will be hemimethylated. A repair enzyme, MutS, binds to mismatches in DNA and recruits MutL, which subsequently activates the endonuclease MutH. MutH binds hemimethylated GATC sites and when activated will selectively cleave the unmethylated daughter strand, allowing helicase and exonucleases to excise the nascent strand in the region surrounding the mismatch. The strand is then re-synthesized by DNA polymerase III.

Genetically-modified cells and expression systems containing the same are described herein that include a genetically modified methylase enzyme (e.g., with reduced or disabled activity), as well as uses thereof. In some embodiments, the engineered or genetically modified methylase enzyme is disabled, which thereby disables the mismatch repair pathway. The disabled methylase enzyme can allow for efficient gene editing compared to a comparable cell with a native methylase enzyme present. In other words, a gene edit in a cell with a disabled methylase may persist longer in the cell without being repaired by a mismatch repair pathway compared to a cell comprising a native methylase enzyme.

In some embodiments, a gene encoding a methylase as described herein is itself modified to eliminate or reduce the expression of the methylase. In some embodiments, a non-coding portion of a gene encoding a methylase as described herein is modified to eliminate or reduce the expression of the methylase, such as a promotor, a polyadenylation site, a 5' untranslated region, or a 3' untranslated region. In some embodiments, an upstream or downstream gene that affects expression of the methylase as described herein is modified to eliminate or reduce the methylase.

In some embodiments, a genetically modified methylase enzyme comprises a modified adenine methylase enzyme or modified cytosine methylase enzyme. In some embodiments, a modified methylase enzyme comprises a modified Class I methylase, or a modified class II methylase. In other embodiments, a modified methylase can comprise a modified histone methylase, a modified N-terminal methylase, a modified DNA adenine methylase (Dam), a modified RNA methylase, a modified natural product methylase, a modified non-S-adenosyl methionine (SAM) dependent methylase, or a modified radical SAM methylase. In some embodiments, the modified methylase is an RNA methylase.

In some embodiments, a DNA adenine methylase (Dam) polypeptide to be modified has at least 85% amino acid sequence identity to GenBank Accession No. ANQ18149.1 or a fragment thereof having methylase activity. An exemplary DNA adenine methylase amino acid sequence follows:

```
                                                            (SEQ ID NO: 11)
  1  mkkqraflkw  aggkyglved  iqrhlppark  lvepfvgags  vflntdydqy  lladinpdli 61  nlynlikarp  eeyiseakrw  fvaennrkea  ylsiraefnk  tddvmyrsla  flymnrfgfn 121  glcrynkkgg  fnvpfgsykk  pyfpeaelef  faekakkatf  vcegypetfr  rarkgsvvyc 181  dppyaplsnt  anftsyagng  ftlddqaala  diaertater  gipvlisnhd  ttltrrlyhg 241  adlsvvkvkr  tisrngsgrn  kvdellalfn  tpdsdsaas
```

In some embodiments, a DNA adenine methylase (Dam) polynucleotide encodes a DNA adenine methylase polypeptide. An exemplary DNA adenine methylase polynucleotide sequence to be modified is provided at GenBank Accession No. CP016347.1, which is reproduced below:

```
                                                            (SEQ ID NO: 12)
  1  ctatgaagca  gcgctgtctg  aatcaggggt  attaaaaagc  gccagcagtt  catcaacttt 61  atttcgacca  ctgccattac  ggctgatggt  gcgcttcact  tttaccacgc  tcaaatccgc 121  tccgtggtat  aaacgacgcg  ttaatgttgt  atcgtggttt  gaaatcagta  ccggaatgcc 181  gcgttcagtg  gcggttcttt  ccgcgatatc  ggccagtgcc  gcctgatcat  cgagcgtaaa 241  cccatttcct  gcataagagg  tgaagtttgc  ggtatttgaa  agcggcgcat  acggtggatc 301  gcagtaaaca  acactgcctt  tacgcgcacg  gcgaaacgtc  tcgggatagc  cttcacaaac 361  aaacgtggct  ttcttggctt  tttctgcaaa  gaactccagt  tcagcttcag  ggaaatacgg 421  tttcttgtat  gacccaaacg  ggacattgaa  accgcctttt  ttgttgtaac  ggcacaggcc 481  attaaaacca  aaacggttca  tgtaaagaaa  agcaagtgag  cgatacatca  cgtcgtcagt 541  cttgttgaac  tcagcgcgaa  tactcagata  agcttctttg  cggttatttt  cggccacgaa 601  ccagcgcttc  gcctcagaga  tatattcctc  cggacgcgct  taataaggt   tatacagatt 661  gatcaaatcc  gggttgatat  cagccagtaa  atactgatcg  taatctgtat  tcaaaaaaac 721  agagccagcg  ccaacaaaag  gttcaactag  ctttcgagcc  ggtggtaaat  gacgttggat 781  gtcttcaacc  agtccgtatt  ttcctcctgc  ccattttaga  aaggctcgtt  gcttttttcat
```

Deoxyribonucleases

In some embodiments, a genetically-modified bacteria cell can comprise a genetic modification that results in results in less phosphodiester cleavage of DNA, relative to an otherwise comparable cell that does not comprise said genetic modification that results in less phosphodiester cleavage of DNA. In some embodiments, the genetic modification that results in less phosphodiester cleavage of DNA comprises a modification to a Deoxyribonuclease (Dns) enzyme. DNS is an enzyme that catalyzes the hydrolytic cleavage of phosphodiester linkages in the DNA backbone, thus degrading DNA. A wide variety of deoxyribonucleases are known, which differ in their substrate specificities, chemical mechanisms, and biological functions.

Some DNases cut, or "cleave", only residues at the ends of DNA molecules (exodeoxyribonucleases, a type of exonuclease). Others cleave anywhere along the chain (endodeoxyribonucleases, a subset of endonucleases). Some Dnses are fairly indiscriminate about the DNA sequence at which they cut, while others, including restriction enzymes, are very sequence-specific. Some cleave only double-stranded DNA; others are specific for single-stranded molecules; and still others are active toward both.

In some embodiments, a genetically-modified cell can comprise a genetic modification that results in reduction or elimination of a polypeptide encoded by one or more deoxyribonuclease genes. In some embodiments, the one or more disabled Dns genes are replaced by one or more catalase genes.

In some embodiments, a gene encoding a methylase as described herein is itself modified to eliminate or reduce the expression of a deoxyribonuclease gene described herein. In some embodiments, a non-coding portion of the deoxyribonuclease gene as described herein is modified to eliminate or reduce the expression of the deoxyribonuclease gene as described herein, such as a promotor, a polyadenylation site, a 5' untranslated region, or a 3' untranslated region. In some embodiments, an upstream or downstream gene that affects expression of the deoxyribonuclease gene as described herein is modified to eliminate or reduce expression of the deoxyribonuclease gene.

In some embodiments, a catalase polypeptide to be added has at least 85% amino acid sequence identity to GenBank Accession No. EPM39386.1 or a fragment thereof having catalase activity. An exemplary catalase amino acid sequence follows:

```
                                                         (SEQ ID NO: 13)
  1  mailqigagg  vgwvvahkaa  qnndvlgdit  iasrtvgkce  kiiesiqkkn  nlkdstkkle 61  aravnaddvd  slvalikevk  pdlvinagpp  wvnmpimeac  yqakvsyldt  svavdlcseg 121  qqvpqaydwq  wgyrekfeea  gitgilgagf  dpgvvsvfaa  yavkhlfdei  dtidvmdvna 181  gdhgkkfatn  fdpetnmlei  qgdsfyweng  ewkqvpchsr  mlefefpncg  shkvysmahd 241  evrsmkefip  akriefwmgf  gdrylnyfnv  mrdigllspd  pltlhdgtvv  qplhvlkall 301  pdptslapgy  tgltcigtwv  qgkkdgkers  vfiynnadhe  vayedvehqa  isyttgvpai 361  taalqffrge  wadkgvfnme  qlnpdpflet  mpsigldwhv  qeleagqglp  vihelkk
```

In some embodiments, a catalase polynucleotide encodes a catalase polypeptide. An exemplary catalase polynucleotide sequence to be added is provided at GenBank Accession No. ATFJ01000037.1, which is reproduced below:

```
                                                         (SEQ ID NO: 14)
  1  ttactttta   agttcgtgga  taactggaag  tccctgacct  gcttcaagct  cttgaacatg 61  ccaatccaga  ccgatagaag  gcatggtttc  caggaacgga  tctgggttta  gctgttccat 121  attgaacaca  cctttatccg  cccactcgcc  acgaagaat  tgcagtgccg  cagtgatcgc 181  tggtacacct  gtggtgtaag  agatcgcctg  gtgctctacg  tcttcgtatg  ccacttcgtg 241  gtcagcattg  ttatagatga  agacactgcg  ctctttaccg  tctttcttac  cttgaaccca 301  agtaccgata  cacgttagac  cggtgtagcc  tggtgcaaga  gaagttggat  ctggtagtag 361  cgctttcaat  acgtgcagag  gctgtactac  tgtaccatcg  tgcagcgtta  gtggatctgg 421  gctcaatagg  ccgatatcac  gcattacatt  gaagtagttt  aggtaacggt  caccgaaacc 481  catccagaat  tcaatgcgtt  ttgcagggat  gaattccttc  attgaacgaa  cttcatcgtg 541  cgccattgag  tacactttgt  gtgaaccaca  gttagggaat  tcaaactcaa  gcatacgaga 601  gtgacaaggt  acttgtttcc  actcgccatt  ttcccagtag  aaagagtcgc  cttggatctc 661  tagcatgttg  gtttctgggt  cgaagtttgt  cgcaaacttc  ttaccgtggt  caccagcgtt 721  tacgtccatt  acgtcgatag  tatcgatttc  atcgaacaga  tgcttaactg  cgtacgctgc 781  aaataccgat  actacgcctg  gatcgaaacc  agcacctagg  atacctgtga  tgcccgcttc
```

```
-continued
 841 ttcgaacttc tcacggtaac cccactgcca atcataagcc tgaggtactt gctgaccttc 901 agaacacagg tcaactgcca ctgatgtatc caggtatgac actttcgctt ggtaacatgc 961 ttccatgatt ggcatgttta cccatggagg accagcgttg atcacaagat caggcttcac 1021 ttctttaata agagcaacaa gagaatctac gtcgtcagca ttaactgctc tagcttctaa 1081 tttcttagtt gaatctttca ggttgttttt cttctgaata gattcgatga ttttctcaca 1141 cttacctacg gtacgtgatg cgattgtgat atcacccaga acgtcgttgt tttgtgctgc 1201 tttgtgtgca actacccagc caacgccgcc tgcaccaatc tgtagaattg ccat
```

In some embodiments, a deoxyribonuclease (Dns) polypeptide to be modified has at least 85% amino acid sequence identity to GenBank Accession No. ANQ17872.1 or a fragment thereof having nuclease activity. An exemplary deoxyribonuclease amino acid sequence follows:

```
                                                            (SEQ ID NO: 15)
  1 mklfdthchf dfdvfqddfe hnlalaqeqg vsrilipsvg psnwsriqtl aekyshlyya 61 lgfhpyflee nfeqhlaele hylkqkppqc vaigecgldf aidvdpqlqe kvletqfela 121 rrfdlpvilh srkahnrlvq mvkaaklpkg gvvhafagsy qqamewvrlg ffigvggtit 181 ypraqktrda iqklalenll ietdapdmpi lgyqgqpnhp aklihvlnvl velrrgekqs 241 iasqlwknsn fafsice
```

In some embodiments, a deoxyribonuclease (Dns) polynucleotide encodes a deoxyribonuclease polypeptide. An exemplary deoxyribonuclease polynucleotide sequence to be modified is provided at GenBank Accession No. CP016347.1, which is reproduced below:

```
                                                            (SEQ ID NO: 16)
  1 ctattcacat attgagaagg caaaattgct atttttccac agttgcgacg caatcgattg 61 cttttctcct ctacgcaact ctacgagcac atttaataca tgaatgagtt tcgccgggtg 121 gttgggctgc ccctgatatc caagtatagg catatctgga gcgtctgttt cgataagtag 181 gttttctagg gctaattttt gaattgcgtc gcgggttttt tgggctcgtg ggtaggtaat 241 agtacccccct acaccgatga aaaaacctaa tctgacccac tccatcgctt gctgatagct 301 accagcaaaa gcatgtacga caccgccttt aggtagcttc gccgctttga ccatttgaac 361 aagtcgattg tgtgcttttc ggctatgtaa ataaccgga aggtcgaaac gtctggcgag 421 ctcaaattga gtttcaagca ccttttcttg caattgggga tcgacgtcaa tagcaaaatc 481 taatccgcac tcgcctattg caacgcactg tggcggcttt tgtttgagat aatgctccag 541 ctcagcaagg tgctgctcaa agttctcttc cagaaaatac ggatggaacc cgagcgcata 601 gtataagtgt gagtatttct cggctaaggt ttgaatgcgt gaccagtttg aaggtccgac 661 tgagggtatc aggattcggc tcaccccttg ttcttgagca agagccaggt tgtgctcaaa 721 atcatcctga aacacgtcaa aatcaaaatg acagtgcgta tcaaaaagct tcat
```

RecA Recombinase

In some embodiments, a genetically-modified bacteria cell can comprise a genetic modification that results in less DNA repair, relative to an otherwise comparable cell that does not comprise said genetic modification that results in less DNA repair. In some embodiments, the genetic modification is to a recombinase A (RecA) gene. RecA recombinase has multiple functions, all related to DNA repair. *E. coli* strains are often genetically modified to contain a mutant recA allele and thereby ensure the stability of extrachromosomal segments of DNA, known as plasmids. In a process called transformation, plasmid DNA is taken up by the bacteria under a variety of conditions (e.g., heat shock, electroporation). Bacteria containing exogenous plasmids are called "transformants". Transformants retain the plasmid throughout cell divisions such that the plasmids can be recovered and used in other applications. Without a functional RecA polypeptide, the exogenous plasmid DNA is left unaltered by the bacteria.

In some embodiments, a genetically-modified bacterial cell can comprise a genetic modification that results in RecA recombinase polypeptide being reduced or disabled, which can increase the stability of an unaltered plasmids. In other embodiments, a disabled RecA recombinase polypeptide can enable purification of the unaltered plasmid from bacterial cultures, which can then allow for use in other applications such as, for example, high-fidelity PCR amplification of the original plasmid sequence. In other embodiments, the one or more disabled RecA genes are replaced by one or more catalase genes, such as the exemplary catalase sequences provided herein.

In some embodiments, a gene encoding RecA as described herein is itself modified to eliminate or reduce the expression of a polypeptide encoded by RecA. In some embodiments, a non-coding portion of the RecA gene as described herein is modified to eliminate or reduce the expression of the polypeptide encoded by RecA as described herein, such as a promotor, a polyadenylation site, a 5' untranslated region, or a 3' untranslated region. In some embodiments, an upstream or downstream gene that affects expression of the RecA gene as described herein is modified to eliminate or reduce the expression of the RecA polypeptide.

In some embodiments, a RecA recombinase polypeptide to be modified has at least 85% amino acid sequence identity to GenBank Accession No. AAO18662.1 or a fragment thereof having DNA repair activity. An exemplary RecA recombinase amino acid sequence follows:

(SEQ ID NO: 17)

```
  1 mdenkqkala aalgqiekqf gkgsimrlgd nramdvetis tgslsldial gagglpmgri
 61 vevygpessg kttltlelia aaqregktca fidaehaldp vyakklgvdi dallvsqpdt
121 geqaleicda larsgaidvm vvdsvaaltp kaeiegemgd shmglqarml sqamrkltgn
181 lkqsncmcif ikqirmkigv mfgnpetttg gnalkfyasv rldirrtgai kegdevvgne
241 trikvvknki aapfkeantq imygqgfnre gelvdlgvkh klvekagawy syngdkigqg
301 kanacnylre htevaqtidk klremllspa vaegpeagem pekkeeef
```

In some embodiments, a RecA recombinase polynucleotide encodes a RecA recombinase polypeptide. An exemplary RecA recombinase polynucleotide sequence (promoter region and complete coding sequence) to be modified is provided at GenBank Accession No. AY198129.1, which is reproduced below:

(SEQ ID NO: 18)

```
   1 cgtgataagc tctgcggcaa agttatacgt agatcagcta aagttttttc tatacaggta
  61 tagacactgt atgaatcaac agtataataa ctttcattgc tgagcgatta actgctcaag
 121 aaaagtttaa tgactattcg tcgcccaaaa agatgaataa atcggagaaa gtaatggacg
 181 agaacaaaca gaaagcgctc gccgctgcgc taggtcaaat tgaaaaacaa ttcggtaaag
 241 gctcaatcat gcgccttggc gataaccgcg caatggacgt agaaaccatc tcaacgggtt
 301 ctctttctct tgatatcgct ttgggtgctg gtggcttacc gatgggccgt attgttgaag
 361 tatacggtcc ggaatcttcg ggtaaaacga cactaactct ggaacttatt gcagcagcac
 421 agcgtgaagg caaaacttgt gcgtttatcg atgcggagca cgctctggat cctgtatacg
 481 cgaagaagct tggcgtagat atcgatgcac ttttggtttc tcagcctgat acgggtgagc
 541 aagcgctaga aatctgtgac gcattagcgc gctctggtgc tatcgacgta atggttgtcg
 601 actctgtggc agcactgact ccaaaagcag aaatcgaagg cgaaatgggc gacagccaca
 661 tgggtctcca agctcgtatg ctttctcaag cgatgcgtaa gctaacaggt aacctgaagc
 721 agtctaactg tatgtgtatc ttcatcaagc aaatccgtat gaagattggt gtgatgttcg
 781 gtaacccaga aacaacaact ggcggtaacg cacttaaatt ctacgcatcg gttcgtcttg
 841 atatccgtcg tactggcgca atcaaagaag gcgacgaagt tgtaggtaac gaaactcgca
 901 tcaaagtcgt taagaacaag attgcagcac catttaaaga agcaaacacg cagatcatgt
 961 atggtcaagg ctttaaccgc gaaggtgagc tggtagactt aggcgtgaag cacaaactgg
1021 ttgaaaaagc aggtgcttgg tacagctaca tggcgacaa gatcggtcag ggcaaagcaa
1081 atgcttgtaa ttacctgcgt gaacatacag aagttgctca gactatcgac aagaaacttc
1141 gtgagatgct tttgtctcca gctgtagctg agggacctga agccggtgaa atgccagaga
1201 agaaagaaga agagttttaa
```

Polynucleotides, Plasmids, Vectors, and Replicons

Disclosed herein are vectors for use with a genetically-modified cell as described herein, which can be any particle (e.g., plasmids, cosmids, Lambda phages) used as a vehicle to artificially carry a foreign nucleic sequence—usually DNA—into another cell, where it can be replicated and/or expressed. The four major types of vectors are plasmids, viral vectors, cosmids, and artificial chromosomes. In some embodiments, a vector, plasmid, or replicon comprising one or more essential genes and a biomolecule is used to transform a host cell.

Extra-chromosomal DNA (e.g. a plasmid, vector, or replicon) can be transformed into a cell by any suitable method, for example by bacterial conjugation (e.g., E. coli to Vibrio spp.), electroporation of electro-competent cells, chemical transformation into chemically competent cells, biolistics, transduction, or via natural competence. Efficiencies of transformation can be, for example, at least $1\times10^5$ or at least at least $1\times10^6$ at least $1\times10^7$ at least $1\times10^8$ cfu/ug DNA using any of the methods above.

A plasmid is a small, extrachromosomal DNA molecule within a cell that is physically separated from chromosomal DNA and can replicate independently. Plasmids are considered replicons, units of DNA capable of replicating autonomously within a suitable host.

In some embodiments, a viral vector is used. In some of those embodiments, the viral vector is an AAV. In some embodiments, the viral vector corresponds to a virus of a specific serotype. In some examples, the serotype is selected from an AAV1 serotype, an AAV2 serotype, AAV3 serotype, an AAV4 serotype, AAV5 serotype, an AAV6 serotype, AAV7 serotype, an AAV8 serotype, an AAV9 serotype, an AAV10 serotype, an AAV 11 serotype, an AAV12 serotype, avian AAV, bovine AAV, canine AAV, equine AAV, ovine AAV, and any other AAV now known or later discovered. See, e.g., BERNARD N. FIELDS et al., VIROLOGY, volume 2, chapter 69 (4th ed., Lippincott-Raven Publishers). A number of relatively new AAV serotypes and clades have been identified (see, e.g., Gao et al., (2004) 1 Virology 78:6381-6388; Mori et al., (2004) Virology 330:375-383; and Table 3). In some embodiments the AAV vector is a recombinant vector, a hybrid AAV vector, a chimeric AAV vector, a self-complementary AAV (scAAV) vector, a single-stranded AAV or any combination thereof scAAV genomes contain both DNA strands which can anneal together to form double-stranded DNA.

In some embodiments, methods of producing delivery vectors herein comprise packaging an engineered guide disclosed herein in an AAV vector. In some examples, methods of producing the delivery vectors described herein comprise, (a) introducing into a cell: (i) a polynucleotide encoding any engineered guide disclosed herein; and (ii) a viral genome comprising a Replication (Rep) gene and Capsid (Cap) gene that encodes a wild-type AAV capsid protein or modified version thereof; (b) expressing in the cell the wild-type AAV capsid protein or modified version thereof; (c) assembling an AAV particle; and (d) packaging the polynucleotide encoding the engineered polynucleotide in the AAV particle, thereby generating an AAV delivery vector. In some embodiments, an engineered guide disclosed herein, promoters, stuffer sequences, and any combination thereof may be packaged in the AAV vector. In some examples, the AAV vector can package 1, 2, 3, 4, or 5 copies of the engineered guide. In some embodiments, the recombinant vectors comprise one or more inverted terminal repeats and the inverted terminal repeats comprise a 5' inverted terminal repeat, a 3' inverted terminal repeat, and a mutated inverted terminal repeat. In some examples, the mutated terminal repeat lacks a terminal resolution site.

In some embodiments, a hybrid AAV vector is produced by transcapsidation, e.g., packaging an inverted terminal repeat (ITR) from a first serotype into a capsid of a second serotype, wherein the first and second serotypes may be not the same. In some examples, the Rep gene and ITR from a first AAV serotype (e.g., AAV2) may be used in a capsid from a second AAV serotype (e.g., AAV9), wherein the first and second AAV serotypes may be not the same. As a non-limiting example, a hybrid AAV serotype comprising the AAV2 ITRs and AAV9 capsid protein may be indicated AAV2/9. In some examples, the hybrid AAV delivery vector comprises an AAV2/1, AAV2/2, AAV 2/4, AAV2/5, AAV2/8, or AAV2/9 vector.

In some embodiments, the AAV vector may be a chimeric AAV vector. In some embodiments, the chimeric AAV vector comprises an exogenous amino acid or an amino acid substitution, or capsid proteins from two or more serotypes. In some examples, a chimeric AAV vector may be genetically engineered to increase transduction efficiency, selectivity, or a combination thereof.

In some examples, the delivery vector may be a eukaryotic vector, a prokaryotic vector (e.g., a bacterial vector) a viral vector, or any combination thereof. In some embodiments, the delivery vehicle may be a non-viral vector. In some embodiments, the delivery vehicle may be a plasmid. In some embodiments, the plasmid comprises DNA. In some embodiments, the plasmid comprises RNA. In some examples, the plasmid comprises circular double-stranded DNA. In some examples, the plasmid may be linear. In some examples, the plasmid comprises one or more genes of interest (e.g., essential genes and biomolecules) and one or more regulatory elements. In some examples, the plasmid comprises a bacterial backbone containing an origin of replication and an antibiotic resistance gene or other selectable marker (e.g., essential gene) for plasmid amplification in bacteria. In some examples, the plasmid may be a minicircle plasmid. In some examples, the plasmid contains one or more genes that provide a selective marker to induce a target cell to retain the plasmid. In some examples, the plasmid may be formulated for delivery via electroporation or heat shock. In some examples, the plasmids may be engineered through synthetic or other suitable means. For example, in some embodiments, the genetic elements may be assembled by restriction digest of the desired genetic sequence from a donor plasmid or organism to produce ends of the DNA which may then be readily ligated to another genetic sequence.

In some embodiments, the vector is a non-viral vector, and a physical method or a chemical method is employed for delivery into the bacterial cell. Exemplary physical methods include electroporation, heat shock, gene gun, sonoporation, magnetofection, or hydrodynamic delivery. Exemplary chemical methods include delivery of the recombinant polynucleotide via liposomes such as, cationic lipids or neutral lipids; dendrimers; nanoparticles; or cell-penetrating peptides. In some embodiments, a non-viral vector comprises a nanoparticle such as a lipid nanoparticle, a gold nanoparticle, or a combination thereof.

In some embodiments, a fusion protein as described herein is inserted into a vector. In some embodiments, the vector optionally comprises one or more promoters, enhancers, operators, ribosome binding sites, RNA splice sites, polyadenylation sites, a replication origin, a multiple cloning site (MCS), cap binding sites, a LacZa fragment, M13 forward and reverse priming sites, and/or transcriptional terminator sequences.

In general, plasmids and vectors described herein comprise at least one promoter. In some embodiments, the promoters are constitutive promoters. In other embodiments, the promoters are inducible promoters. In additional embodiments, the promoters are prokaryotic promoters (e.g., drive expression of a gene in a prokaryotic cell). In some embodiments, the promoters are eukaryotic promoters, (e.g., drive expression of a gene in a eukaryotic cell). Exemplary promoters include, but are not limited to, CMV, EF1a, SV40, PGK1, Ubc, human beta actin, CAG, TRE, UAS, Ac5, polyhedron, CaMKIIa, GAL1-10, TEF1, GDS, ADH1, CaMV35S, Ubi, H1, U6, CaMV35S, SV40, CMV, and HSV TK promoter. In some embodiments, the promoter is a lac promoter.

In some embodiments, vectors are bicistronic or polycistronic vector (e.g., having or involving two or more loci responsible for generating a protein) having an internal ribosome entry site (IRES) is for translation initiation in a cap-independent manner.

In some embodiments, vectors comprise an enhancer. Enhancers are nucleotide sequences that have the effect of enhancing promoter activity. In some embodiments, enhancers augment transcription regardless of the orientation of their sequence. In some embodiments, enhancers activate transcription from a distance of several kilo base pairs. Furthermore, enhancers are located optionally upstream or downstream of a gene region to be transcribed, and/or located within the gene, to activate the transcription. Exemplary enhancers include, but are not limited to, WPRE; CMV enhancers; the R-U5' segment in LTR of HTLV-I (Mol. Cell. Biol., Vol. 8(1), p. 466-472, 1988); SV40 enhancer; the intron sequence between exons 2 and 3 of rabbit β-globin (Proc. Natl. Acad. Sci. USA., Vol. 78(3), p. 1527-31, 1981); and the genome region of human growth hormone (J Immunol., Vol. 155(3), p. 1286-95, 1995).

In some embodiments, vectors comprise an operator, which are nucleotide sequences that have the effect of repressing transcription upon binding of a repressor element. In some embodiments, the operator is a lac operator.

Gene Editing

The genes disclosed herein can be disabled by genetic modification of any organism (e.g., bacteria) by genome editing. Gene editing makes very specific targeted changes by insertion, deletion or substitution of genetic material in an organism's DNA to obtain the desired changes to the DNA. Examples of gene editing are CRISPR, zinc finger nuclease, transcription activator-like effector nuclease (TALEN), oligonucleotide directed mutagenesis, site specific nucleases, and meganucleases. The genes disclosed herein can also be disabled by using traditional gene knockout methods (e.g., homologous recombination such as natural selection (cotransformation of unlinked genetic markers) or chemical/radiological mutagenesis). Other examples of gene editing systems are transposases using signature-tagging mutagenesis or insertional inactivation (e.g., sleeping beauty) or argonaute proteins to edit genes of interest. In some embodiments, more than one type of editing system can be used to generate an expression system. For example, natural selection can be used to introduce a gene edit and then a CRISPR (e.g., CRISPR/Cas9) can target the wild type sequence, leading to cell death of unedited cells (Stukenberg, D., Hoff, J., Faber, A. et al. NT-CRISPR, combining natural transformation and CRISPR-Cas9 counterselection for markerless and scarless genome editing in *Vibrio natriegens*. Commun Biol 5, 265 (2022)).

Engineered or genetically-modified bacterial cells edited herein can be screened using selection markers and can be utilized on the altered Chromosome II or on extrachromosomal DNA or any constructs described herein. In some embodiments, the selection marker is a resistance gene, for example a gene conferring resistance to tetracycline, chloramphenicol, ampicillin, bleomycin, carbenicillin, gentamycin, glyphosate, hygromycin, kanamycin, neomycin, nourseothricin, phleomycin, puromycin, spectinomycin, streptomycin, or another antibiotic agent. In some embodiments, the resistance gene is Ampicillin or Kanamycin. The resistance gene can also have an origin of replication from various sources.

Guide Nucleic Acids

The compositions, systems, and methods of the present disclosure may include a guide nucleic acid, also referred to herein as a guide RNA. In some embodiments, a guide nucleic acid can include a sequence that hybridizes to a target sequence of a double stranded DNA molecule. In some embodiments, the guide nucleic acid also binds to a nuclease. Such guide RNAs can be used in a CRISPR system described herein in order to perform site-specific genetic modifications to the genome of a bacterial cell (e.g. to disable or knock out a gene described herein).

CRISPR Systems

The modifications provided herein can be performed using gene editing. In some embodiments, gene editing can be performed using a clustered regularly interspaced short palindromic repeats (CRISPR) system. As disclosed herein, a CRISPR system can utilize a guide RNA that hybridizes to a target nucleic acid, as well as an endonuclease that cleaves the target nucleic acid. In some embodiments, an endonuclease can be a CRISPR-associated ("Cas") protein such as a Cas9 or Cas12 protein. Examples of Cas9 proteins include Cas9 nickase and dead Cas9 (dCas9). Examples of Cas12 proteins include Cas12 nickase and dead Cas12 (dCas12).

Methods of Growing Gram-Negative Bacteria

Growth conditions for gram-negative genetically-modified bacterial cell (e.g., *Escherichia* spp., *Vibrio* spp.) engineered or modified as described herein or for wild-type gram-negative bacteria, for purposes of measuring growth rates or comparing relative endotoxin concentrations or levels, can be any standardized or corresponding growth conditions accepted in the field as generally equivalent. In one embodiment, growth rates or other activities can be calculated or conducted in LBv2 media or LB (or LB-Miller) media or peptone, animal component free peptone, or yeast extract, at about 30° C. or another suitable temperature (e.g., 25 to 37° C.) with shaking (e.g., 100-300 rpm shaking). The growth conditions can be utilized to compare the growth rates between gram negative or other organisms, as is known and generally accepted in the field. In any of the embodiments a suitable media (including, but not limited to, any of those described herein) having from about 5 g NaCl/L to about or about 30 g NaCl/L or about 1% NaCl can be used. The media can optionally contain functional amounts glucose and/or magnesium, and can contain minimal or no calcium.

Corresponding growth conditions are those accepted in the field as those suitable for providing comparative measurements. In some embodiments, the growth rate of a *Vibrio* spp. organism can be compared to an *E. coli* organism in corresponding conditions by growing *Vibrio* spp. in LBv2 media and the *E. coli* in LB (also called LB-Miller) media or peptone, animal component free peptone, or yeast extract, since the organisms prefer these respective media. The organisms can be grown at the same temperature, e.g., about 30° C. or about 37° C. or about 25° C., or *Vibrio* spp. can be grown at about 30° C. and *E. coli* can be grown at about 37° C. for corresponding conditions. In one embodiment, *Vibrio* spp. and *E. coli* organisms can also be compared by growing both of them in LBv2 media; in another embodiment for comparison *Vibrio* spp. can be grown in LBv2 media at about 30° C. and *E. coli* can be grown in LB (or LB-Miller) media at about 37° C. for corresponding conditions. Any of these various conditions can be used to compare any properties of the organisms, whether wild type or recombinant organisms.

Growth Rate

Genetic modification (e.g. deletion, inactivation, insertion, attenuation, inversion, disruption, or downregulation) of the API, lpxL, and/or lpxM genes in a gram-negative bacterial cell would be expected to result in an organism having a significantly lower growth rate than an unmodified wild type organism. However, in various embodiments the engineered or modified gram-negative bacterial cell described herein have a higher growth rate than a comparable *Escherichia* spp. and grows at 10% or more or 25% or more or 50% or more or 75% or more or 100% or more or 150% or more or 200% or more or 300% or more or 500% or more or 750% or more of the growth rate of the unmodified or wild type gram-negative bacterial cell, unless the gram-negative bacterial cell has a modified msbA mutation (or "suppressor mutation") that permits Lipid IV(A) transport. There are various mutations of msbA that permit an increase in growth and they are known to persons of ordinary skill. Yet the present inventors discovered unexpectedly that the engineered *Vibrio* spp. gram-negative bacterial cell of the present disclosure can have a genetic modifications in one or more of the API, lpxL lpxM, Dns, Dam, and/or RecA genes and nevertheless remain culturable and retain a high growth rate making them useful for the production of biomolecules as described herein. These engineered or genetically-modified gram-negative bacterial cells also have the advantage of giving a substantially reduced or eliminated immune response (or are substantially less endotoxic) to humans and other mammals.

A growing population of bacteria doubles at regular intervals of time. Bacterial growth occurs by geometric progression, e.g. 1, 2, 4, 8, etc. or $2^0, 2^1, 2^2, 2^3 \ldots 2^n$ where n is the number of generations. But only part of the bacterial life cycle involves exponential growth, and bacterial growth curves thus typically have an exponential portion and a stationary portion. Growth rate can be calculated during the exponential part of the life cycle. The exponential phase of growth involves balanced growth wherein the cells are dividing regularly and growing by geometric progression. The rate of exponential growth (or the growth rate) of a bacterial culture can be expressed as generation time, or doubling time of the bacterial population. Generation time (G) is defined as the time (t) per generation (n=number of generations). Thus, the equation G=time (t) divided by (n) expresses the doubling time or generation time. G can be expressed in minutes (or hours) or any suitable unit of time. For example, a generation time (G) of 10 minutes means that it will take 10 minutes for the population to double in size. In various embodiments, the generation time can be measured by the numbers of organisms, the biomass, the optical density of the cell culture measured at 600 nm optical density (O.D.), or other measurements that are convenient and accepted as scientifically valid. Another common method of describing growth kinetics is the specific growth rate (SGR). The specific growth rate has units of reciprocal hours (per hr or $hr^{-1}$). Specific growth rate (SGR) and generation time (G) are related through the following mathematical formula: G=ln(2)/SGR. Thus, a large SGR will correspond with a small G, and vice versa. SGR can also be converted into doublings/hr by the formula: doubling time=ln(2) divided by the specific growth rate.

In some embodiments, the engineered *Vibrio* sp. of the present disclosure exhibits a specific growth rate of at least 0.30 $hr^{-1}$ (per hour) or at least 0.40 or at least 0.50 or at least 0.60 or at least 0.70 or at least 0.80 or at least 0.85 $hr^{-1}$ or 0.40-0.95 $hr^{-1}$ or 0.50-0.95 or 0.60-0.72 or 0.60-0.75 or 0.60-0.95, or 0.65-0.90, or 0.70-0.95, or 0.80-0.95, or 0.85-0.95, or 0.30-0.90, or 0.40-0.90, or 0.50-0.90, or 0.60-0.90, or 0.70-0.90, or 0.80-0.90 $hr^{-1}$ (per hour) which can be conveniently measured in any appropriate media and at any appropriate temperature (e.g., as described herein). Thus, growth rate can be expressed in doublings/hr or in minutes/doubling or simply generation time, or specific growth rate (SGR). In one embodiment, the doubling time of the organisms can be measured at 30° C. in LBv2 media. But any suitable media can be used, for example LB media (or LBMiller media) or peptone, animal component free peptone, or yeast extract. Growth can be assessed in any suitable container such as, for example, a fermentor or shake flask, but in one embodiment, the organisms can be assessed in a culture or assay plate (e.g., a 24, 48, 96, 384 well plate). The container can be flat bottomed microtiter plate, a round bottomed microtiter plate, or another appropriate vessel with wells of advantageous shape, for example flower shaped wells (e.g. FlowerPlate® microtiter plates). Any suitable container and conditions can be used to measure the growth rate. The growth rate or specific growth rate can also be assessed at various temperatures, including but not limited to, growth at about 25° C. or at about 30° C. or at about 37° C. or at about 40° C. or at about 42° C. or about 25-30° C. or 25-32° C. or 25-37° C. or about 30-37° C. or about 37-42° C. or at any temperature between 16-42° C. The growth rates disclosed herein are achievable on the media indicated herein and without any further supplementation of the media (e.g., without supplementation by arabinose 5-phosphate or glucose 6 phosphate). In some embodiments, the gram-negative bacterial cells described herein can have all wild type genes and no deletions or genetic mutations to any gene except as otherwise described herein.

In various embodiments, the engineered or genetically-modified gram-negative bacterial cells described herein have a doubling time of about 60 minutes, or 50-90 minutes, or 40-60 minutes, or 30-40 minutes, or less than 30 minutes at 30° C., or less than 22 minutes at 37° C., or less than 21 minutes at 42° C., all in LB or LBv2 media or peptone, animal component free peptone, or yeast extract.

The engineered or genetically-modified *Vibrio* spp. bacterial cells described herein can grow more quickly than a corresponding or wild type bacterial cell. Thus, in various embodiments, the engineered or genetically-modified *Vibrio* spp. bacterial cells can have a growth rate of at least 40% more or at least 50% more, or at least 55% more, or at least 60% more at least 65% more or at least 70% more or at least 80% more or at least 85% more or at least 90% more or 50-70% more or 55-70% more or 55-65% more or 55-80% more or 55-90% more or 60-70% more or 60-65% more or 60-80% more or 60-90% more or 60-95% more or 65-90% more or 70-90% more or 75-90% more or 55-95% more or 65-95% more or 70-90% more or 70-95% more or 75-95% more of the growth rate (but also optionally more than 100% or more than 95% or more than 90% for any of them) of the corresponding or wild-type bacterial cells under the same or corresponding conditions. For example, if any bacterial cell has a doubling time of 10 minutes, 65% of its growth rate can be calculated as 10/0.65=15.4 minute doubling time. Growth rates can be measured over any convenient time period of cultivation during the exponential phase, such as over 4 hours or over 6 hours or 8 hours or 9 hours or 10 hours or 12 hours or 15 hours or 18 hours or 24 hours or only from 0-3 hours or 0-4 hours or 0-6 hours or 0-8 hours or 6-8 hours or from 8-10 hours or from 8-12 hours or from 10-12 hours. Thus, the engineered or genetically-modified *Vibrio* spp. bacterial cells described herein can have a doubling time or generation time or specific growth rate of 50% or greater or 55% or greater or 60% or greater, or 65% or greater, or 70% or greater or 75% or greater or 80% or greater or 85% or greater or 90% or greater, or 95% or greater (or 55-70% or 55-65% or 55-90% or 55-95% or 60-70% or 60-65% or 60-80% or 60-90% or 60-95% or 65-90% or 65-95% or 70-90% or 75-90% or 80-90% or 75-95% or 80-95%) than the doubling time or generation time of the wild-type organism, or an organism not having the genetic modification of RecA, Dam, KdsD, gutQ, kdsA, kdsB, waaA, msbA, yhiD, lpxL, and/or lpxM genes. Doubling time can be expressed as any suitable unit of time, but doublings/hr is convenient and commonly used.

Any of the recombinant *Vibrio* spp. bacterial cells described herein can also have a growth rate of at least 100% greater, or at least 200% greater or at least 300% greater or at least 400% greater or at least 500% greater or at least 600% greater or at least 700% greater or at least 900% greater than an *E. coli* having a deletion of ΔRecA, ΔDam, ΔDns, ΔKdsD, ΔgutQ, ΔkdsA, ΔkdsB, ΔwaaA, ΔmsbA, ΔyhiD, ΔlpxL1, ΔlpxM genes, and a mutated msbA gene (a suppressor mutation). Such *E. coli* are commercially available under the trademark name ClearColi®).

Any of the engineered or genetically-modified *Vibrio* spp. bacterial cells described herein can exhibit sustained growth at higher temperatures, for example at about 40° C., or above 40° C., or at about 42° C., or above 42° C., or at about 37-42° C. or about 38-42° C., e.g. for time periods of at least 12 hours or at least 18 hours or at least 24 hours or at least 48 hours. In some embodiments, the cells can be re-cultured after being exposed to the stated conditions.

Cold Tolerance

Reactive oxygen species (ROS) such as singlet oxygen, superoxide anion, hydrogen peroxide, and hydroxyl radicals are a consequence of aerobic metabolism and can cause cellular damage through the oxidation of biological molecules. These oxygen species can be generated in an enhanced amount as a result of various types of cellular stress, including cold stress. In some embodiments, an engineered or modified bacterial cells (e.g., *Escherichia* spp., *Vibrio* spp.) comprises one or more nucleotide sequence(s) encoding one or more enzyme(s) from an ROS detoxification system. The one or more enzymes can be selected from one or more of a peroxidase, a dismutase, a reductase, and a transferase, or any combination of them, and which enzyme can be an algal, microalgal, bacterial, cyanobacterial or other type or source of enzyme. The enzyme can be selected from one or more of glutathione peroxidase (which can have reduced monomeric glutathione (GSH) as substrate), superoxide dismutase, guaiacol peroxidase (GPX), enzymes of ascorbate-glutathione (AsA-GSH) cycle ascorbate peroxidase (APX), monodehydroascorbate reductase (MDHAR), dehydroascorbate reductase (DHAR), glutathione reductase (GR), catalase peroxidase (e.g. katG and/or katE), alkyl hydroperoxide reductase, and glutathione S-transferase. The nucleotide sequence(s) can be exogenous or heterologous, and the one or more enzymes can be exogenous or heterologous enzymes.

In some embodiments, engineered or modified bacterial cells (e.g., *Escherichia* spp., *Vibrio* spp.) have a heterologous or exogenous nucleic acid sequence encoding at least one enzyme from an ROS detoxification system, which can be present on a plasmid or other vector. The engineered or modified bacterial cells have a greater ability to tolerate cold stress than non-engineered or unmodified bacterial cells and can therefore remain viable and culturable after incubation at lower temperatures and for substantially greater periods of time than non-engineered bacterial cells. An ROS detoxification system can convert any of the reactive oxygen species into one or more of oxygen or water. The enzyme from an ROS system can be operably linked to or under the control of an exogenous or heterologous promoter and/or other regulatory sequences.

In some embodiments, a vector, cell, expression system or biomolecule produced by said cell or expression system can be cryopreserved for long term storage. In some embodiments, the vector, cell, expression system or biomolecule produced by said cell or expression system is cryopreserved at a temperature less than −4° C., −20° C., −80° C., or −196° C. In other embodiments, the vector, cell, expression system or biomolecule produced by said cell or expression system is cryopreserved from 1 to 7 days, from 8 to 30 days, from 31 to 90 days, from 91 to 365 days, from 1 year to 5 years, or more than 5 years.

Plasmid/Transgene Production

Disclosed herein are genetically-modified bacterial cells demonstrating increased plasmid or transgene production as compared to plasmid or transgene production in un-modified bacteria. In some embodiments, the genetically-modified bacterial cells demonstrate increased plasmid or transgene production as compared to plasmid or transgene production in a bacterial expression strain lacking the genetic modifications described herein. Also provided herein, are methods of expressing a plasmid in a genetically-modified cell.

In some embodiments, the genetically-modified bacterial cells replicate a non-native plasmid with at least a 10%, 25%, 50%, 75%, 100%, 125%, 150%, 175%, 200%, 225%, 250%, 275%, or 300% increase in production yield of mg of plasmid as compared to a corresponding production yield of the non-native plasmid in a comparable expression system lacking the genetic modifications described herein. In some embodiments, the genetically-modified bacterial cells replicate a non-native plasmid with 10% or more, 25% or more, 50% or more, 75% or more, 100% or more, 125% or more, 150% or more, 175% or more, $^{200}$% or more, 225% or more, 250% or more, 275% or more, or 300% or more increase in production yield of mg of plasmid as compared to a corresponding production yield of the non-native plasmid in a comparable expression system lacking the genetic modifications described herein grown in the growth medium for the same amount of growth time. In some embodiments, the comparable expression system comprises wild-type K12 *E. coli*.

In some embodiments, genetically-modified bacterial cells replicate a non-native plasmid to produce plasmids with reduced levels of plasmid multimers and/or concatemers. In some embodiments, the genetically-modified bacterial cells produce at least 10%, at least 20%, at least 30%, at least 40%, at least 50%, at least 60%, at least 70%, at least 80%, at least 90% or at least 99% less multimers an/or concatemers as compared to an un-modified bacterial cell. In some embodiments, the genetically-modified bacterial cells produce at least 10%, at least 20%, at least 30%, at least 40%, at least 50%, at least 60%, at least 70%, at least 80%, at least 90% or at least 99% increase in monomeric plasmid species as compared to an un-modified bacterial cell. In some embodiments, the genetically-modified bacterial cells produce at least 10%, at least 20%, at least 30%, at least 40%, at least 50%, at least 60%, at least 70%, at least 80%, at least 90% or at least 99% increase in supercoiled plasmid DNA as compared to an un-modified bacterial cell. In some embodiments, plasmids produced by the genetically-modified bacterial cells described herein can comprise an increased ratio of monomeric and supercoiled plasmid DNA to multimers and concatemers, as compared to an un-modified bacterial cell.

In some embodiments, the non-native plasmid generated by the genetically-modified bacterial cells can be purified. The skilled artisan may look to known plasmid purification steps to provide for a scheme which results in an appropriate grade of DNA plasmid purity. For example, PCT International Application Nos. PCT/US95/09749 (WO96/02658) and PCT/US96/07083 (WO96/36706) give guidance as to alternative, chromatography-based downstream steps which may be utilized in combination with the core purification steps mentioned in this paragraph to provide an effective purification protocol.

Method of Expressing Biomolecule

In some embodiments, non-toxic gram-negative genetically-modified bacterial cells are used as hosts for the production of endotoxin free biomolecules. The present disclosure is not limited to particular biomolecules. Traditionally, the production of biomolecules in Gram negative bacteria, whether it be outer membrane vesicles for vaccines, LPS type molecules (such as monophosphoryl lipid A (MPLA)) to be used as adjuvants, recombinant pharmaceutical proteins, macromolecules, or DNA for mammalian cell transfection/gene therapy, is plagued by the presence of endotoxin from the bacterial host. Contamination of the therapeutic molecule with endotoxin is a concern, as the immunogenic potential of LPS is well documented. Current production strategies to alleviate endotoxin contamination include various purification techniques, such as the kits marketed for endotoxin free DNA plasmid purification, followed by assays to measure endotoxin levels. As such, the non-toxic gram-negative bacterial cells of the present disclosure (e.g., the endotoxin-free cells) provide improved methods of isolating endotoxin free biomolecules. Accordingly, as some cells of the present disclosure do not produce endotoxin, such purification steps are not required. For example, the endotoxin-free cell of the present disclosure can be a host for the production of commercially important biomolecules in an endotoxin-free environment using Gram-negative bacteria. Additionally, cells comprising a modification in a gene encoding any one or more of a D-arabinose 5-phosphate isomerase, a KDO8P synthase, a CMP-KDO synthetase, a KDO8P phosphatase and/or a KDO transferase, an ATP-dependent translocator, an inner membrane protein (e.g., gutQ, kdsD, kdsA, kdsB, waaA msbA, yhjD genes), or modifications in any other biosynthetic, processing (e.g., lpxL1 or lpxM), or trafficking bacterial genes can be hosts for the production of commercially important biomolecules in an endotoxin-free environment using Gram-negative bacteria.

EXAMPLES

The following examples are included for illustrative purposes only and are not intended to limit the scope of the disclosure. It will be understood by those of skill in the art that numerous and various modifications can be made to yield essentially similar results without departing from the spirit of the present disclosure.

Example 1: Preparation of Engineered *V. Natriegens* Strain for Antibiotic-Free Plasmid Production An engineered *V. natriegens* strain was prepared for endotoxin- and antibiotic-free plasmid production. Modifications to the bacterial chromosome were performed using a CRISPR-Cas9 system. The following bacterial chromosomal genes are edited (Knocked-out) in this strain:

(a) Extracellular deoxyribonuclease (Dns) activity is very prominent in this organism. This activity causes degradation of the plasmid during the transformation and plasmid isolation stage. Also, the deoxyribonuclease activity impacts negatively on stability of the plasmid itself. The Dns gene was edited using a CRISPR/Cas9 gene editing system to produce a nonfunctional truncated Dns protein. Hence, the exonuclease activity of Dns was lost permanently, enabling better stability and less degradation during the isolation of the plasmids.

(b) Arabinose 5-phosphate isomerase (KdsD) activity is one of the important steps in endotoxin production by this organism, which is a hard to remove contaminant during plasmid production and purification. The KdsD gene knockout inhibited the biosynthesis of lipopolysaccharide (LPS), contributing to a very low level of endotoxin in the isolated plasmid.

(c) Lipid A biosynthesis lauroyltransferase (lpxL_1) activity is one of the important steps in endotoxin production by this organism, which is a hard to remove contaminant during plasmid production and purification. The lpxL_1 gene knockout inhibited the biosynthesis of lipopolysaccharide (LPS), contributing to a very low level of endotoxin in the isolated plasmid.

(d) Lipid A biosynthesis myristoyltransferase (lpxM): activity is one of the important steps in endotoxin production by this organism, which is a hard to remove contaminant during plasmid production and purification. The lpxM gene knockout inhibited the biosynthesis of lipopolysaccharide (LPS), contributing to a very low level of endotoxin in the isolated plasmid.

(e) DNA adenine methylase (Dam) can diminish gene expression by inhibiting the binding of transcription factors to the sensitive genes. Knock-out of this gene makes the organism dam −/− and allows the synthesis and expression of dam sensitive plasmids. The Dam −/− strain was made by a knockout of the DNA adenine methylase gene.

(f) Glutamine-dependent NAD(+) synthetase (nadE_1) is one of the essential genes for survival of the organism. Knockout of this gene resulted in the death of the organism unless the enzyme is supplemented from a source other than the genomic DNA. In order to select only the plasmid containing transformed bacteria, this gene was inserted into the plasmid of interest and introduced into the Glutamine-dependent NAD(+) synthase knockout bacteria. This process allowed for antibiotic free selection of the transformed plasmid containing organism.

Bacterial gene editing was performed using a modified CRISPR-Cas9 system which employs two proprietary plasmids. Plasmid named NB_Cas9 and NB_gRNA.

NB_Cas9 plasmid consisted of gene sequences that correspond to PSCI01 Origin, Rep101, Lac Promotor, Lac Inhibitor, Lac operator, Lambda T3 terminator, Kanamycin Resistance gene, 5'-3' double stranded exonuclease from lambda red system, single stranded DNA binding recombinase in the lambda red system, inhibitor of the host RecBCD nuclease in the lambda Red system, Shine-Dalgarno sequence, promoter of the L-arabinose operon of E. coli, L-arabinose regulatory protein, and a Kanamycin resistant gene.

NB_gRNA plasmid consisted of Origin of replication, Ampicillin resistant gene, ampicillin resistant gene promotor, J23119 (SpeI) promoter, gRNA sequence, and a gRNA scaffold.

A homologues recombinant DNA template, which was different for various gene knock-outs, was also a part of the gene editing system.

Bacteria were transformed using a modified Cas9 plasmid, gRNA plasmid, and homologous repair template specific for each gene to be knocked out or knocked in. Transformation was performed using electroporation or a heat shock method. Transformed bacteria were selected using Kanamycin and/or Ampicillin resistance. Selected bacteria were screened for the changes in the genome using sequencing and the plasmid was curated by growing the organism at 37-42° C.

Figure 2:
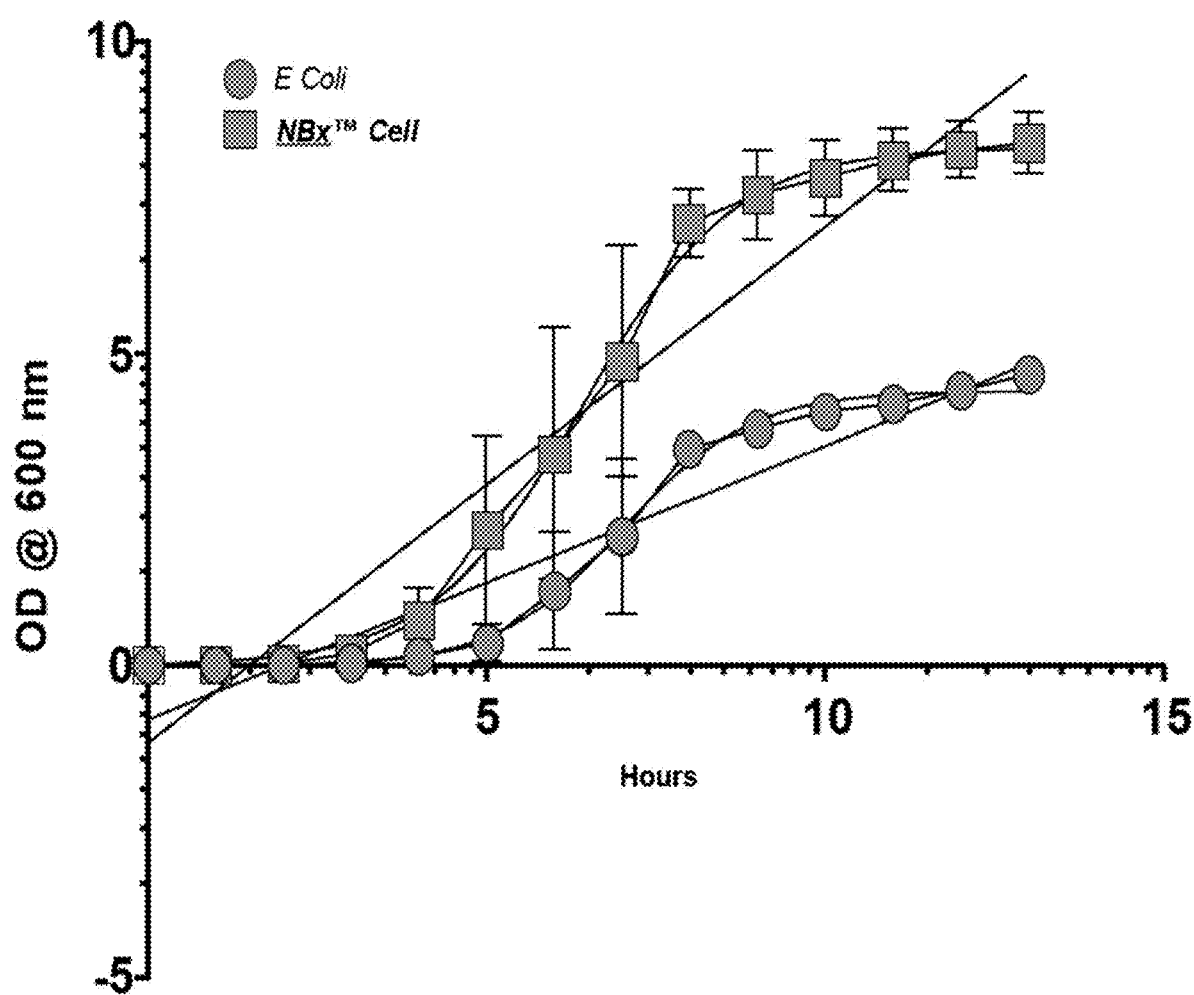
FIG. 2 provides a growth curve showing that the growth rate of the exemplary bacterial cells (NB) of the present disclosure is significantly higher (~1.9 times) compared to $E.$ $coli$ based systems grown under the same conditions using the same growth media.
Figures 3A, 3B:
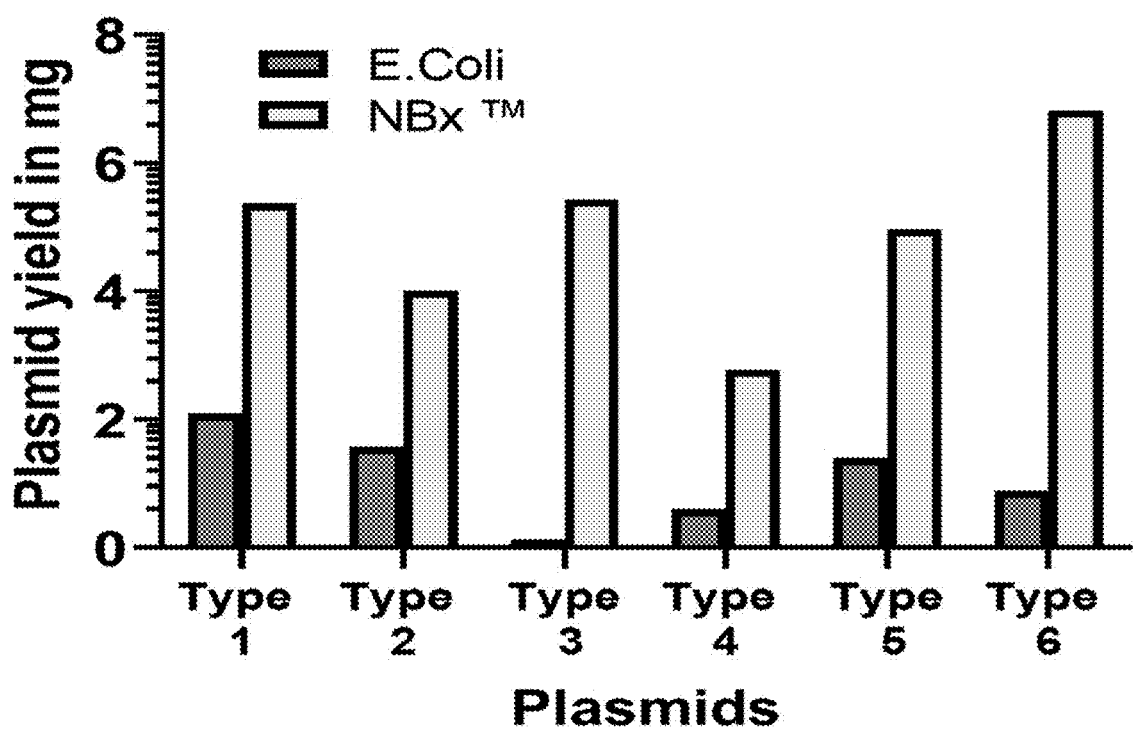
FIGS. 3A-3B provide a table and a bar graph showing that the exemplary bacterial cells of the present disclosure have a faster cell doubling time and greater plasmid yield compared to an $E.$ $coli$ system.

The growth rate of the engineered V. natriegens strains were then compared to an E. coli control. V. Natriegens was grown in media containing 1) Animal component free peptone (5 to 10 g/L), Yeast Extract (5 to 10 g/L), Sodium chloride (5 to 30 g/L), Double Distilled water to make up the volume to 1000 ML and pH is adjusted to 6.5 to 7.5. Bacterial host was grown at 25° C. to 37° C. with 100-300 rpm shaking. As shown in FIGS. 1-2, the V. natriegens strains exhibited a robust growth rate at O.D. 600 nm relative to the E. coli control. The cell doubling time was also much faster in the engineered V. natriegens (NB) compared to an E. Coli cell line (FIG. 3A). This led to enhanced total plasmid yields (mg) for 6 different sized plasmids (FIG. 3B).

Example 2: Preparation of Genetically Engineered E. Coli for Low Endotoxin, Antibiotic Free Selection An engineered E. coli strain was prepared for antibiotic free selection with low endotoxin production. Modifications to the bacterial chromosome were performed using a CRISPR-Cas9 system. The following bacterial chromosomal genes are edited (knocked-out) in this strain:

(a) Arabinose 5-phosphate isomerase (KdsD) activity is one of the important steps in endotoxin production by this organism, which is a hard to remove contaminant during plasmid production and purification. The KdsD gene knockout inhibited the biosynthesis of lipopolysaccharide (LPS), contributing to a very low level of endotoxin in the isolated plasmid.

(b) Lipid A biosynthesis lauroyltransferase (lpxL_1) activity is one of the important steps in endotoxin production by this organism, which is a hard to remove contaminant during plasmid production and purification. The lpxL_1 gene knockout inhibited the biosynthesis of lipopolysaccharide (LPS), contributing to a very low level of endotoxin in the isolated plasmid.

(c) Lipid A biosynthesis myristoyltransferase (lpxM): activity is one of the important steps in endotoxin production by this organism, which is a hard to remove contaminant during plasmid production and purification. The lpxM gene knockout inhibited the biosynthesis of lipopolysaccharide (LPS), contributing to a very low level of endotoxin in the isolated plasmid.

(d) DNA adenine methylase (Dam) can diminish gene expression by inhibiting the binding of transcription factors to the sensitive genes. Knock-out of this gene makes the organism dam −/− and allows the synthesis and expression of dam sensitive plasmids. The Dam −/− strain was made by a knockout of the DNA adenine methylase gene.

(e) Glutamine-dependent NAD(+) synthetase (nadE_1) is one of the essential genes for survival of the organism. Knockout of this gene resulted in the death of the organism unless the enzyme is supplemented from a source other than the genomic DNA. In order to select only the plasmid containing transformed bacteria, this gene was inserted into the plasmid of interest and introduced into the Glutamine-dependent NAD(+) synthase knockout bacteria. This process allowed for antibiotic free selection of the transformed plasmid containing organism Bacterial gene editing was performed using a modified CRISPR-Cas9 system which employs two proprietary plasmids. Plasmid named NB_Cas9 and NB_gRNA.

NB_Cas9 plasmid consisted of gene sequences that correspond to PSCI01 Origin, Rep101, Lac Promotor, Lac Inhibitor, Lac operator, Lambda T3 terminator, Kanamycin Resistance gene, 5'-3' double stranded exonuclease from lambda red system, single stranded DNA binding recombinase in the lambda red system, inhibitor of the host RecBCD nuclease in the lambda Red system, Shine-Dalgarno sequence, promoter of the L-arabinose operon of E. coli, L-arabinose regulatory protein, and a Kanamycin resistant gene.

NB_gRNA plasmid consisted of Origin of replication, Ampicillin resistant gene, ampicillin resistant gene promotor, J23119 (SpeI) promoter, gRNA sequence, and a gRNA scaffold.

A homologues recombinant DNA template, which will be different for various gene knock-outs, was also a part of the gene editing system.

Bacteria were transformed using a modified Cas9 plasmid, gRNA plasmid, and homologous repair template specific for each gene to be knocked out or knocked in. Transformation was performed using electroporation or a heat shock method. Transformed bacteria were selected using Kanamycin and/or Ampicillin resistance. Selected bacteria were screened for the changes in the genome using sequencing and plasmid was curated by growing the organism at 37-42° C.

The CRISPR/Cas9 edits above were made by using the exemplary guide sequences below:

TABLE 1 gRNA sequences for the Dns modification

| Rank | Target sequence | Strand | GC content (%) | Self-complementarity | MM0 | MM1 | MM2 | MM3 | Efficiency |
|---|---|---|---|---|---|---|---|---|---|
| 1 | TTGGTGTCACTATTACCGCGCGG (SEQ ID NO: 19) | – | 50 | 0 | 0 | 0 | 0 | 0 | 83.13 |
| 2 | CAGCTGCAATGCTGGCAAAGCGG (SEQ ID NO: 20) | + | 55 | 0 | 1 | 0 | 0 | 0 | 72.69 |
| 3 | TCGAGCGGTAATAGTGAACGCGG (SEQ ID NO: 21) | + | 50 | 0 | 0 | 0 | 0 | 0 | 71.02 |
| 7 | TCCATTTCACTATTACCGAGCGG (SEQ ID NO: 22) | – | 40 | 0 | 0 | 0 | 0 | 0 | 64.23 |

TABLE 2 gRNA sequences for the Dam modification

| Rank | Target sequence | Strand | GC content (%) | Self-complementarity | Efficiency |
|---|---|---|---|---|---|
| 4 | GCGTCGTTTATACCACGGAG (SEQ ID NO: 23) | – | 55 | 2 | 72.49 |
| 5 | CCACGCTCAAATCCGCTCCG (SEQ ID NO: 24) | + | 65 | 3 | 70.57 |
| 6 | GACGCGTTAATGTTGTATCG (SEQ ID NO: 25) | + | 45 | 0 | 64.48 |
| 7 | AAGTTTGCGGTATTTGAAAG (SEQ ID NO: 26) | – | 35 | 0 | 63.82 |

Example 3: Removal of DNA Strand Exchange Protein to Improve Plasmid Stability A genetically-modified strain of *Vibrio natriegens* was prepared for endotoxin-free plasmid and/or transgene production, where the plasmids produced contained reduced levels of plasmid multimers or concatemers.

The wildtype *Vibrio natriegens* strain, when transformed with plasmid DNA, generates plasmid species that have a higher molecular weight than the expected plasmid. These higher molecular weight species correspond to plasmid multimers and/or concatemers that have been generated by the endogenous machinery in the strain. These multimers and/or concatemers severely impact plasmid quality by contaminating the desired species (monomeric, supercoiled plasmid DNA) with additional species, reducing yield and complicating purification procedures.

Therefore, modifications to the bacterial chromosomes were performed to remove an endogenous DNA strand exchange protein would diminish the strain's ability to generate these undesirable high-molecular weight species and therefore improve plasmid quality. The entire coding sequence for a predicted DNA strand exchange protein (SEQ ID NO:1) was replaced with an antibiotic resistance marker using natural competence-mediated homologous recombination, as previously described (ACS Synth. Biol. 2018, 7, 2245-2255).

*V. natriegens* cells were rendered naturally competent via expression of the *V. cholera* tfoX protein from a plasmid, activating the cell's natural competence machinery. The naturally competent cells were transformed with DNA cassettes composed of a chloramphenicol resistance gene bounded by homology arms to the genetic loci of interest, which direct the DNA cassette to the appropriate locus and enable a recombination event. In this instance, the result is the replacement of the DNA strand exchange protein gene with a chloramphenicol resistance marker. The resulting chloramphenicol-resistant transformants were screened by colony PCR to confirm the desired knockout, and then passaged in the absence of antibiotics to cure the strain of the tfoX expression plasmid.

Figure 4A:
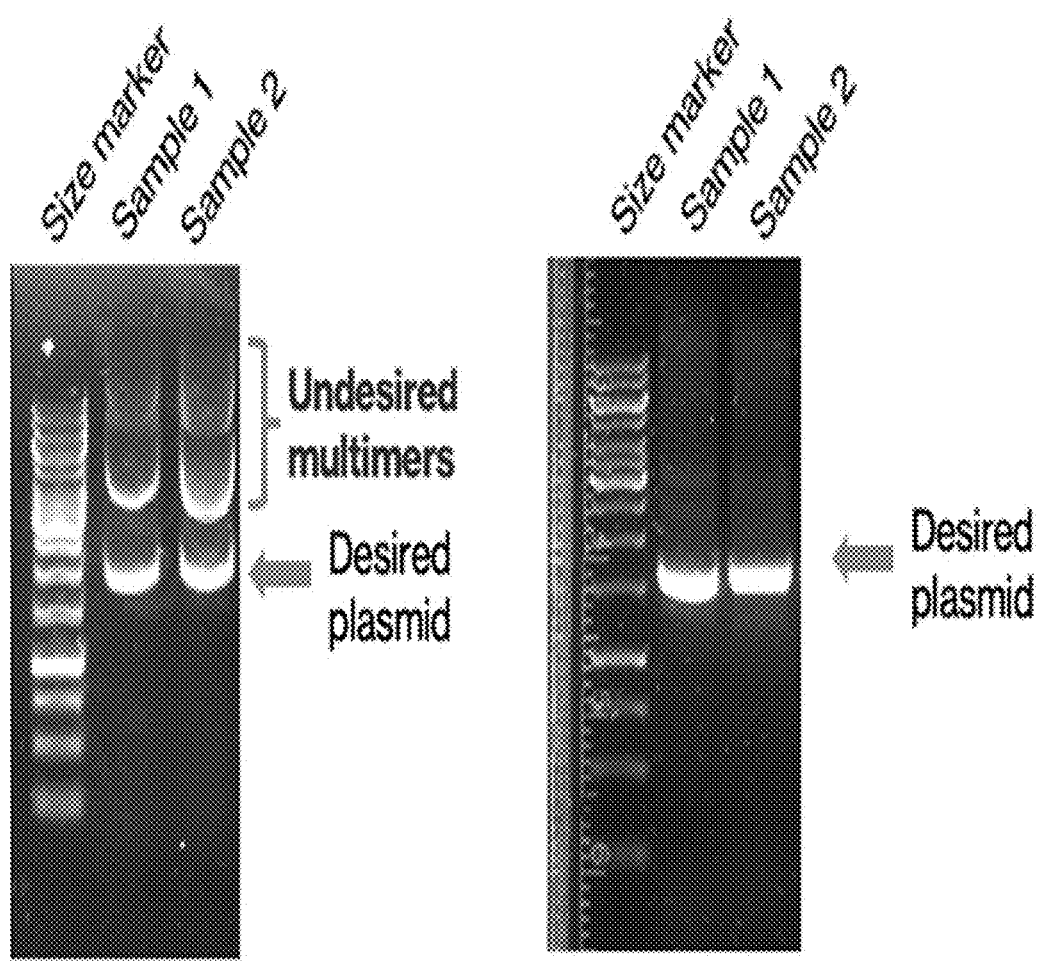
FIGS. 4A-4B provide example plasmid DNA preps isolated from the un-modified strain or the genetically-modified bacterial cell that comprises a genetic modification to a DNA strand exchange protein as described herein.
Figure 4B:
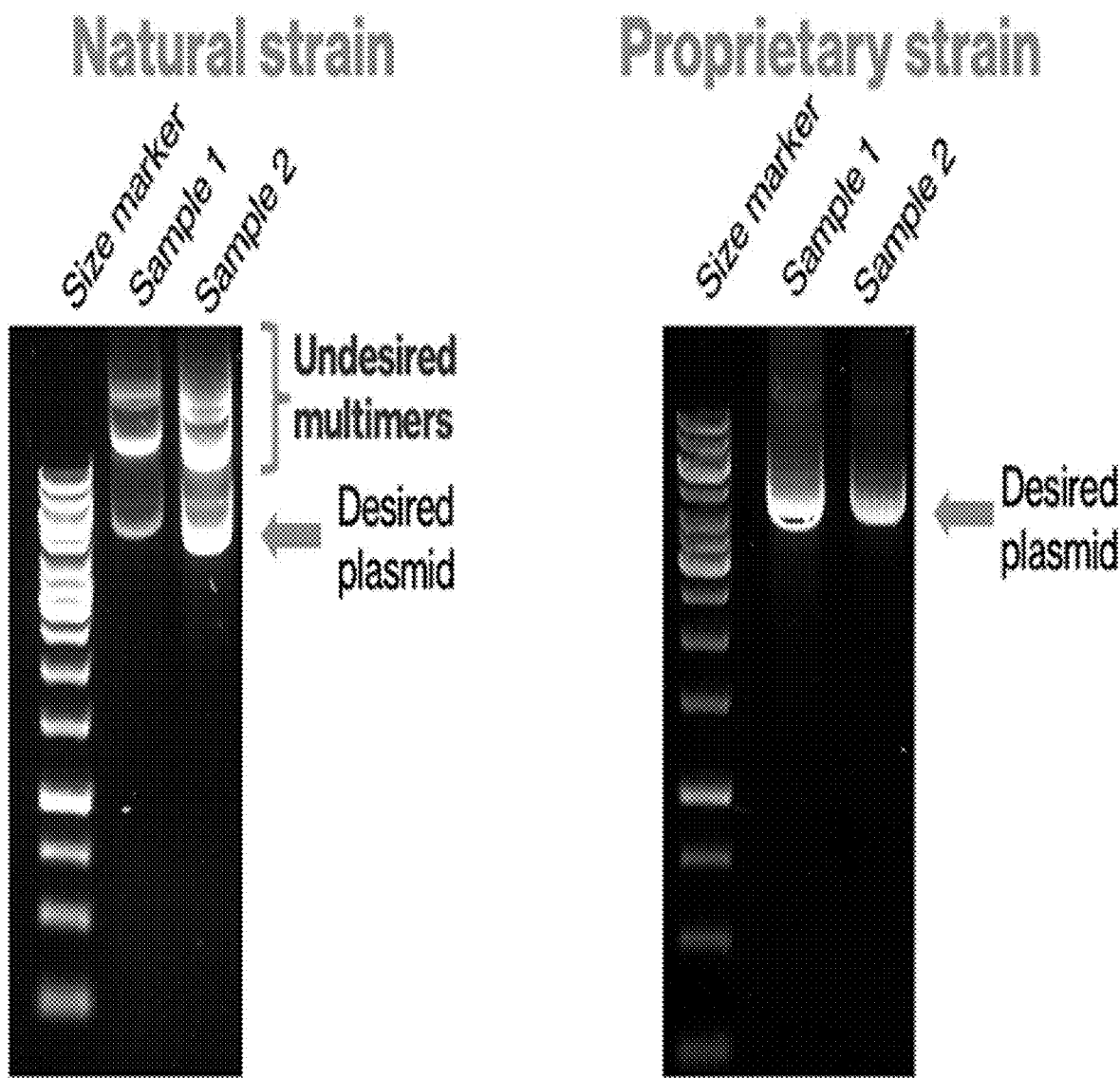

Plasmid DNA was then introduced into the strain as previously described (Nature Methods. 2016, 13:849-851) and cultivated in liquid growth media supplemented with antibiotics to ensure plasmid maintenance. Plasmids were isolated from the cultures using commercially available DNA purification columns (Qiagen) following manufacturer's protocols. Isolated plasmid DNAs were run on TAE 1% agarose gels to visualize the plasmid topologies, confirming that the genome modification improved the quality of the plasmid DNA preps by reducing the presence of high-molecular-weight multimers/concatemers (FIGS. 4A-B).

Example 4: Knockout of nadC in *V. natriegens* via Natural Competency Transformation Identification and context of the nadC that encodes for QAPRTase in *V. natriegens* was conducted using the blastn algorithm. To perform the knockout of nadC, a protocol for transformation via natural competency was employed as described elsewhere (Conley et al.). A DNA cassette encoding a chloramphenicol resistance marker flanked on either side by 3 kb homology arms to regions upstream and downstream of nadC in *V. natriegens* was constructed with the intention of swapping out the nadC gene with the chloramphenicol resistance cassette via homologous recombination.

To perform the natural competency transformation, a 10 mL culture of *V. natriegens*/TfoX plasmid was grown in LBv2 media (LB: 10.0 g/L Tryptone, 5.0 g/L Yeast Extract, 10.0 g/L NaCl; 204 mM NaCl, 4.2 mM KCl, 23.14 mM MgCl$_2$) with the addition of antibiotic (100 µg/mL carbenicillin) and 1 µM IPTG for 16 hours at 30° C. and 250 rpm. A transformation reaction was setup in a 2 mL Eppendorf tube with the following mixture:

350 µL 2× Instant Ocean
150 ng knockout cassette DNA (10 µL at 15 ng/µL)
3.5 µL 10 mM IPTG
3.5 µL 16-hour grown culture The transformation reaction was then incubated for 5 hours at 30° C. using a heat block. The reaction tube was then transferred to a culture tube with 1 mL LBv2 added and grown for 2 hours at 30° C. and 250 rpm. 100 µL of the culture was then spread onto plates of LB-Miller with chloramphenicol (5 µg/mL) and grown overnight in an incubator at 30° C. Grown colonies were screened and successful transformants of *V. natriegens* nadC– were sequence confirmed using colony PCR.

Example 5: Verification of NAD Auxotrophy of *V. natriegens* nadC Knockout Strain and Recovery with Complementary Plasmid Via Growth Assay To build plasmids supplying the complement nadC, two different gene cassettes encoding for nadC sourced from *V. natriegens* were cloned via isothermal assembly into pUC19. To maximally ensure that the control elements were fully captured and functional for expression of nadC, one design (pNadC$_1$) used a cassette that starts 142 bp prior to the upstream gene (ampD) of nadC, totaling 1,803 kb in size. Another design (pNadC$_2$) used a cassette that starts 30 bp into the ampD CDS, totaling 1,445 kb in size. Chemical competent cells for *V. natriegens* nadC– were made and each plasmid was subsequently transformed to produce the strains *V. natriegens* nadC–/pNadC$_1$ and *V. natriegens* nadC–/pNadC$_2$.

The four strains tested in the growth assay were *V. natriegens* (carrying a plasmid conferring ampicillin resistance, but no nadC gene on the plasmid), *V. natriegens* nadC– (nadC replaced with chloramphenicol resistance marker using methodology discussed in prior section), *V. natriegens* nadC–/pNadC$_1$, and *V. natriegens* nadC–/pNadC$_2$. Tested strains were inoculated from glycerol stocks and grown in 5 mL cultures of LBv2 media (LB: 10.0 g/L Tryptone, 5.0 g/L Yeast Extract, 10.0 g/L NaCl; 204 mM NaCl, 4.2 mM KCl, 23.14 mM MgCl2) with addition of appropriate antibiotic (100 µg/mL carbenicillin and/or 17 µg/mL chloramphenicol) for 24 hours at 30° C. and 250 rpm. For the growth assay, each strain was grown in 2 mL of M9 media (250 mL 2× M9 salts (Thermofisher), 1 mL 1 M MgSO4, 50 µL 1 M CaCl2), ddH2O added until 500 mL final volume), supplemented with 0.4% (w/v) glucose, 2% (w/v) NaCl, appropriate antibiotic (100 µg/mL carbenicillin and/or 17 µg/mL chloramphenicol), and in the presence or absence of 10 µg/mL nicotinic acid (NA) for 24 hours at 30° C. and 250 rpm. After the growth period, the OD600 of each culture was measured using a cuvette and spectrophotometer (NanoDrop One).

TABLE 3

Optical Density of *V. natriegens* Strains Grown in NAD-deficient Environment

| Strain | NA present (OD$_{600}$) | NA present (OD$_{600}$) |
|---|---|---|
| *V. Natriegens* | 1.37 ± 0.11 | 1.37 ± 0.10 |
| *V. Natriegens* nadC– | 1.31 ± 0.22 | 0.02 ± 0.02 |
| *V. Natriegens* nadC–/pNadC$_1$ | 1.33 ± 0.20 | 1.27 ± 0.13 |
| *V. Natriegens* nadC–/pNadC$_2$ | 1.48 ± 0.06 | 1.42 ± 0.12 |

Table 3 above represents data from an experiment showing engineered *V. natriegens* strains grown in media that is auxotrophic for *V. natriegens* nadC– when nicotinic acid (NA) is absent, and tests degree of recovery with *V. natriegens* nadC– complemented with nadC on plasmid (pNadC$_1$ and pNadC$_2$). Growth of each strain culture is measured by optical density (OD$_{600}$) of the grown cultures from a 24-hour growth period. Data shown is the mean and standard deviation of three technical replicate experiments.

The results of the growth assay confirmed that *V. natriegens* with nadC knocked out, and thus with no QAPRTase enzyme present to undergo de novo synthesis of NAD, is unable to grow thus confirming NAD auxotrophy in M9 media without NA for the knockout strain. Once a plasmid that supplied nadC (pNadC$_1$ or pNadC$_2$) was present in the knockout strain, the strain could now resume growth in M9 without NA and thus the strain no longer exhibits auxotrophy of NAD. Under these conditions, the cell must maintain the plasmid in order to survive, resulting in maintenance of the plasmid in the strain in the absence of antibiotics. These results prove the baseline condition that a framework utilizing *V. natriegens* nadC– and a designed plasmid possessing expression of nadC can be used as a means for antibiotic-free plasmid selection.

The nadC introduced above were made by using the exemplary cassette sequences below:

TABLE 4

Cassette sequences for nadC introduction

| SEQ ID NO: | Name | Sequence |
|---|---|---|
| 27 | pNadC$_1$ cassette | CGGCCACTTCCCTCGCTGTACACACAAAAATGTAGTTAATTTTCAA CAAAAGTAATTATTTTTTGTATACAAAAAGGCATGGTTGAAACCAT GCCTTATTGATTCTAGCTTTTATAATTTACATATTTATCACAACTT AATTTCAAATTAGTCGTCGATACTTGACCCAGTCAAAACTTAAGCC AGGGTCACTTTTTCTTAGCGGGGCGATGTACTGGTGGCCAGTAATT CGTTGAGGGGTAATGTTAGGGTATTGCGACATAATCGCTTGAGATA AACCCGCAAGTGACTGATATTGCTCATCTGTGTATGCGACAAACTC AGTCCCTTCCAGCTCAACACCTATCGAATAGTCATTGCATCCAGCT |

TABLE 4-continued

Cassette sequences for nadC introduction

| SEQ ID NO: | Name | Sequence |
|---|---|---|
| | | CGTCCGGCAAAACTTGACTGGCCAGCATGCCATGCTCTATCGAGAA<br>AGGACACAAACTGTACAATCTCGCCATTTCTCTTTATTAAGCAATG<br>AGCCGAAACCCCCATTTTGTGAATTACTTCAAAAAATGGATGTACT<br>TTCGGGTCCAATTTCCCACAGAAAAAGTCCTCTATATAAGGACCGC<br>CAAACTGGCCAGGCGGCAAACTGATGTTATGAACAACAAGCAGAGA<br>GATATCAGTGCTATCTGAACGAGCATCAAAAAAAGGCGACGGAACA<br>TGCTTTGCTTGCGTCAACCAGCCATTCTCGATTATTGGGGCATAT<br>CAACCTCTATAGTTTGCAAATTAACTGCTGAAATTATTGACACCGG<br>AGAGTATCATTCGTTGCCATCTCCCTTTCAAGACTAGATTTGCGAT<br>GAAGAACACACACAACAGCCAAGAACGCCTGGAATACCTGAAACAA<br>CAACTTCCTCTGGAGATCACTCGCTCCGTCGCCGATACCTTAAAAG<br>AAGACCTCGGCGGCACAGTGGATATCAACAACGATATCACCGCATC<br>TCTTATCCCTGAAGATGCCGTTAACACTGCGACGATCATTACACGT<br>GAGCACGGTGTGTTCTGCGGTCAGGCTTGGGCAGATGAAGTATTTA<br>AACAGCTGGGCGGTAAAGTGACTATCGAGTGGTATGTACAAGACGG<br>TGACAAGGTTGAACCAAACCAGACACTTTGTACCTTATCAGGCCCT<br>GCTCGTGACCTGCTTACTGGCGAGCGTAACGCGATGAACTTTATTC<br>AGACGCTTTCTGGTTGTGCGACCACAACGTCCGTGTACGCAGAAAA<br>GATCGCGCACACCGAGTGCCGTCTGTTAGATACGCGCAAAACTATT<br>CCGGGTCTGCGCAGCGCTCTAAAATACGCCGTAGCTTGTGGCGGTG<br>GCTTCAACCACCGTATCGGCGTATTCGATGCATACCTCATTAAAGA<br>AAACCACATCATTGCCTGCGGCGGCATCACTCAAGCGATCACAACA<br>GCAAAAGAGTTGAACCCTGGCAAACCAGTCGAAGTGGAAACAGAAA<br>GCTTAGACGAGTTAAAAGAAGCGATTGAAGCCGGTGCGGATATCAT<br>CATGCTGGATAACTTTACTAAAGAGATGATGCGTGAAGCAGTAGAA<br>ATCAACGCAGGTCGCGCAGCATTAGAAAACTCTGGCAACATCACCT<br>TAGACACCATCGCAGAATATGCAGAAACAGGCGTCGATTACATCTC<br>TGTCGGCGCGCTAACCAAGCACCTGAAAGCGATGGATCTTTCGATG<br>CGCTTCAAATAACCAATTAACAAAATCCATATTAAACAAGAAAATT<br>CAACAACTTATAAAACAAACATTAAATAAAGGGCCCTTTGGCCCTT<br>TGGCCCTTTATTTTTATCCGTAAAAAGCCAAATCAATCGCAATTCG<br>TTGCATATC |
| 28 | pNadC₂ cassette | CAACCAGCCATTCTCGATTATTGGGGGCATATCAACCTCTATAGTT<br>TGCAAATTAACTGCTGAAATTATTGACACCGGAGAGTATCATTCGT<br>TGCCATCTCCCTTTCAAGACTAGATTTGCGATGAAGAACACACACA<br>ACAGCCAAGAACGCCTGGAATACCTGAAACAACAACTTCCTCTGGA<br>GATCACTCGCTCCGTCGCCGATACCTTAAAAGAAGACCTCGGCGGC<br>ACAGTGGATATCAACAACGATATCACCGCATCTCTTATCCCTGAAG<br>ATGCCGTTAACACTGCGACGATCATTACACGTGAGCACGGTGTGTT<br>CTGCGGTCAGGCTTGGGCAGATGAAGTATTTAAACAGCTGGGCGGT<br>AAAGTGACTATCGAGTGGTATGTACAAGACGGTGACAAGGTTGAAC<br>CAAACCAGACACTTTGTACCTTATCAGGCCCTGCTCGTGACCTGCT<br>TACTGGCGAGCGTAACGCGATGAACTTTATTCAGACGCTTTCTGGT<br>TGTGCGACCACAACGTCCGTGTACGCAGAAAAGATCGCGCACACCG<br>AGTGCCGTCTGTTAGATACGCGCAAAACTATTCCGGGTCTGCGCAG<br>CGCTCTAAAATACGCCGTAGCTTGTGGCGGTGGCTTCAACCACCGT<br>ATCGGCGTATTCGATGCATACCTCATTAAAGAAAACCACATCATTG<br>CCTGCGGCGGCATCACTCAAGCGATCACAACAGCAAAAGAGTTGAA<br>CCCTGGCAAACCAGTCGAAGTGGAAACAGAAAGCTTAGACGAGTTA<br>AAAGAAGCGATTGAAGCCGGTGCGGATATCATCATGCTGGATAACT<br>TTACTAAAGAGATGATGCGTGAAGCAGTAGAAATCAACGCAGGTCG<br>CGCAGCATTAGAAAACTCTGGCAACATCACCTTAGACACCATCGCA<br>GAATATGCAGAAACAGGCGTCGATTACATCTCTGTCGGCGCGCTAA<br>CCAAGCACCTGAAAGCGATGGATCTTTCGATGCGCTTCAAATAACC<br>AATTAACAAAATCCATATTAAACAAGAAAATTCAACAACTTATAAA<br>ACAAACATTAAATAAAGGGCCCTTTGGCCCTTTGGCCCTTTATTTT<br>TATCCGTAAAAAGCCAAATCAATCGCAATTCGTTGCATATC |

While preferred embodiments of the present disclosure have been shown and described herein, such embodiments are provided by way of example only. Numerous variations, changes, and substitutions will occur without departing from the present disclosure. It should be understood that various alternatives to the embodiments described herein may be employed. It is intended that the following claims define the scope of the present disclosure and that methods and structures within the scope of these claims and their equivalents be covered thereby.

What is claimed is:

1. A genetically-modified *Vibrio natriegens* bacterial cell having a genetic modification with respect to a parent *Vibrio natriegens* bacterial cell of a strain selected from the group consisting of: *Vibrio natriegens* bacterial strain deposited under accession number NCIMB 857, *Vibrio natriegens* bacteria strain deposited under accession number ATCC 14048, *Vibrio natriegens* bacteria strain deposited under accession number DSM 759, and *Vibrio natriegens* bacteria strain deposited under accession number NBRC 15636; wherein the genetic modification is a modification of a chromosome 1 gene that has a polynucleotide sequence of SEQ ID NO: 1 prior to the modification and wherein the modification results in reduced expression of a polypeptide encoded by the polynucleotide sequence of SEQ ID NO: 1, as compared to a level of expression of the polypeptide encoded by the polynucleotide sequence of SEQ ID NO: 1 in the parent *Vibrio natriegens* bacterial cell.

2. The genetically-modified *Vibrio natriegens* bacterial cell of claim 1, wherein the genetically-modified *Vibrio natriegens* bacterial cell further comprises a genetic modification to one or more genes of the parent *Vibrio natriegens* bacterial cell, wherein the one or more genes are selected from the group consisting of: a DAM gene, a DNS gene, a KDO gene, a KdsD gene, a gutQ gene, a kdsA gene, a kdsB gene, a waaA gene, a msbA gene, a yhiD gene, an lpxL gene, an lpxM gene, and any combination thereof.

3. The genetically-modified *Vibrio natriegens* bacterial cell of claim 2, wherein the genetically-modified *Vibrio natriegens* bacterial cell comprises the genetic modification to the DNS gene.

4. The genetically-modified *Vibrio natriegens* bacterial cell of claim 3, wherein upon transformation of a template plasmid into the genetically-modified *Vibrio natriegens* bacterial cell, the genetically-modified *Vibrio natriegens* bacterial cell expresses the template plasmid with a reduced amount of plasmid multimers or concatemers, relative to an amount of plasmid multimers or concatemers produced in the same amount of time upon transformation of the template plasmid into the parent *Vibrio natriegens* bacterial cell.

5. The genetically-modified *Vibrio natriegens* bacterial cell of claim 2, wherein the genetically-modified *Vibrio natriegens* bacterial cell comprises the genetic modification to the DAM gene.

6. The genetically-modified *Vibrio natriegens* bacterial cell of claim 2, wherein the genetically-modified *Vibrio natriegens* bacterial cell comprises the genetic modification to the KdsD gene, the lpxL gene, or the lpxM gene.

7. The genetically-modified *Vibrio natriegens* bacterial cell of claim 1, wherein the parent *Vibrio natriegens* bacterial strain is the *Vibrio natriegens* bacterial strain deposited under accession number NCIMB 857.

8. The genetically-modified *Vibrio natriegens* bacterial cell of claim 1, wherein the genetic modification comprises a deletion of the polynucleotide sequence of SEQ ID NO: 1, or a base substitution in the polynucleotide sequence of SEQ ID NO: 1.

9. The genetically-modified *Vibrio natriegens* bacterial cell of claim 1, wherein upon culturing the genetically-modified *Vibrio natriegens* bacterial cell in a growth medium, the genetically-modified *Vibrio natriegens* bacterial cell replicates with reduced secretion of endotoxin into the growth medium, as compared to an amount of endotoxin secreted by replicating an *E. coli* K12 or B strain derivative lacking the genetic modification in the growth medium for the same amount of time.

10. The genetically-modified *Vibrio natriegens* bacterial cell of claim 1, wherein upon transformation of a template plasmid into the genetically-modified *Vibrio natriegens* bacterial cell, the genetically-modified *Vibrio natriegens* bacterial cell:
   (a) replicates the template plasmid at an increased level, or
   (b) expresses a transgene encoded by the template plasmid at an increased level, as compared to a level of template plasmid replication or transgene expression, respectively, produced in the same amount of time upon transformation of the template plasmid into *E. coli* K12 or B strain derivative lacking the genetic modification.

11. The genetically-modified *Vibrio natriegens* bacterial cell of claim 10, wherein upon transformation of the template plasmid into the genetically-modified *Vibrio natriegens* bacterial cell, the genetically-modified *Vibrio natriegens* bacterial cell replicates the template plasmid at the increased level, relative to the level of template plasmid replication produced in the same amount of time upon transformation of the template plasmid into the *E. coli* K12 or B strain derivative lacking the genetic modification.

12. The genetically-modified *Vibrio natriegens* bacterial cell of claim 11, wherein upon transformation of the template plasmid into the genetically-modified *Vibrio natriegens* bacterial cell, the genetically-modified *Vibrio natriegens* bacterial cell replicates the template plasmid at a level that is at least 200% greater than the level of template plasmid replication produced in the same amount of time upon transformation of the template plasmid into the *E. coli* K12 or B strain derivative lacking the genetic modification.

13. The genetically-modified *Vibrio natriegens* bacterial cell of claim 1, wherein upon culturing the genetically-modified *Vibrio natriegens* bacterial cell in a growth medium, the genetically-modified *Vibrio natriegens* bacterial cell has a cellular replication rate that is at least 150% faster than a replication rate of a bacterial cell of an *E. coli* K12 or B strain derivative lacking the genetic modification that is replicated in the growth medium for the same amount of time, as measured by optical density at 600 nm.

14. The genetically-modified *Vibrio natriegens* bacterial cell of claim 13, wherein upon culturing the genetically-modified *Vibrio natriegens* bacterial cell in the growth medium, the genetically-modified *Vibrio natriegens* bacterial cell replicates with a doubling time of less than 22 minutes, as measured by optical density at 600 nm.

15. A method of making a genetically-modified *Vibrio natriegens* bacterial cell, the method comprising:
(a) obtaining a parent *Vibrio natriegens* bacterial cell of a strain selected from the group consisting of: a *Vibrio natriegens* bacterial strain deposited under accession number NCIVB 857, a *Vibrio natriegens* bacteria strain deposited under accession number ATCC 14048, a *Vibrio natriegens* bacteria strain deposited under accession number DSM 759, and a *Vibrio natriegens* bacteria strain deposited under accession number NBRC 15636; and
(b) performing a modification of a chromosome 1 gene of the parent *Vibrio natriegens* bacterial cell that has a polynucleotide sequence of SEQ ID NO: 1 prior to the modification, thereby generating the genetically-modified *Vibrio natriegens* bacterial cell.

16. The method of claim 15, wherein upon transformation of a template plasmid into the genetically-modified *Vibrio natriegens* bacterial cell, the genetically-modified *Vibrio natriegens* bacterial cell expresses the template plasmid with a reduced amount of plasmid multimers or concatemers, relative to an amount of plasmid multimers or concatemers produced in the same amount of time upon transformation of the template plasmid into the parent *Vibrio natriegens* bacterial cell.

17. The method of claim 15, wherein the parent *Vibrio natriegens* bacterial cell is the *Vibrio natriegens* bacterial strain deposited under accession number NCIMB 857.

18. A method of replicating a template plasmid with reduced occurrence of plasmid multimers or concatemers in a genetically-modified *Vibrio* bacterial cell, the method comprising:
(a) obtaining the genetically-modified *Vibrio* bacterial cell, wherein the genetically-modified *Vibrio* bacterial cell comprises a genetic modification with respect to a parent *Vibrio natriegens* bacterial cell of a strain selected from the group consisting of: a *Vibrio natriegens* bacterial strain deposited under accession number NCIVIB 857, a *Vibrio natriegens* bacteria strain deposited under accession number ATCC 14048, a *Vibrio natriegens* bacteria strain deposited under accession number DSM 759, and a *Vibrio natriegens* bacteria strain deposited under accession number NBRC 15636; wherein the genetic modification is a modification of a chromosome 1 gene that has a polynucleotide sequence of SEQ ID NO: 1 prior to the modification and wherein the modification results in reduced expression of a polypeptide encoded by the polynucleotide sequence of SEQ ID NO: 1, as compared to a level of expression of the polypeptide encoded by the polynucleotide sequence of SEQ ID NO: 1 in the parent *Vibrio natriegens* bacterial cell; and
(b) transforming the template plasmid into the genetically-modified *Vibrio* bacterial cell, thereby replicating the template plasmid in the genetically-modified *Vibrio* bacterial cell;
wherein the template plasmid is replicated in the genetically-modified *Vibrio* bacterial cell with reduced levels of plasmid multimers or concatemers, relative to an amount of plasmid multimers or concatemers produced in the same amount of time upon transformation of the template plasmid into a bacterial cell of a parent *Vibrio natriegens* bacterial cell lacking the genetic modification.

* * * * *

SEQUENCE LISTING

```
Sequence total quantity: 28
SEQ ID NO: 1              moltype = DNA  length = 1068
FEATURE                   Location/Qualifiers
source                    1..1068
```

|   | mol_type = other DNA |   |
|---|---|---|
|   | organism = synthetic construct |   |

SEQUENCE: 1

```
atgaataaat cggagaaagt aatggacgag aacaaacaga aagcgctcgc cgctgcgcta   60
ggtcaaattg aaaaacaatt cggtaaaggc tcaatcatgc gccttggcga taaccgcgca  120
atggacgtag aaaccatctc aacgggttct ctttctcttg atatcgcttt gggtgctggt  180
ggcttaccga tgggccgtat tgttgaagta tacggtccgg aatcttcggg taaaacgaca  240
ctaactcttg aacttattgc agcagcacag cgtgaaggca aaacttgtgc gtttatcgat  300
gcggagcacg ctctggatcc tgtatacgcg aagaagcttg gcgtagatat cgatgcactt  360
ttggttttctc agcctgatac gggtgagcaa gcgctagaaa tctgtgacgc attagcgcgc  420
tctggtgcta tcgacgtaat ggttgtcgac tctgtggcag cactgactcc aaaagcagaa  480
atcgaaggcg aaatgggcga cagccacatg ggtctccaag ctcgtatgct ttctcaagcg  540
atgcgtaagc taacaggtaa cctgaagcag tctaactgta tgtgtatctt catcaaccaa  600
atccgtatga agattggtgt gatgttcggt aacccagaaa caacaactgg cggtaacgca  660
cttaaattct acgcatcggt tcgtcttgat atccgtcgta ctggcgcaat caaagaaggc  720
gacgaagttg taggtaacga aactcgcatc aaagtcgtta agaacaagat tgcagccaca  780
tttaaagaag caaacacgca gatcatgtat ggtcaaggct taaccgcga aggtgagctg  840
gtagacttag gcgtgaagca caaactggtt gaaaaagcgg gtgcttggta cagctacaat  900
ggcgacaaga tcggtcaggg caaagcaaat gcttgtaatt acctgcgtga acatacgaaa  960
gttgctcaga ctatcgacaa gaaacttcgt gagatgcttt tgtctccagc tgtagctgag 1020
ggacctgaag ccggtgaaat gccagagaag aagaagaag agttttaa              1068
```

| SEQ ID NO: 2 | moltype = DNA length = 696 |
|---|---|
| FEATURE | Location/Qualifiers |
| source | 1..696 |
|   | mol_type = other DNA |
|   | organism = synthetic construct |

SEQUENCE: 2

```
atgaaatacc tgttctcttt attcattctt gcactatcca gtgccgccgt ggccgcgcca   60
ccaagttcat tttcagccgc taagcgcgaa gcggtaaaaa tctatcaaga tcatcccacc  120
agcttttatt gcggctgtga tattcaatgg caaggcaaga aaggcttacc tgatctttcc  180
tcttgtggtt accaggttcg caaacaagaa aagcgtgctt cacgcatcga gtgggaacat  240
gtcgttccag cttggcaatt tgggcaccag ctgcaatgct ggcaaagcgg tggtcgtaaa  300
aactgctcgc gtaatgacaa aacattccgc tcaatgacaa ccgatctgca caacctgact  360
cctgcgattg gtgaggtaaa tggtgatcgc tctaactaca atttcagtca gtggaatggg  420
atcgatggcg caacctatgg tcgttgtgaa gtccaggtaa acttcaagca acgcaaagtc  480
atgccacccg atcgagcacg cggctccatc gctcgtacct atctttatat gagcaaggag  540
tacggcttca aactgtccaa gcaacaaact cagttaatga gtgcatggaa caaaacctac  600
ccagccgata aatgggaatg cgaacgcgat aagcgcattg ccaaagtaca aggcaaccat  660
aatccattcg ttcaagaggc ctgtcgcgca ctgtaa                          696
```

| SEQ ID NO: 3 | moltype = AA length = 316 |
|---|---|
| FEATURE | Location/Qualifiers |
| source | 1..316 |
|   | mol_type = protein |
|   | organism = Vibrio natriegens |

SEQUENCE: 3

```
MSKDKQMQPE FSLSLLHPRN WGVWIGFGLL AIIVNILPYR LLLSLGQSVG KLGMRYGKKR   60
VHVAKRNLEL AFPDKSQEDI EHIVTENFKN TGMALIETGI TWFWPTWRFK TLLVEKDVGA  120
LKEKAQEGKG VLLCCVHALN LEITARAFAV MGLAGYGAFR PHDNPAYNFI QYWGRTHNGN  180
KLIDRKDVKK MIRVLRSGER LFYLPDHDYG RNKSVYVPFF AVEDACTTTG TSILAYTSKC  240
AIVPGSGFRN EQGKYEIIAD KCIEADYPQK DEVAAAAYMN KYVEEVILRA PEQWMWLHKR  300
YKTMQDENVP KGIRYR                                                 316
```

| SEQ ID NO: 4 | moltype = DNA length = 951 |
|---|---|
| FEATURE | Location/Qualifiers |
| source | 1..951 |
|   | mol_type = genomic DNA |
|   | organism = Vibrio natriegens |

SEQUENCE: 4

```
ttatctgtag cgaatgcctt ttggcacgtt tcatcctgc atggttttgt agcgcttatg    60
cagccacatc cattgttcag gagcgcgtaa gatgacttct ccacgtatt tgttcatgta   120
cgctgcggcg gcaacttcgt cttttttgcg gataatcggt tcaatgcatt tatctgcaat  180
gatttcatac ttgccctgct cattacgaaa gcctgaaccc cacactttga  240
tgtataagcc agaatgcttg tacctgtggt ggtacacgca tcttcactg cgaagaatgt  300
tacatacacc gatttgttgc gtccgtaatc gtggtcaggt aggtagaaca gacgttcacc  360
actacgcagc acgcgaatca tcttttttcac gtctttacgg tcaatcagtt tgttgccgtt  420
atgggtgcgt cccagtact gaataaaatt gtaagctggg ttgtcatgtg gacgaaacgc  480
gccgtaaccc gcaagtccca tgactgcaaa agcacgtggt gtaatttcaa ggttcaatgc  540
atgcacacag cagagtagga cgcctttcc ttcttgcgcc ttttcttca gagcaccaac  600
atctttttcc actagcagcg ttttaaagcg ccaagttggc cagaaccagg taatgccggt  660
ttcgatcagt gccatgccgg tgttttgaa gtttcggta acgatatgtt cgatgtcttc  720
ttgagacttg tccggaaaag ccaactcaag gttacgcttt gcgacgtgta ctcgtttttt  780
accataacgc atgccaact tacccaccga ttggcccaac gacagaagca agcggtaagg  840
aagaatatta acgatgatcg ccagtagacc aaacccatc catacccccc agttacgtgg  900
atggagaagg gaaagagaaa actctggctg catttgtttg tctttactca t           951
```

| SEQ ID NO: 5 | moltype = AA length = 316 |
|---|---|
| FEATURE | Location/Qualifiers |

```
source                  1..316
                        mol_type = protein
                        organism = Vibrio natriegens
SEQUENCE: 5
MNKQKEPVFE ARFLMPRYWG TLLIIGVMYL LSLLPFKFQL FLGRNIGRLA MRLMKKRQVT    60
IRRNLELCFP KMDESKREAI LKANIDNSGI ALFETAMAWF WSDRRVNKHV TIKGMEHLEA   120
LERDGKGVLM LAVHSMNLEL GARAFGIQKS GMGVYRPNNN PCFDYFQYKG RSRSNRTLID   180
RKNVRGMLDA LNSGNRVWYA PDHDYGTRRS TFAPLFAVKN ACTTTGTSLL VDATDCAIVP   240
FTMVRGDDGH YTLTIRKPVD GFPKGDTRNA AIFINKIVEE SIMASPSQYM WLHRRFKTRP   300
QGEDCLYNPQ LIPAMS                                                   316

SEQ ID NO: 6            moltype = DNA   length = 951
FEATURE                 Location/Qualifiers
source                  1..951
                        mol_type = genomic DNA
                        organism = Vibrio natriegens
SEQUENCE: 6
atgaacaaac aaaaagagcc tgttttcgag gctcggttcc taatgcctcg gtactgggga    60
actctactca tcatcggggt gatgtattta cttagtcttc ttcctttcaa atttcagtta   120
ttcctgggac gtaacattgg ccgtttggcc atgcgattaa tgaaaaagcg tcaggtcacc   180
attcgtcgca atttagagct ctgttcccg aagatggacg agagcaaacg agaagcgata    240
ctgaaggcaa acatcgataa ttctggcatt gcactgtttg caacagcgat ggcttggttc   300
tggtcggatc gcagggttaa taaacacgta acgataaaag ggatggaaca cctagaagcg   360
ttagaaaggg acggtaaagg ggtgctgatg cttgccgttc attccatgaa cttagagctg   420
ggtgcacgtg catttggcat tcaaaaatct ggaatgggtg tttatcgacc gaataacaac   480
ccttgttttg actattttca gtacaagggt cgttcgcgtt ccaatcgtac tttgatcgat   540
cgtaaaaatg ttagaggaat gctggatgct tgaattcag gcaatcgcgt ttggtatgcg    600
cctgaccatg attatggaac cagaagatcg acctttgcgc ctttgtttgc tgtcaaaaac   660
gcctgtacca acacaggcac cagtttactt gtcgatgcta cagattgtgc cattgtgccg   720
tttaccatgg taagagggga tgatggccat tacacattaa cgatcaggaa gccagttgat   780
ggatttccta aaggtgatac ccgaaacgcg gcgatttta tcaataaaat tgttgaagag    840
tcgattatgg ccagccctag tcaatacatg tggttacacc gccggtttaa aaccagaccg   900
caaggtgaag attgtttgta caatcctcag ttaatcccag cgatgagtta g            951

SEQ ID NO: 7            moltype = AA    length = 323
FEATURE                 Location/Qualifiers
source                  1..323
                        mol_type = protein
                        organism = Vibrio natriegens
SEQUENCE: 7
MSRQFDFRAA AKQVLDIEVA ALQELDKYFD DQFEQACEMI LSNSGKVVIM GMGKSGHIGN    60
KIAATLASTG TSAFFVHPGE ASHGDLGMIS AGDIVIAISN SGESHEILSL FPVLKRLNIK   120
IISMTGKPES NMAQLSDLHL QITVPQEACP LGLAPTSSTT ATLVMGDALA VALLQARGFS   180
AEDFALSHPG GALGRKLLLK LSDIMHFGNA LPKVSPDSLI RDALLEISEK GLGMTAIVDE   240
HDAMLGIFTD GDLRRTLDKR IDIHTTAIGE VMTQSPTTAH PDMLAVEGLN LMQSKNINAL   300
ILCNNGKVVG ALNMHDLLKA GVM                                           323

SEQ ID NO: 8            moltype = DNA   length = 972
FEATURE                 Location/Qualifiers
source                  1..972
                        mol_type = genomic DNA
                        organism = Vibrio natriegens
SEQUENCE: 8
atgtcccgtc aatttgattt tcgcgctgct gcaaagcaag ttcttgatat tgaagttgcc    60
gctctgcaag agctggataa atactttgat gaccaatttg aacaagcttg cgaaatgata   120
ctttccaata gcggaaaagt ggtcatcatg ggcatgggca atcaggcca cattggaaat    180
aaaattgcgg cgacgcttgc aagtacaggg acttcggcgt tttttgttca tccgggtgaa   240
gcttcacatg gtgacttagg tatgatcagc gccggagaca ttgtgattgc catttcaaac   300
tctggcgaat cccatgagat cctgtcgctg ttcccggtcc tgaaacgctt aaacatcaag   360
atcatcagca tgacgggcaa gccagaatcg aacatggtcg ccaactgtca gattcactta    420
cagatcacgg taccacaaga agcctgccct cttggtttgg caccaaccag cagtacaaca   480
gcaacgttag tcatgggcga tgccttggcg gttgcgctgc ttcaggctcg tggattctcc   540
gctgaagatt tcgcgctgtc acaccccggt ggtgcactag aagaaaaact gctgcttaag   600
ttgtctgata ttatgcattt tggaaatgct ctgccgaaag tctctcctga ttcgctgatt   660
cgcgacgcac ttctggagat ttctgaaaaa ggactgggga tgaccgccat tgtcgatgag   720
cacgatgcta tgcttggtat attcactgat ggcgacttac gcagaacttt agacaagcgt   780
attgatattc tacaaccgc cattggcgaa gtgatgacgc aaagcccaac aactgcgcat    840
ccagacatgc ttgcagttga aggtctcaac ctaatgcaaa gcaaaaatat caatgcgctg   900
atttatgta ataacggtaa agtggtcggt gcacttaata tgcatgattt actaaaagcg    960
ggtgtgatgt aa                                                       972

SEQ ID NO: 9            moltype = AA    length = 696
FEATURE                 Location/Qualifiers
source                  1..696
                        mol_type = protein
                        organism = Vibrio natriegens
SEQUENCE: 9
MKKLHISSCS LNQTPMDWSG NLHNIQKAIK IAHQAGAELL ITPELCISGY GCEDFFHSPH    60
VSERALKSVS DLTQSIPNSM AVSVGLPVMI NNRVYNGVAL VTHEGIQGIS LKRNLAANGL   120
```

```
HYEQRWFTPW TRDKNATVVL KEGTPPVRVG NLVYSVNGVK VGFEICEDAW VADRTSERFF    180
NQGVEVIANP SASHFSIGKS LTRKRLVEES SRVYSACYVY SNLSGCESGR AIYDAGVMIA    240
VDGSLVAKGE RFHMSDVEVV TADIDLSRSR IGQINSSQRY YEEHDFDTEA VVKVTLSKSL    300
SSPKLHVPPL NQPWEDSEYL EHEEALRAIA IGLRDWLRKT HTGGYALSLS GGADSALVAS    360
AVYTSVILEL WELVTKTEKD DECSLPDHLS QFLSEDQRSK FKQAGSSNKL EQFVRDTASA    420
IMANMLTTAY QASANSGSVT RTAAQKVAES FGAKFLNLSV AEVVKNYESM ISKATNLELN    480
WNDHDIALQN IQARVRSPSI WFIANLENKL LLTTSNMSEG AVGYCTMDGD SSGVLAPISG    540
VTKSRILKLL VWLEQKGFYC TGNHIMKLEA LSYINNQRPT AELRPEEQSD EEDLMPYDVL    600
DRMVFLTLEA GMSPRDIFDA MTEEFERVDN QTMATYIVKF FKLLFRNQWK RDRQAPGFHI    660
ELNSLDPKTY KRFPLLSSGY QEELAFIEDN CWMKDS                             696

SEQ ID NO: 10            moltype = DNA   length = 2091
FEATURE                  Location/Qualifiers
source                   1..2091
                         mol_type = genomic DNA
                         organism = Vibrio natriegens
SEQUENCE: 10
gtgaagaaac tgcatattag ctcatgctca ctaaaccaga ctccaatgga ttggagtgga     60
aacctgcata acattcaaaa agcaatcaag attgcacatc aagctggagc cgaactgctt    120
attacgccag agttgtgtat ttctggttat ggctgtgaag attttttcca tagtcctcat    180
gtctctgagc gcgcactgaa aagtgtctct gacctaacgc agtcgattcc caatagcatg    240
gcggtatctg ttggcttacc cgtgatgatt aacaatgcag tttacaacgg tgttgcgctg    300
gttacgcatg aaggaattca aggcatctct ctaaagcgga atttagctgc gaatggcctt    360
cattatgagc aacgttggtt tacgccatgg actcgagata aaaacgcgac ggtggtactc    420
aaagaaggga caccacctgt gcgtgttggc aatctggttt acagcgttaa cggtgtcaaa    480
gttggctttg aaatctgcga ggatgcctgg gttgccgaac gcacttcaga acgtttcttc    540
aaccaaggtg ttgaagtgat tgctaaccca agtgctagtc acttttcgat aggtaaatct    600
ctcactcgta agcggctggt ggaagagtca agccgcgtat attcggcctg ttatgtgtat    660
tccaatctat cagggtgtga atctggccgg gcaatttatg atgctggcgt gatgattgcg    720
gttgatgcca gtttggttgc caaaggcgaa cgttttcaca tgagtgatgt ggaggttgta    780
acggccgata tcgacttatc ccgcagcagg attggccaaa tcaatagtag tcaacgctat    840
tatgaggaac atgactttga tacagaggct gtcgtcaaag taacgctcag taaatctctt    900
agctctccca agttgcatgt accgccgcta aatcagcctt gggaagatag tgaatatttg    960
gaacatgaag aagcttttgc gtgcgatagc ataggtttac gtgattggct tcgaaaaacg   1020
cacactggtg gctacgcgct ttcattaagt ggcggagcag actctgcttt ggtcgctagt   1080
gctgttttata catccgttat cctgaacttt gggagctggg ttaccaaaac agagaaagat   1140
gacgagtgtt cactaccaga ccatttgagt caattttga gcgaagatca aaggagtaaa   1200
ttcaaacagg cggggtcctc aaacaaacta gagcaattcg tcagggatac ggcatcagca   1260
ataatgcga acatgctgac aactgcgtat caggccagcg cgaacagcgg ttccgttact   1320
cgtactgctg cgcaaaaagt agcggagtca tttggtgcga aatttctaaa cctcagtgtt   1380
gccgaggtgg tgaagaatta cgagtcgatg atatcaaaag caaccaatct agagctcaat   1440
tggaatgatc atgatattgc gctgcaaaat attcaggcac gtgtgcgctc tccaagtatt   1500
tggttcatcg ctaatctgga aaataaactg ctgctagcaa ctcggaaggg   1560
gcggtaggtt actgcacaat ggatggtgat tcttccggag tcctcgcacc tatttccggt   1620
gtcactaaaa gccgaattct caagttactg gtatggctag agcaaaaagg gttttattgc   1680
actggtaatc acatcatgaa gctagaagcg ctttcttata tcaataatca acgtccaacg   1740
gcggagttgc gccccgaaga acaaagtgat gaagaggatt tggccttag tgatgtgctc   1800
gatcgtatgg ttttttgac cttagaagcc ggtatgtcac aaggggatat ttttgatgcg   1860
atgacggaag aatttgaacg cgtagacaac caaaccatgg ccacatatat cgtcaaattt   1920
tttaagttgc tgtttcgcaa tcaatggaaa cgcgatcgtc aggctccggg gtttcatatc   1980
gaactcaata gcctggatcc gaaaacctat aaacgttttc cgcttctaag ctctggatac   2040
caagaggagc tagccttcat cgaggataat tgctggatga agacagcta g             2091

SEQ ID NO: 11            moltype = AA    length = 279
FEATURE                  Location/Qualifiers
source                   1..279
                         mol_type = protein
                         organism = Vibrio natriegens
SEQUENCE: 11
MKKQRAFLKW AGGKYGLVED IQRHLPPARK LVEPFVGAGS VFLNTDYDQY LLADINPDLI     60
NLYNLIKARP EEYISEAKRW FVAENNRKEA YLSIRAEFNK TDDVMYRSLA FLYMNRFGFN    120
GLCRYNKKGG FNVPFGSYKK PYFPEAELEF FAEKAKKATF VCEGYPETFR RARKGSVVYC    180
DPPYAPLSNT ANFTSYAGNG FTLDDQAALA DIAERTATER GIPVLISNHD TTLTRRLYHG    240
ADLSVVKVKR TISRNGSGRN KVDELLALFN TPDSDSAAS                           279

SEQ ID NO: 12            moltype = DNA   length = 840
FEATURE                  Location/Qualifiers
source                   1..840
                         mol_type = genomic DNA
                         organism = Vibrio natriegens
SEQUENCE: 12
ctatgaagca gcgctgtctg aatcagggt attaaaagc gccagcagtt catcaacttt      60
atttcgacca ctgccattac ggctgatggt gcgcttcact tttaccacgc tcaaatccgc    120
tccgtggtat aaacgacgcg ttaatgttgt atcgtggttt gaaatcagta ccggaatgcc    180
gcgttcagtg gcggttcttt ccgcgatatc ggccagtgcc gcctgatcat cgagcgtaaa    240
cccatttcct gcataagagg tgaagtttgc ggtatttgaa agcggcgcat acggtggatc    300
gcagtaaaca cactgccttt acgcgcacg gcgaaacgtc tcgggatagc cttcacaaac    360
aaacgtggct tcttggcttt tttctgcaaa gaactccagt tcagcttcag ggaaatacgg    420
tttcttgtat gaccccaaacg ggacattgaa accgcctttt tgttgtaac ggcacaggcc    480
```

```
attaaaacca aaacggttca tgtaaagaaa agcaagtgag cgatacatca cgtcgtcagt    540
cttgttgaac tcagcgcgaa tactcagata agcttctttg cggttatttt cggccacgaa    600
ccagcgcttc gcctcagaga tatattcctc cggacgcgct ttaataaggt tatacagatt    660
gatcaaatcc gggttgatat cagccagtaa atactgatcg taatctgtat tcaaaaaaac    720
agagccagcg ccaacaaaag gttcaactag ctttcgagcc ggtggtaaat gacgttggat    780
gtcttcaacc agtccgtatt ttcctcctgc ccatttagaa aggctcgtt  gcttttttcat   840
```

```
SEQ ID NO: 13          moltype = AA   length = 417
FEATURE                Location/Qualifiers
source                 1..417
                       mol_type = protein
                       organism = Vibrio natriegens
SEQUENCE: 13
MAILQIGAGG VGWVVAHKAA QNNDVLGDIT IASRTVGKCE KIIESIQKKN NLKDSTKKLE    60
ARAVVNADDVD SLVALIKEVK PDLVINAGPP WVNMPIMEAC YQAKVSYLDT SVAVDLCSEG   120
QQVPQAYDWQ WGYREKFEEA GITGILGAGF DPGVVSVFAA YAVKHLFDEI DTIDVMDVNA   180
GDHGKKFATN FDPETNMLEI QGDSFYWENG EWKQVPCHSR MLEFEFPNCG SHKVYSMAHD   240
EVRSMKEFIP AKRIEFWMGF GDRYLNYFNV MRDIGLLSPD PLTLHDGTVV QPLHVLKALL   300
PDPTSLAPGY TGLTCIGTWV QGKKDGKERS VFIYNNADHE VAYEDVEHQA ISYTTGVPAI   360
TAALQFFRGE WADKGVFNME QLNPDPFLET MPSIGLDWHV QELEAGQGLP VIHELKK      417
```

```
SEQ ID NO: 14          moltype = DNA   length = 1254
FEATURE                Location/Qualifiers
source                 1..1254
                       mol_type = genomic DNA
                       organism = Vibrio natriegens
SEQUENCE: 14
ttactttta  agttcgtgga taactggaag tccctgacct gcttcaagct cttgaacatg    60
ccaatccaga ccgatagaag gcatggtttc caggaacgga tctgggttta gctgttccat   120
attgaacaca ccttatccg  cccactcgcc acggaagaat tgcagtgccg cagtgatcgc   180
tggtacacct gtggtgtaag agatcgcctg gtgctctacg tcttcgtatg ccacttcgtg   240
gtcagcattg ttatagatga agacactgcg ctctttaccg tctttcttac cttgaaccca   300
agtaccgata cacgttagac cggtgtagcc tggtgcaaga gaagttggat ctggtagtag   360
cgcttttcaat gctgcagag gctgtactac tgtaccatcg tgcagcgtta gtggatctgg   420
gctcaatagg ccgatatcac gcattacatt gaagtagttt aggtaacggt caccgaaacc   480
catccagaat tcaatgcgtt ttgcagggat gaattcctttc attgaacgaa cttcatcgtg   540
cgccattgag tacactttgt gtgaaccaca gttagggaat tcaaactcaa gcatacgaga   600
gtgacaaggt acttgtttcc actcgccatt tcccagtag  aaagagtcgc cttggatctc   660
tagcatgttg gtttctgggt cgaagtttgt cgcaaacttc ttaccgtggt caccagcgtt   720
tacgtccatt acgtcgatag tatcgatttc atcgaacaga tgcttaactg cgtacgctgc   780
aaataccgat actacgcctg gatcgaaacc agcacctagg atacctgtga tgcccgcttc   840
ttcgaacttc tcacggtaac cccactgcca atcataagcc tgaggtactt gctgaccttc   900
agaacacagg tcaactgcca ctgatgtatc caggtatgac actttcgctt ggtaacatgc   960
ttccatgatt ggcatgttta cccatggagg accagcgttg atcacaagat caggcttcac  1020
ttctttaata agagcaacaa gagaatctac gtcgtcagca ttaactgctc tagcttctaa  1080
tttcttagtt gaatctttca ggttgttttt cctctgaata gattcgatga ttttctcaca  1140
cttacctacg gtacgtgatg cgattgtgat atcacccaga acgtcgttgt tttgtgctgc  1200
tttgtgtgca actacccagc caacgccgcc tgcaccaatc tgtagaattg ccat         1254
```

```
SEQ ID NO: 15          moltype = AA   length = 257
FEATURE                Location/Qualifiers
source                 1..257
                       mol_type = protein
                       organism = Vibrio natriegens
SEQUENCE: 15
MKLFDTHCHF DFDVFQDDFE HNLALAQEQG VSRILIPSVG PSNWSRIQTL AEKYSHLYYA    60
LGFHPYFLEE NFEQHLAELE HYLKQKPPQC VAIGECGLDF AIDVDPQLQE KVLETQFELA   120
RRFDLPVILH SRKAHNRLVQ MVKAAKLPKG GVVHAFAGSY QQAMEWVRLG FFIGVGGTIT   180
YPRAQKTRDA IQKLALENLL IETDAPDMPI LGYQGQPNHP AKLIHVLNVL VELRRGEKQS   240
IASQLWKNSN FAFSICE                                                 257
```

```
SEQ ID NO: 16          moltype = DNA   length = 774
FEATURE                Location/Qualifiers
source                 1..774
                       mol_type = genomic DNA
                       organism = Vibrio natriegens
SEQUENCE: 16
ctattcacat attgagaagg caaaattgct attttttccac agttgcgacg caatcgattg    60
cttttctcct ctacgcaact ctacgagcac atttaataca tgaatgagtt tcgccgggtg   120
gttgggctgc ccctgatatc caagtatagg catatctgga gcgtctgttt cgataagtag   180
gttttctagg gctaattttt gaattgcgtc gcggtttttt tgggctcgtg gtaggtaat    240
agtaccccct acaccgatga aaaaacctaa tctgacccac tccatcgctt gctgatagct   300
accagcaaaa gcatgtacga caccgccttt aggtagcttc gccgctttga ccatttgaac   360
aagtcgattg tgtctttttc ggctatgtaa aataaccgga aggtcgaaac gtctggcgag   420
ctcaaattga gtttcaagca ccttttcttg caattgggga tcgacgtcaa tagcaaaatc   480
taatccgcac tcgccattg  caacgcactg tggcggcttt tgtttgagat aatgctccag   540
ctcagcaagg tgctgctcaa agttctcttc cagaaaatac ggatggaacc cgagcgcata   600
gtataagtgt gagtatttct cggctaaggt ttgaatgcgt gaccagtttg aaggtccgac   660
tgagggtatc aggattcggc tcacccccttg ttcttgagca agagccaggt tgtgctcaaa   720
```

```
atcatcctga aacacgtcaa aatcaaaatg acagtgcgta tcaaaaagct tcat         774

SEQ ID NO: 17           moltype = AA   length = 348
FEATURE                 Location/Qualifiers
source                  1..348
                        mol_type = protein
                        organism = Vibrio natriegens
SEQUENCE: 17
MDENKQKALA AALGQIEKQF GKGSIMRLGD NRAMDVETIS TGSLSLDIAL GAGGLPMGRI    60
VEVYGPESSG KTTLTLELIA AAQREGKTCA FIDAEHALDP VYAKKLGVDI DALLVSQPDT   120
GEQALEICDA LARSGAIDVM VVDSVAALTP KAEIEGEMGD SHMGLQARML SQAMRKLTGN   180
LKQSNCMCIF IKQIRMKIGV MFGNPETTTG GNALKFYASV RLDIRRTGAI KEGDEVVGNE   240
TRIKVVKNKI AAPFKEANTQ IMYGQGFNRE GELVDLGVKH KLVEKAGAWY SYNGDKIGQG   300
KANACNYLRE HTEVAQTIDK KLREMLLSPA VAEGPEAGEM PEKKEEEF               348

SEQ ID NO: 18           moltype = DNA   length = 1220
FEATURE                 Location/Qualifiers
source                  1..1220
                        mol_type = genomic DNA
                        organism = Vibrio natriegens
SEQUENCE: 18
cgtgataagc tctgcggcaa agttatacgt agatcagcta aagttttttc tatacaggta    60
tagacactgt atgaatcaac agtataataa cttcattgc tgagcgatta actgctcaag   120
aaaagtttaa tgactattcg tcgcccaaaa agatgaataa atcggagaaa gtaatggacg   180
agaacaaaca gaaagcgctc gccgctgcgc taggtcaaat tgaaaaacaa ttcggtaaag   240
gctcaatcat gcgccttggc gataaccgcg caatgacgtg agaaaccatc tcaacgggtt   300
ctctttctct tgatatcgct ttgggtgctg gtgccttacc gatgggccgt attgttgaag   360
tatacggtcc ggaatcttcg ggtaaaacga cactaactct ggaacttatt gcagcagcac   420
agcgtgaagg caaaacttgt gcgtttatcg atgcggagca cgctctggat cctgtatacg   480
cgaagagct tggcgtagat atcgatgcac ttttggtttc tcagcctgat acgggtgagc   540
aagcgctaga aatctgtgac gcattagcgc gctctggtgc tatcgacgta atggttgtcg   600
actctgtggc agcactgact ccaaaagcag aaatcgaagg cgaaatgggc gacagccaca   660
tgggtctcca agctcgtatg ctttctcaag cgatgcgtaa gctaacaggt aacctgaagc   720
agtctaactg tatgtgtatc ttcatcaagc aaatccgtat gaagattggt gtgatgttcg   780
gtaacccaga aacaacaact ggcggtaacg cacttaaatt ctacgcatcg gttcgtcttg   840
atatccgtcg tactggcgca atcaaagaag cgacgaagt tgtaggtaac gaaactcgca   900
tcaaagtcgt taagaacaag attgcagcac catttaaaga agcaaacacg cagatcatgt   960
atggtcaagg ctttaaccgc gaaggtgagc tggtagactt aggcgtgaag cacaaactgg  1020
ttgaaaaagc aggtgcttgg tacagctaca atggcgacaa gatcggtcag ggcaaagcaa  1080
atgcttgtaa ttaccctgcgt gaacatacag aagttgctca gactatcgac aagaaacttc  1140
gtgagatgct tttgtctcca gctgtagctg agggacctga agccggtgaa atgccagaga  1200
agaaagaaga agagttttaa                                              1220

SEQ ID NO: 19           moltype = DNA   length = 23
FEATURE                 Location/Qualifiers
source                  1..23
                        mol_type = other DNA
                        organism = synthetic construct
SEQUENCE: 19
ttggtgtcac tattaccgcg cgg                                           23

SEQ ID NO: 20           moltype = DNA   length = 23
FEATURE                 Location/Qualifiers
source                  1..23
                        mol_type = other DNA
                        organism = synthetic construct
SEQUENCE: 20
cagctgcaat gctggcaaag cgg                                           23

SEQ ID NO: 21           moltype = DNA   length = 23
FEATURE                 Location/Qualifiers
source                  1..23
                        mol_type = other DNA
                        organism = synthetic construct
SEQUENCE: 21
tcgagcggta atagtgaacg cgg                                           23

SEQ ID NO: 22           moltype = DNA   length = 23
FEATURE                 Location/Qualifiers
source                  1..23
                        mol_type = other DNA
                        organism = synthetic construct
SEQUENCE: 22
tccatttcac tattaccgag cgg                                           23

SEQ ID NO: 23           moltype = DNA   length = 20
FEATURE                 Location/Qualifiers
source                  1..20
                        mol_type = other DNA
```

```
                          organism = synthetic construct
SEQUENCE: 23
gcgtcgttta taccacggag                                              20

SEQ ID NO: 24             moltype = DNA  length = 20
FEATURE                   Location/Qualifiers
source                    1..20
                          mol_type = other DNA
                          organism = synthetic construct
SEQUENCE: 24
ccacgctcaa atccgctccg                                              20

SEQ ID NO: 25             moltype = DNA  length = 20
FEATURE                   Location/Qualifiers
source                    1..20
                          mol_type = other DNA
                          organism = synthetic construct
SEQUENCE: 25
gacgcgttaa tgttgtatcg                                              20

SEQ ID NO: 26             moltype = DNA  length = 20
FEATURE                   Location/Qualifiers
source                    1..20
                          mol_type = other DNA
                          organism = synthetic construct
SEQUENCE: 26
aagtttgcgg tatttgaaag                                              20

SEQ ID NO: 27             moltype = DNA  length = 1803
FEATURE                   Location/Qualifiers
source                    1..1803
                          mol_type = other DNA
                          organism = synthetic construct
SEQUENCE: 27
cggccacttc cctcgctgta cacacaaaaa tgtagttaat tttcaacaaa agtaattatt    60
ttttgtatac aaaaaggcat ggttgaaacc atgccttatt gattctagct tttataattt   120
acatatttat cacaacttaa tttcaaatta gtcgtcgata cttgacccag tcaaaactta   180
agccagggtc acttttcttt agcggggcga tgtactggtg gccagtaatt cgttgagggg   240
taatgttagg gtattgcgac ataatcgctt gagataaacc cgcaagtgac tgatattgct   300
catctgtgta tgcgacaaac tcagtccctt ccagctcaac acctatcgaa tagtcattgc   360
atccagctcg tccggcaaaa cttgactggc agcatgcca tgctctatcg agaaaggaca    420
caaactgtac aatctcgcca tttctcttta ttaagcaatg agccgaaacc cccattttgt   480
gaattacttc aaaaaatgga tgtactttcg ggtccaattt ccacagaaa aagtcctcta    540
tataaggacc gccaaactgg ccaggcggca aactgatgtt atgaacaaca agcagagaga   600
tatcagtgct atctgaacga gcatcaaaaa aaggcgacgg aacatgcttt gcttgcgtca   660
accagccatt ctcgattatt gggggcatat caacctctat agtttgcaaa ttaactgctg   720
aaattattga caccggagag tatcattcgt tgccatctcc ctttcaagac tagatttgcg   780
atgaagaaca cacacaacag ccaagaacgc ctggaatacc tgaaacaaca acttcctctg   840
gagatcactc gctccgtcgc cgataccta aaagaagacc tcggcggcac agtggatatc    900
aacaacgata tcaccgcatc tcttatccct gaagatgccg ttaacactgc gacgatcatt   960
acacgtgagc acggtgtgtt ctgcggtcag gcttgggcag atgaagtatt taaacagctg  1020
ggcggtaaag tgactatcga gtggtatgta caagacggtg acaaggttga accaaaccag  1080
acactttgta ccttatcagg ccctgctcgt gacctgctta ctggcgagcg taacgcgatg  1140
aactttattc agacgctttc tggttgtgcg accacaacgt ccgtgtacgc agaaaagatc  1200
gcgcacaccg agtgccgtct gttagatacg cgcaaaacta ttccgggtct gcgcagcgct  1260
ctaaaatacg ccgtagcttg tggcggtggc ttcaaccacc gtatcgcgt attcgatgca   1320
tacctcatta agaaaaccca catcattgcc tgccggcggca tcactcaagc gatcacaaca   1380
gcaaaagagt tgaaccctgg caaaccagtc gaagtggaaa cagaaagctt agacgagtta   1440
aaagaagcga ttgaagccgg tgcggatatc atcatgctgg ataactttac taaagagatg  1500
atgcgtgaag cagtagaaat caacgcaggt cgcgcagcat tagaaaactc tggcaacatc   1560
accttagaca ccatcgcaga atatgcagaa acaggcgtcg attacatctc tgtcggcgcg  1620
ctaaccaagc acctgaaagc gatggatctt tcgatgcgct tcaataaacc aattaacaaa  1680
atccatatta aacaagaaaa ttcaacaact tataaaacaa acattaaata aagggccctt   1740
tggcccttg gccctttatt tttatccgta aaaagccaaa tcaatcgcaa ttcgttgcat   1800
atc                                                                1803

SEQ ID NO: 28             moltype = DNA  length = 1145
FEATURE                   Location/Qualifiers
source                    1..1145
                          mol_type = other DNA
                          organism = synthetic construct
SEQUENCE: 28
caaccagcca ttctcgatta ttgggggcat atcaacctct atagtttgca aattaactgc    60
tgaaattatt gacaccggag agtatcattc gttgccatct cccttttcaag actagatttg   120
cgatgaagaa cacacacaac agccaagaac gcctggaata cctgaaacaa caacttcctc   180
tggagatcac tcgctccgtc gccgatacct aaaagaaga cctcggcggc acagtggata   240
tcaacaacga tatcaccgca tctcttatcc ctgaagatgc cgttaacact gcgacgatca   300
ttacacgtga gcacggtgtg ttctgcggtc aggcttgggc agatgaagta tttaaacagc   360
tgggcggtaa agtgactatc gagtggtatg tacaagacgg tgacaaggtt gaaccaaacc   420
```

-continued

```
agacactttg taccttatca ggccctgctc gtgacctgct tactggcgag cgtaacgcga   480
tgaactttat tcagacgctt tctggttgtg cgaccacaac gtccgtgtac gcagaaaaga   540
tcgcgcacac cgagtgccgt ctgttagata cgcgcaaaac tattccgggt ctgcgcagcg   600
ctctaaaata cgccgtagct tgtggcggtg gcttcaacca ccgtatcggc gtattcgatg   660
catacctcat taaagaaaac cacatcattg cctgcggcgg catcactcaa gcgatcacaa   720
cagcaaaaga gttgaaccct ggcaaaccag tcgaagtgga aacagaaagc ttagacgagt   780
taaaagaagc gattgaagcc ggtgcggata tcatcatgct ggataacttt actaaagaga   840
tgatgcgtga agcagtagaa atcaacgcag gtcgcgcagc attagaaaac tctggcaaca   900
tcaccttaga caccatcgca gaatatgcag aaacaggcgt cgattacatc tctgtcggcg   960
cgctaaccaa gcacctgaaa gcgatggatc tttcgatgcg cttcaaataa ccaattaaca  1020
aaatccatat taaacaagaa aattcaacaa cttataaaac aaacattaaa taaagggccc  1080
tttggccctt tggcccttta tttttatccg taaaaagcca aatcaatcgc aattcgttgc  1140
atatc                                                              1145
```